United States Patent
Wang et al.

(10) Patent No.: US 9,363,442 B2
(45) Date of Patent: Jun. 7, 2016

(54) INFORMATION PROCESSING DEVICE, INFORMATION PROCESSING METHOD, AND PROGRAM

(75) Inventors: WeiJie Wang, Tokyo (JP); Kaoru Hatta, Chiba (JP)

(73) Assignee: SONY CORPORATION, Tokyo (JP)

( * ) Notice: Subject to any disclaimer, the term of this patent is extended or adjusted under 35 U.S.C. 154(b) by 197 days.

(21) Appl. No.: 13/811,696

(22) PCT Filed: May 16, 2012

(86) PCT No.: PCT/JP2012/062463
§ 371 (c)(1),
(2), (4) Date: Jan. 23, 2013

(87) PCT Pub. No.: WO2013/001928
PCT Pub. Date: Jan. 3, 2013

(65) Prior Publication Data
US 2013/0120618 A1 May 16, 2013

(30) Foreign Application Priority Data
Jun. 28, 2011 (JP) .................................. 2011-143208
Nov. 18, 2011 (JP) .................................. 2011-252913

(51) Int. Cl.
*H04N 5/262* (2006.01)
*H04N 5/232* (2006.01)

(52) U.S. Cl.
CPC .................. *H04N 5/23296* (2013.01)

(58) Field of Classification Search
USPC ................ 348/240.99, 240.1–240.3, 239
See application file for complete search history.

(56) References Cited

U.S. PATENT DOCUMENTS

| | | | |
|---|---|---|---|
| 5,654,789 A | 8/1997 | Kirigaya et al. | |
| 6,606,117 B1 * | 8/2003 | Windle | 348/239 |
| 2006/0098729 A1 * | 5/2006 | Shen | 375/240.01 |
| 2007/0115363 A1 | 5/2007 | Nakamura | |
| 2007/0242143 A1 * | 10/2007 | Sugimoto | 348/240.2 |
| 2011/0267499 A1 * | 11/2011 | Wan et al. | 348/231.99 |
| 2011/0267503 A1 * | 11/2011 | Kunishige et al. | 348/240.1 |
| 2013/0120617 A1 * | 5/2013 | Kim | 348/240.2 |

FOREIGN PATENT DOCUMENTS

| | | | |
|---|---|---|---|
| JP | 6-130445 A | | 5/1994 |
| JP | 6-201971 A | | 7/1994 |
| JP | 2006-91252 A | | 4/2006 |
| JP | 2007-142866 A | | 6/2007 |
| JP | 2010164716 A | * | 7/2010 |
| JP | 2010-200243 A | | 9/2010 |
| JP | 2011-95501 A | | 5/2011 |
| JP | 2011109693 A | * | 6/2011 |

OTHER PUBLICATIONS

International Search Report Issued Jul. 3, 2012 in PCT/JP2012/062463.

* cited by examiner

*Primary Examiner* — Zhenzhen Wu
(74) *Attorney, Agent, or Firm* — Chip Law Group

(57) ABSTRACT

An information processing device including a control unit that, based on a specific subject that is an imaging target of a during-exposure zoom imaging operation, performs control decide control details for a zoom lens in the during-exposure zoom imaging operation.

19 Claims, 51 Drawing Sheets

FIG. 3
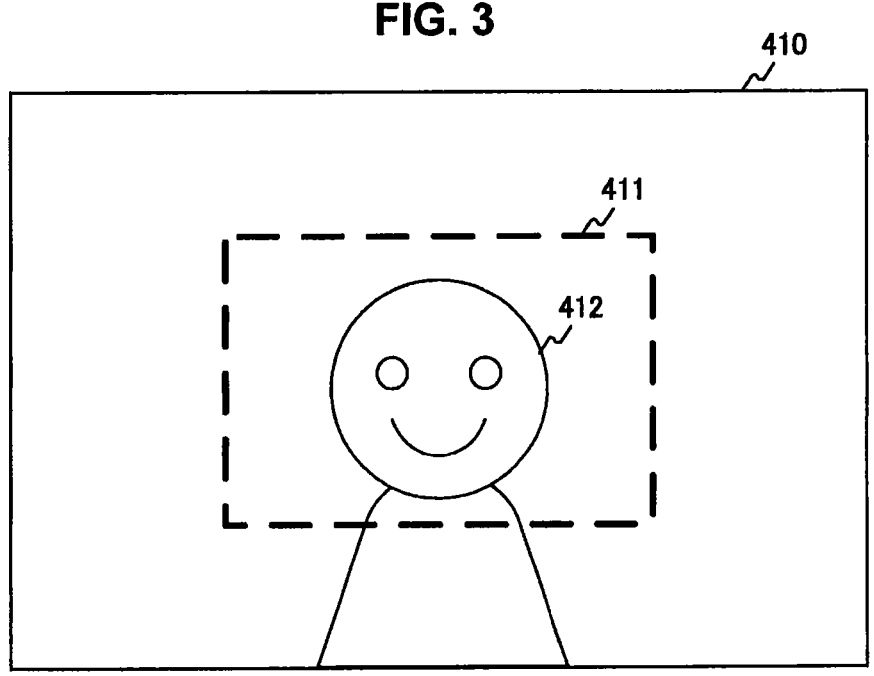
(a)
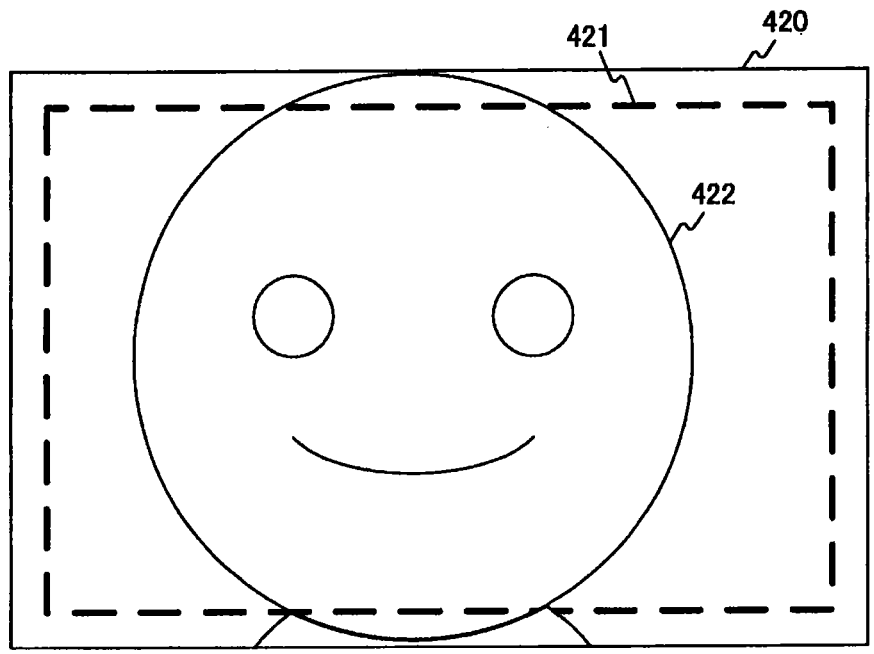
(b)

FIG. 4
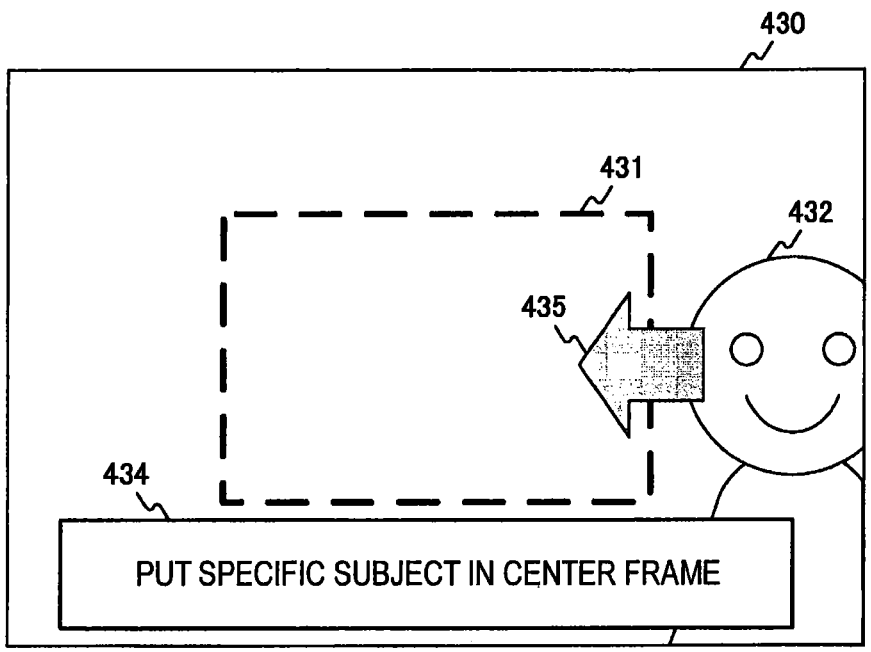
(a)
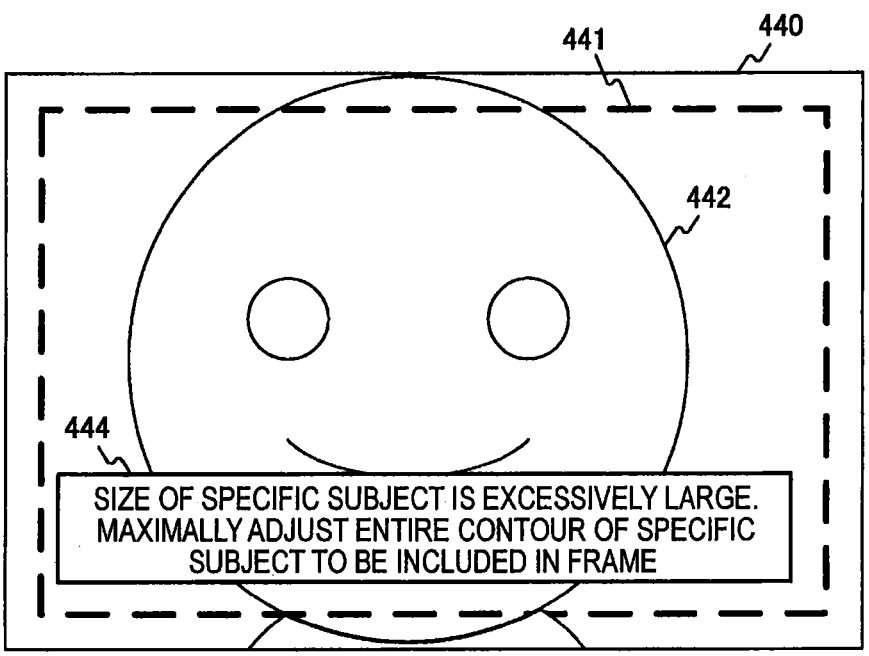
(b)

FIG. 5
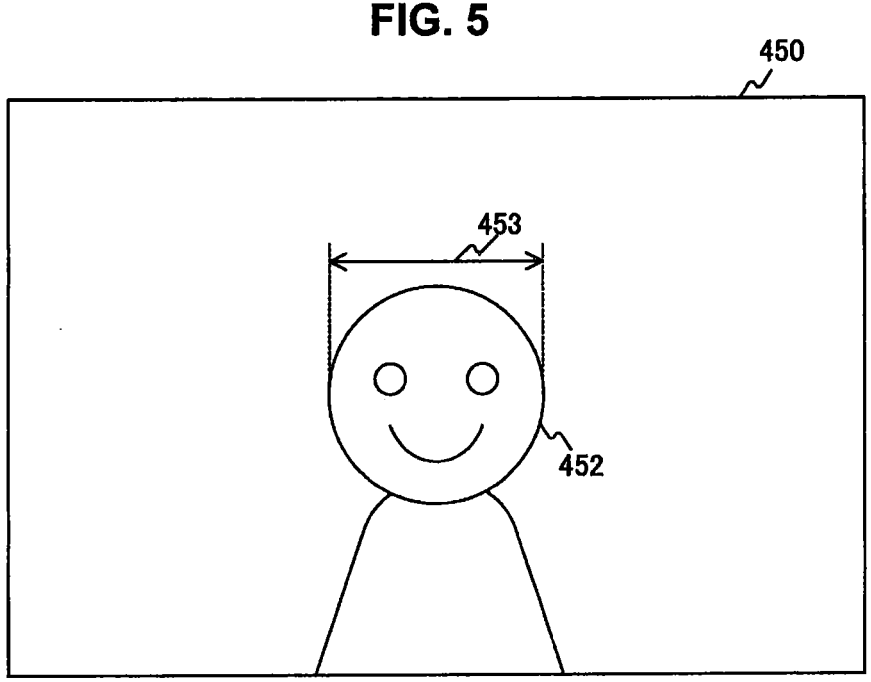
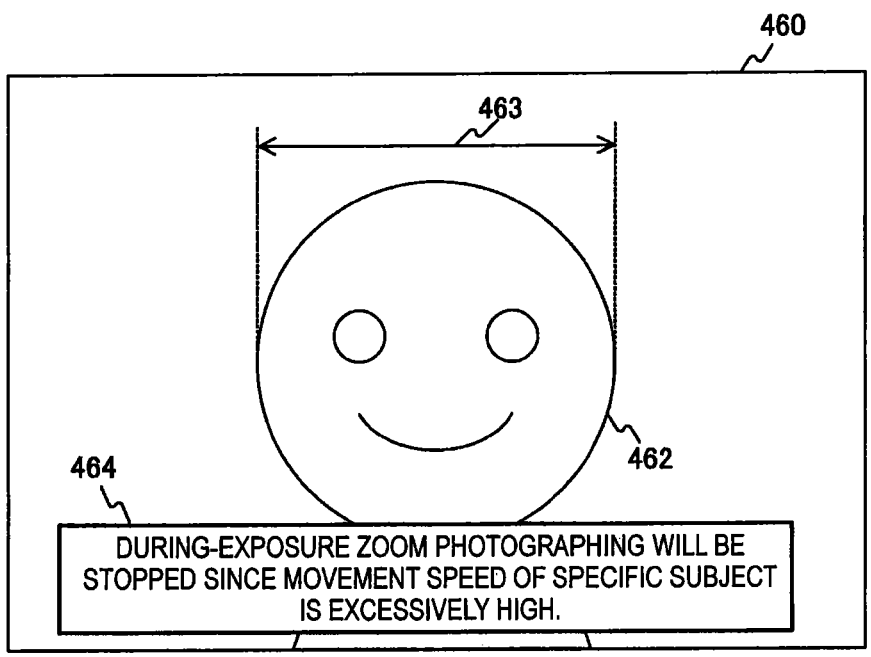

FIG. 6

| SUBJECT NUMBER | SIZE (HEIGHT, WIDTH) | POSITION (X,Y) | OPTICAL AXIS DIRECTION MOVEMENT SPEED |
|---|---|---|---|
| #1 | H1, W1 | X1, Y1 | +v1 |
| #2 | H2, W2 | X2, Y2 | −v2 |
| #3 | H3, W3 | X3, Y3 | −v3 |
| #4 | H4, W4 | X4, Y4 | +v4 |
| ⋮ | ⋮ | ⋮ | ⋮ |

522 SIZE

521 NUMBER OF SPECIFIC SUBJECTS

| | | LARGE | SMALL |
|---|---|---|---|
| | PLURAL | SMALL | SMALL |
| | SINGLE | SMALL | LARGE |

(a)

530

| 531 POSITION OF SPECIFIC SUBJECT FROM CENTER OF CAPTURED IMAGE | 532 ZOOM AMOUNT |
|---|---|
| DISTANT | SMALL |
| CLOSE | LARGE |

(b)

| OPTICAL AXIS DIRECTION MOVEMENT SPEED | ZOOM SPEED | EXPOSURE TIME SHORT |
|---|---|---|
| HIGH | HIGH | SHORT |
| LOW | LOW | SOMEWHAT SHORT |
| STAND STILL | STANDARD | STANDARD |

FIG. 9
(a)
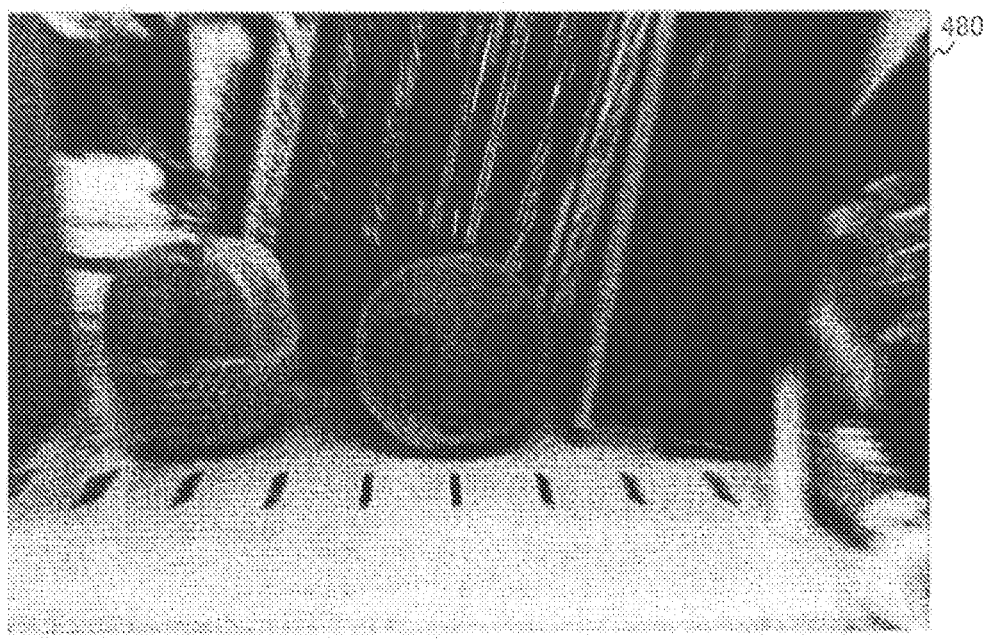
(b)

| SUBJECT NUMBER 611 | TYPE 612 | SIZE (HEIGHT, WIDTH) 613 | POSITION (X,Y) 614 | OPTICAL AXIS DIRECTION MOVEMENT SPEED 615 |
|---|---|---|---|---|
| #1 | PERSON | H1, W1 | X1, Y1 | + v1 |
| #2 | DOG | H2, W2 | X2, Y2 | − v2 |
| #3 | PERSON | H3, W3 | X3, Y3 | − v3 |
| #4 | OBJECT | H4, W4 | X4, Y4 | + v4 |
| ⋮ | ⋮ | ⋮ | ⋮ | ⋮ |

FIG. 14

| TYPE | ZOOM AMOUNT |
|---|---|
| PLANT | SMALL |
| VEHICLE | LARGE |
| PERSON | SMALL |
| ANIMAL | LARGE |

FIG. 15
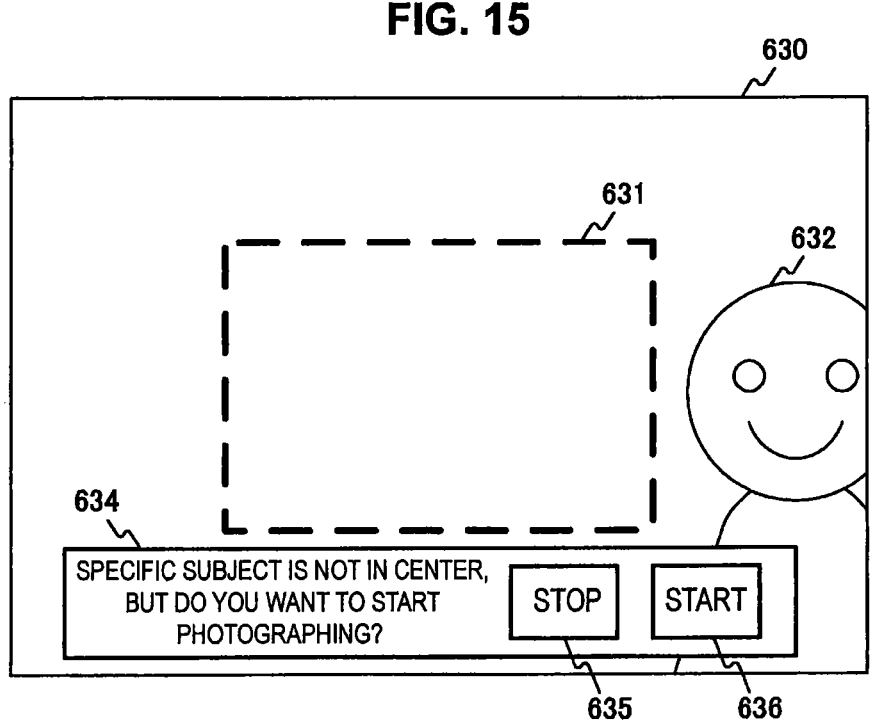
(a)
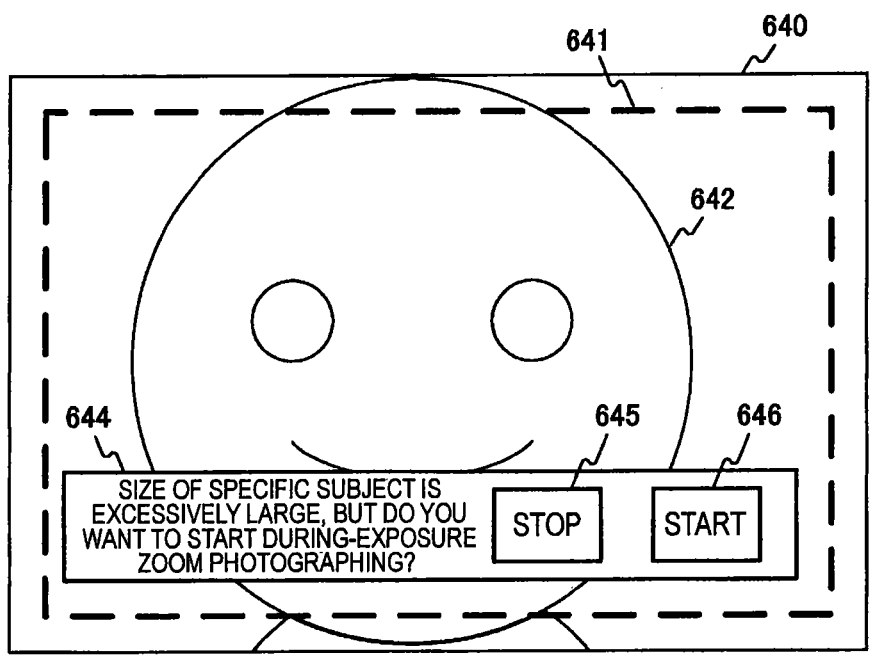
(b)

FIG. 22
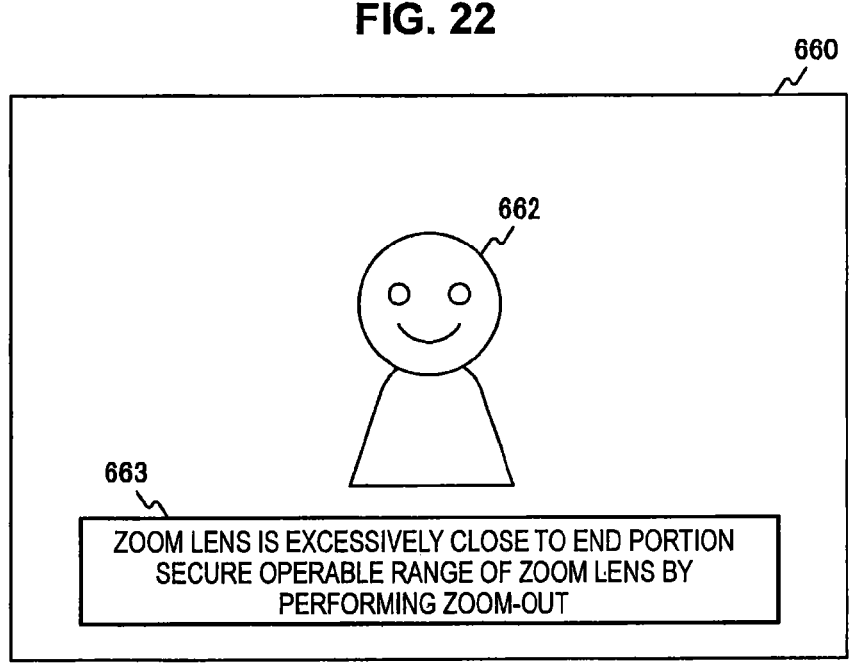
(a)
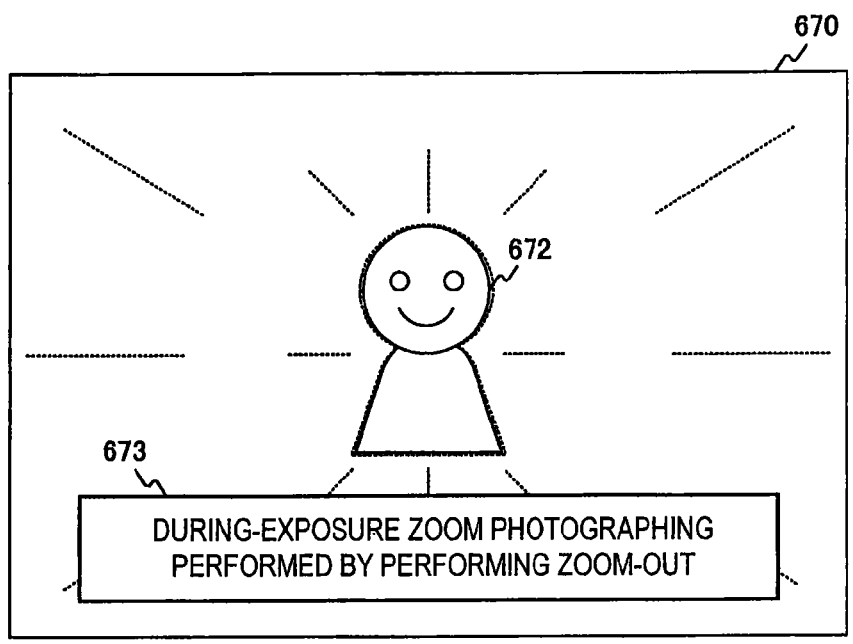
(b)

| FOCAL LENGTH AT START OF ZOOM | 20mm | 30mm | 40mm | 50mm | 60mm |
|---|---|---|---|---|---|
| ZOOM STANDARD FOCAL LENGTH | 30mm | 45mm | 60mm | 75mm | 90mm |

| DISTANCE TO SPECIFIC SUBJECT (1121) | WHEN SPECIFIC SUBJECT IS PERSON (1122) | WHEN SPECIFIC SUBJECT IS OTHER THAN PERSON (1123) |
|---|---|---|
| < 5 meters | DURING-EXPOSURE ZOOM PHOTOGRAPHING WITH 22 mm FROM 20 mm | DURING-EXPOSURE ZOOM PHOTOGRAPHING WITH 25 mm FROM 20 mm |
| 5 ~ 15 meters | DURING-EXPOSURE ZOOM PHOTOGRAPHING WITH 33 mm FROM 30 mm AFTER PERFORMING ZOOM-IN WITH FOCAL LENGTH OF 30 mm | DURING-EXPOSURE ZOOM PHOTOGRAPHING WITH 30 mm FROM 20 mm |
| > 15 meters | DURING-EXPOSURE ZOOM PHOTOGRAPHING WITH 55 mm FROM 50 mm AFTER PERFORMING ZOOM-IN WITH FOCAL LENGTH OF 50 mm | DURING-EXPOSURE ZOOM PHOTOGRAPHING WITH 40 mm FROM 20 mm |

FIG. 28
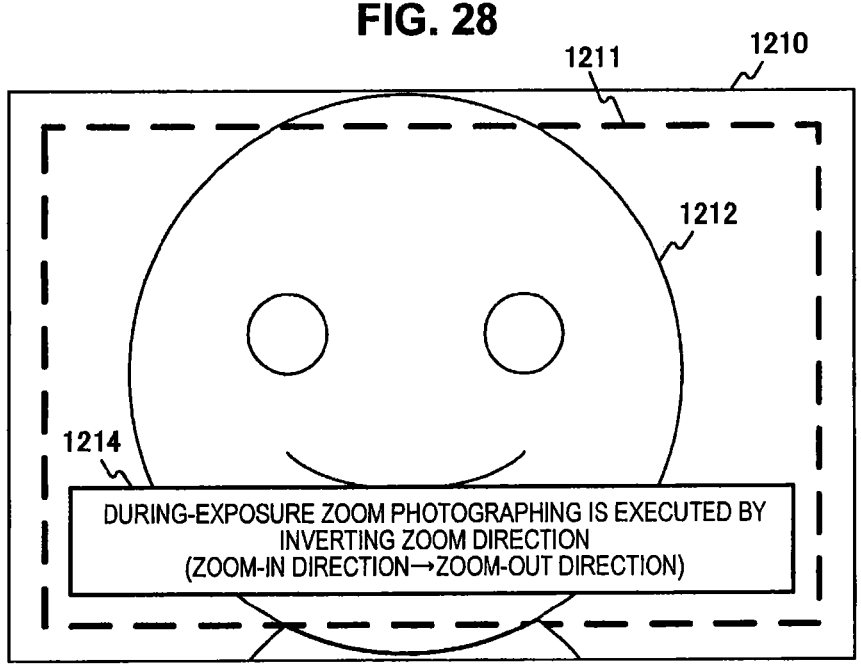
(a)
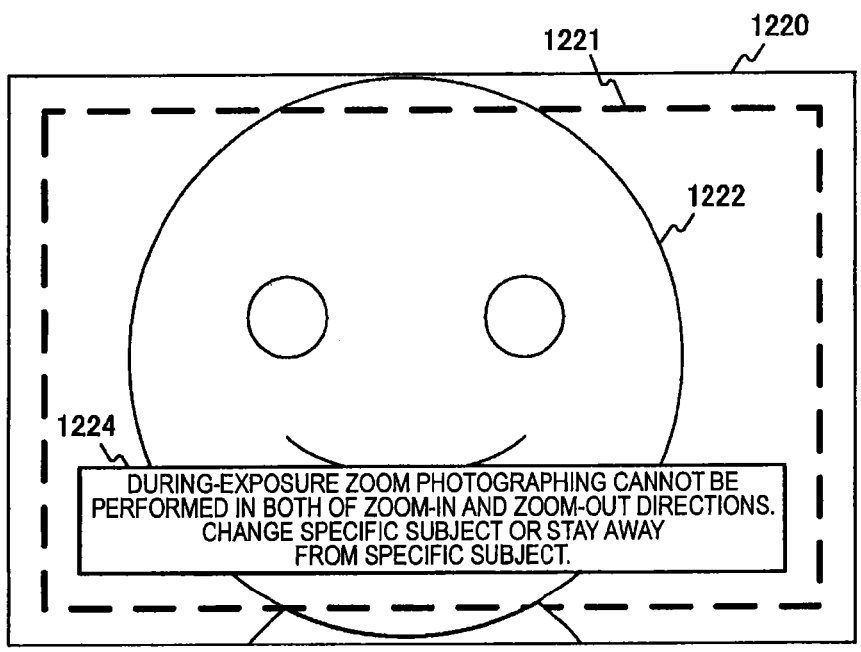
(b)

FIG. 29
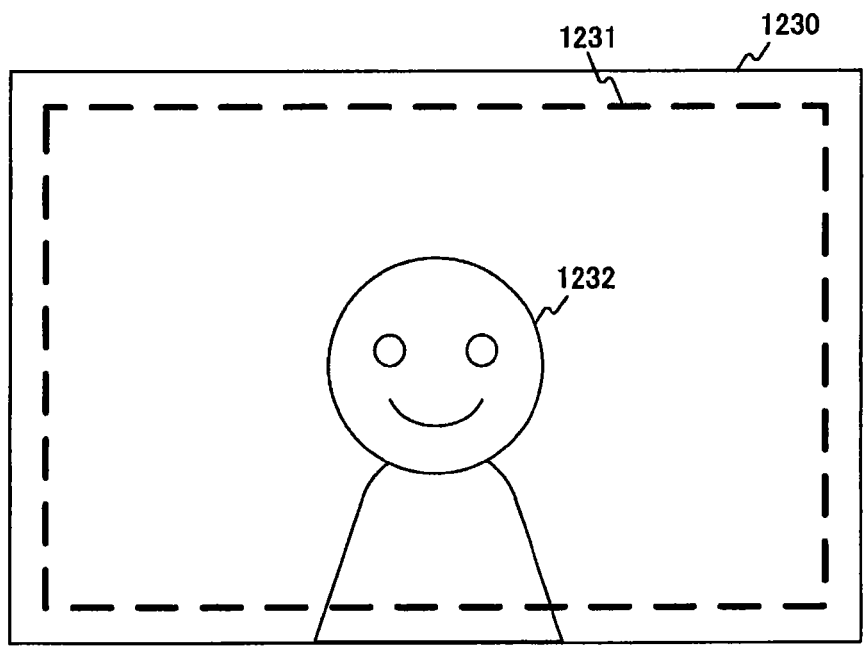
DURING-EXPOSURE ZOOM PHOTOGRAPHING IN ZOOM-IN DIRECTION (DEFAULT DIRECTION)
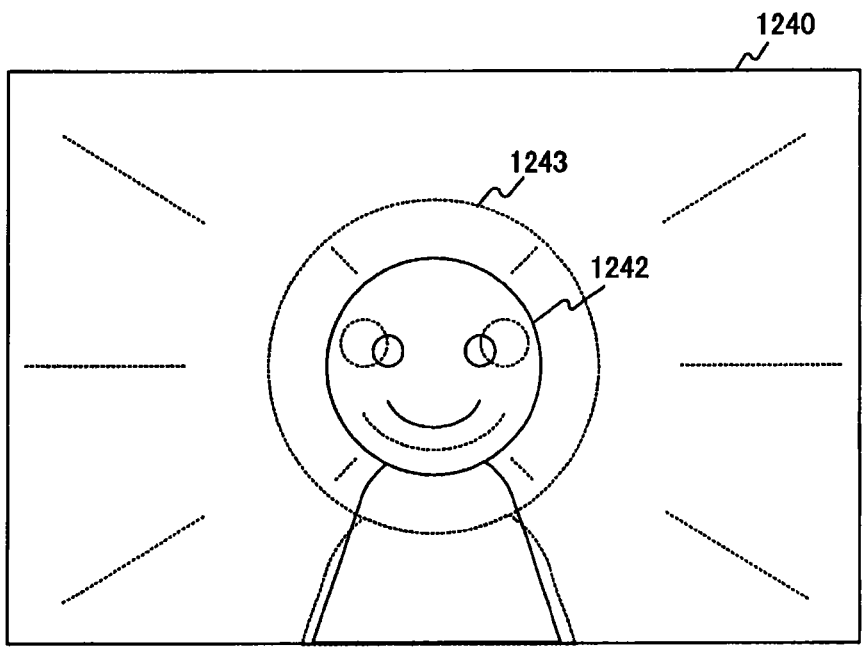

FIG. 30
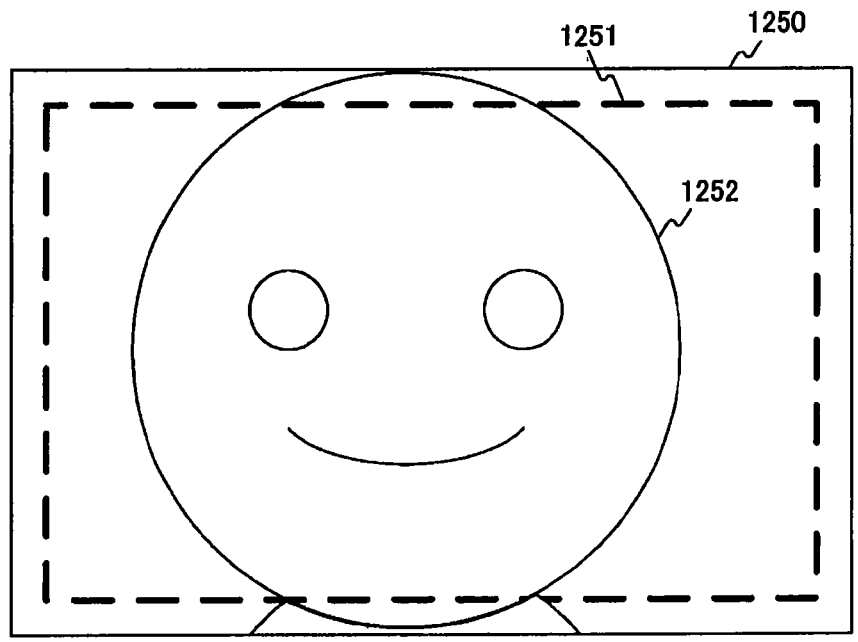
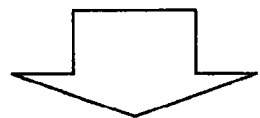
DURING-EXPOSURE ZOOM PHOTOGRAPHING IN ZOOM-OUT DIRECTION
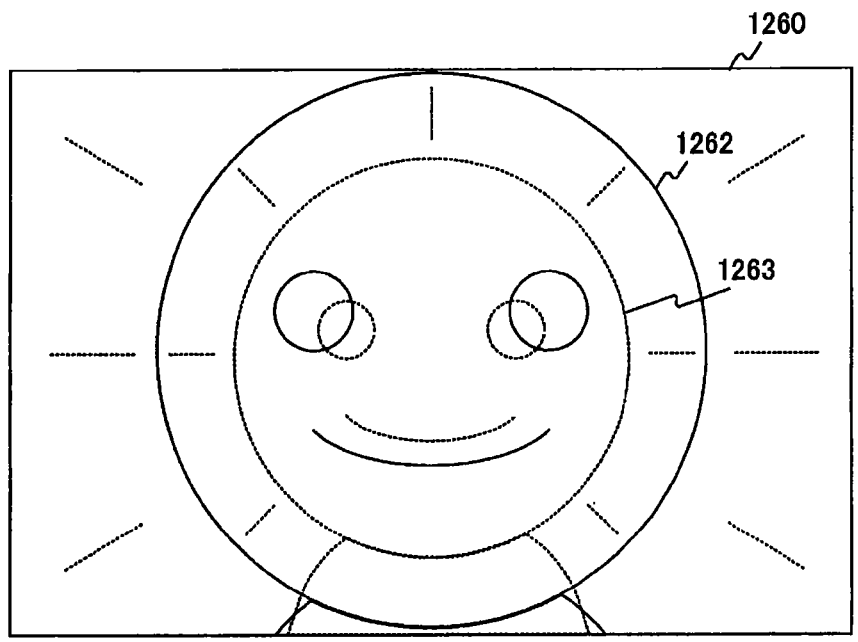

FIG. 33
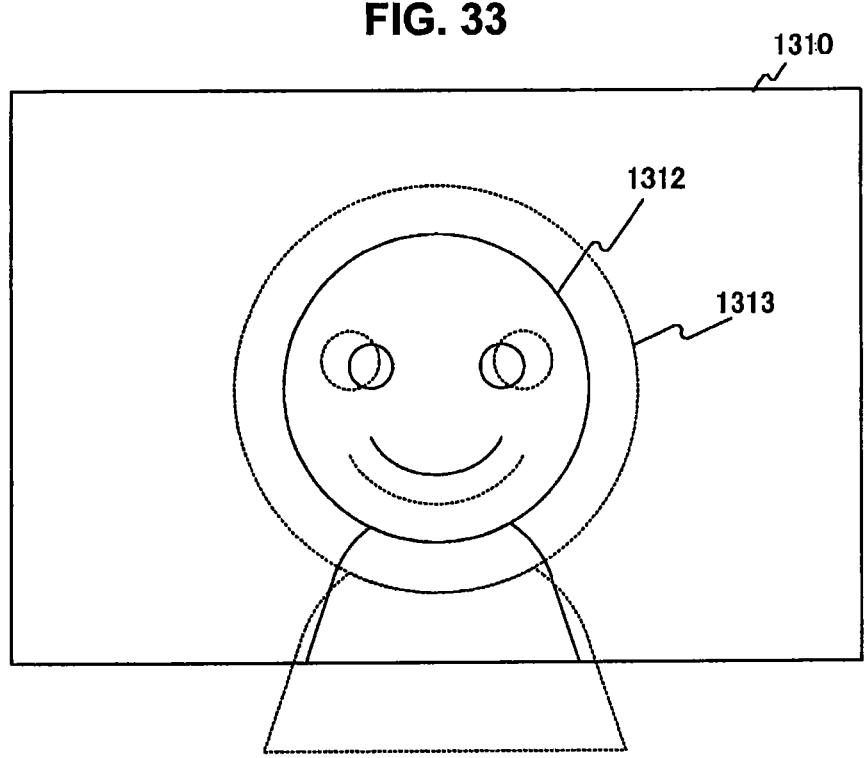
(a)
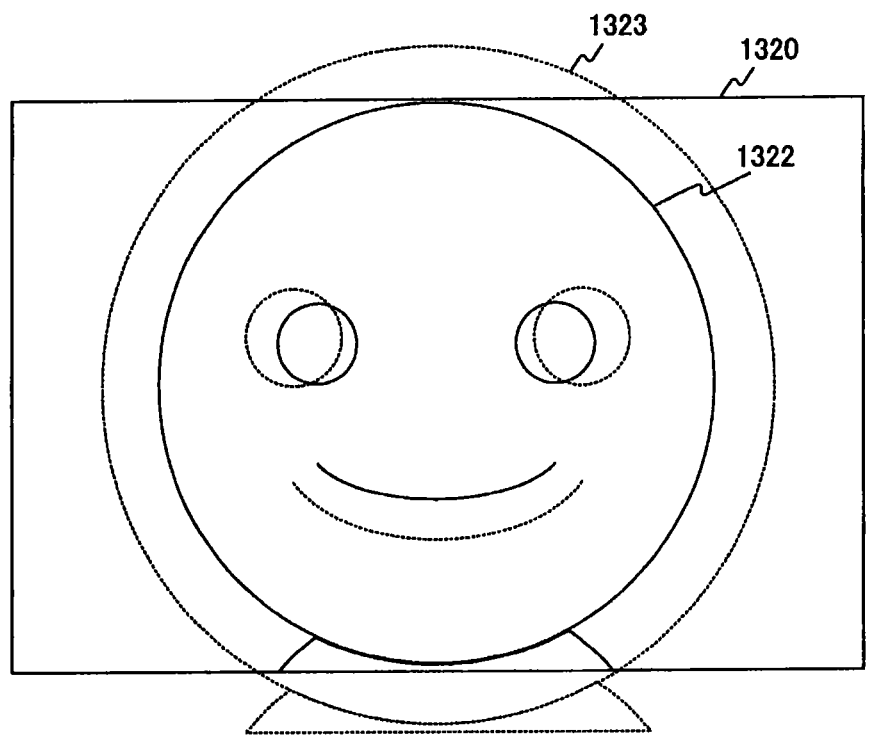
(b)

FIG. 34
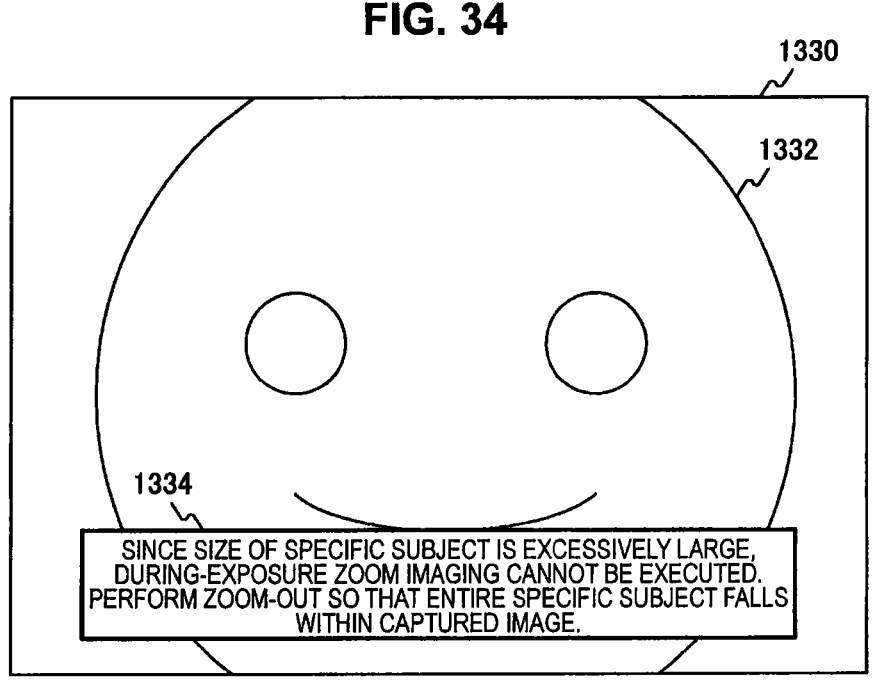
(a)
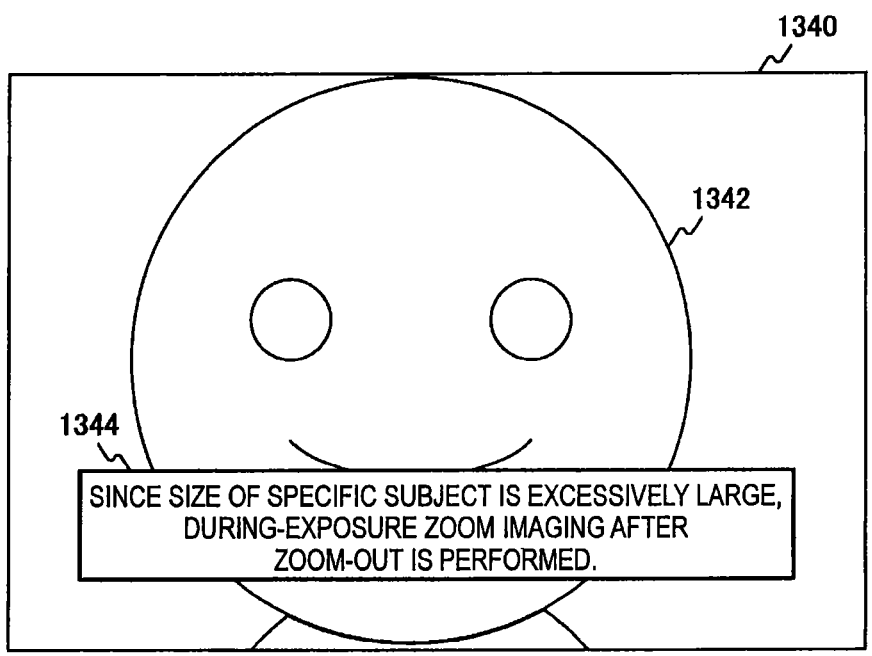
(b)

FIG. 40
OPERATION EXAMPLE OF NORMAL ZOOM PHOTOGRAPHING
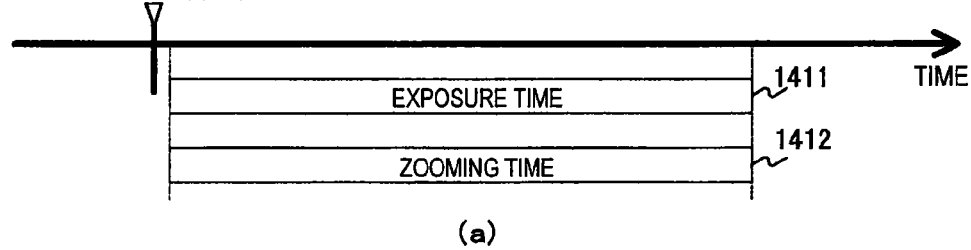
(a)
OPERATION EXAMPLE OF FIRST-HALF ZOOM PHOTOGRAPHING
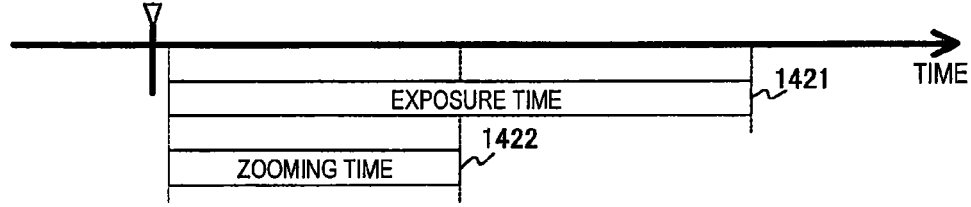
(b)
OPERATION EXAMPLE OF SECOND-HALF ZOOM PHOTOGRAPHING
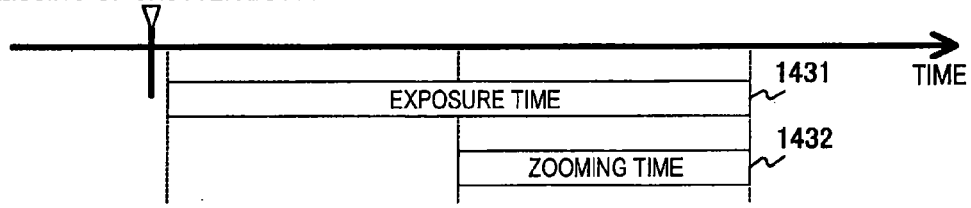
(c)
OPERATION EXAMPLE OF INTERMEDIATE ZOOM PHOTOGRAPHING
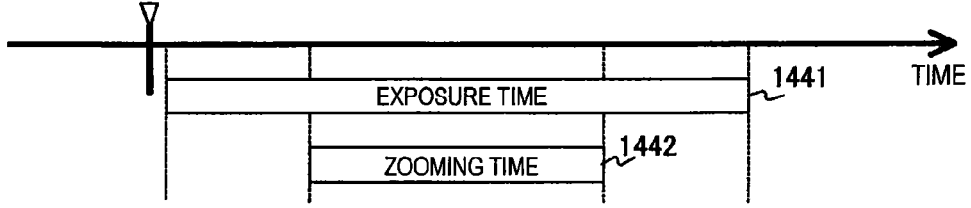
(d)

FIG. 43
| SIZE OF SPECIFIC SUBJECT | OPERATION MODE OF DURING-EXPOSURE ZOOM PHOTOGRAPHING |
|---|---|
| SIZE AT START IS CLOSER TO STANDARD SIZE THAN SIZE AT END IS | FIRST-HALF ZOOM PHOTOGRAPHING |
| SIZE AT END IS CLOSER TO STANDARD SIZE THAN SIZE AT START IS | SECOND-HALF ZOOM PHOTOGRAPHING |
(a)
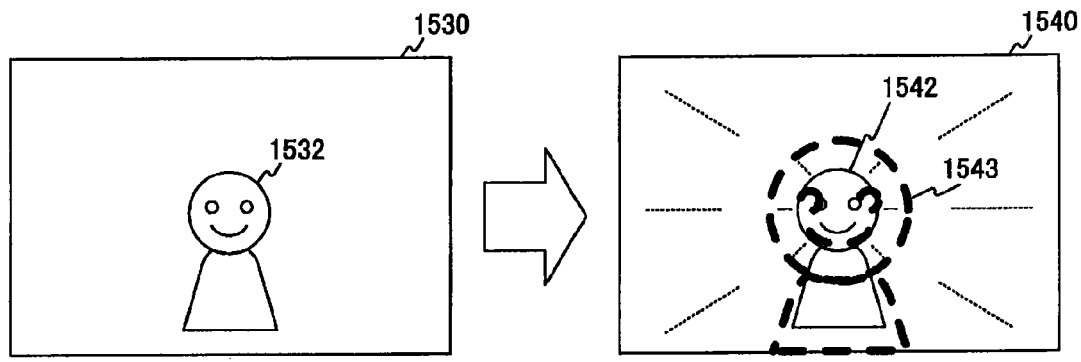
(b)
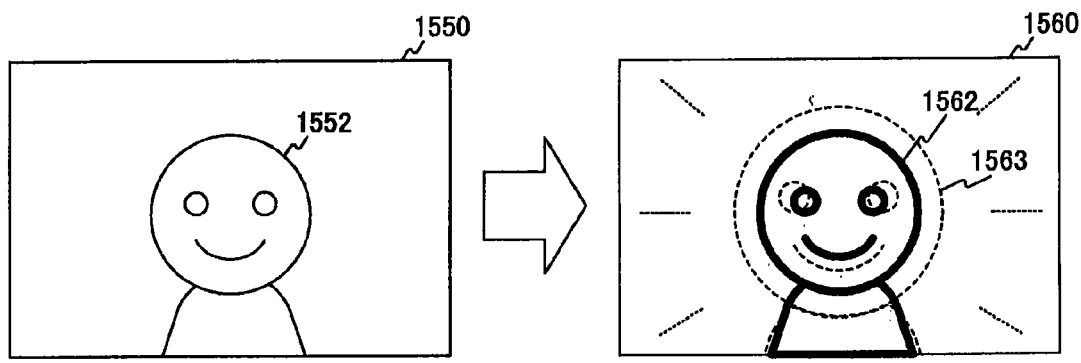
(c)

FIG. 45
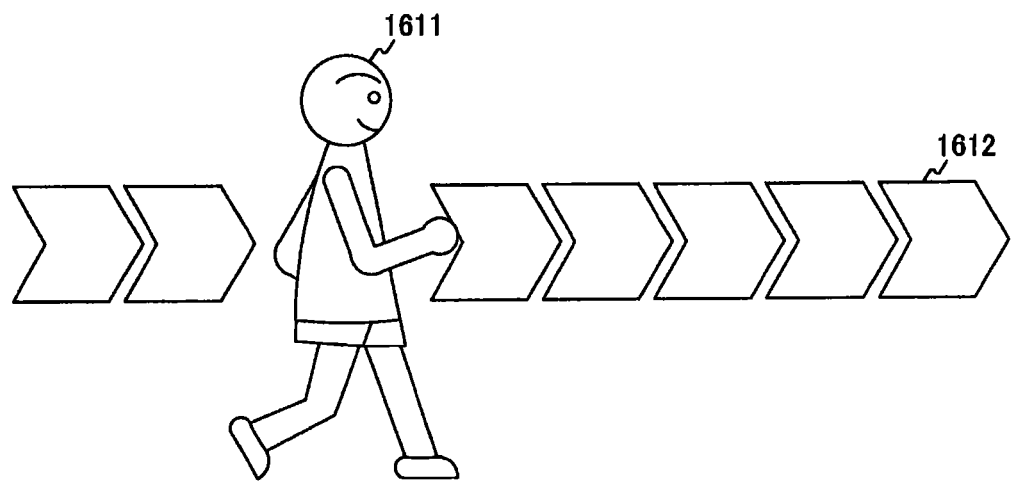
(a)
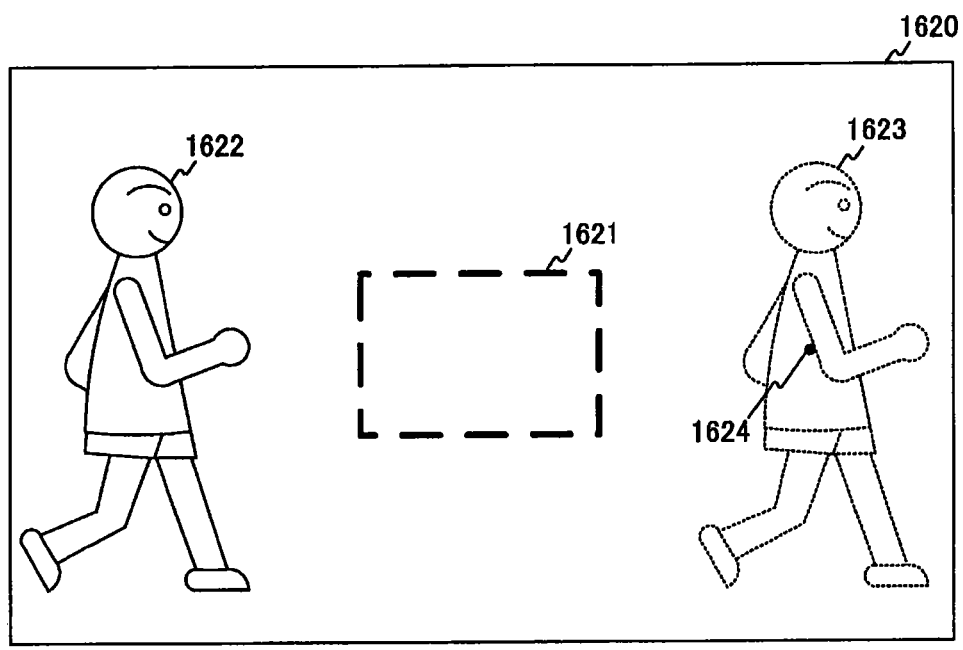
(b)

FIG. 47
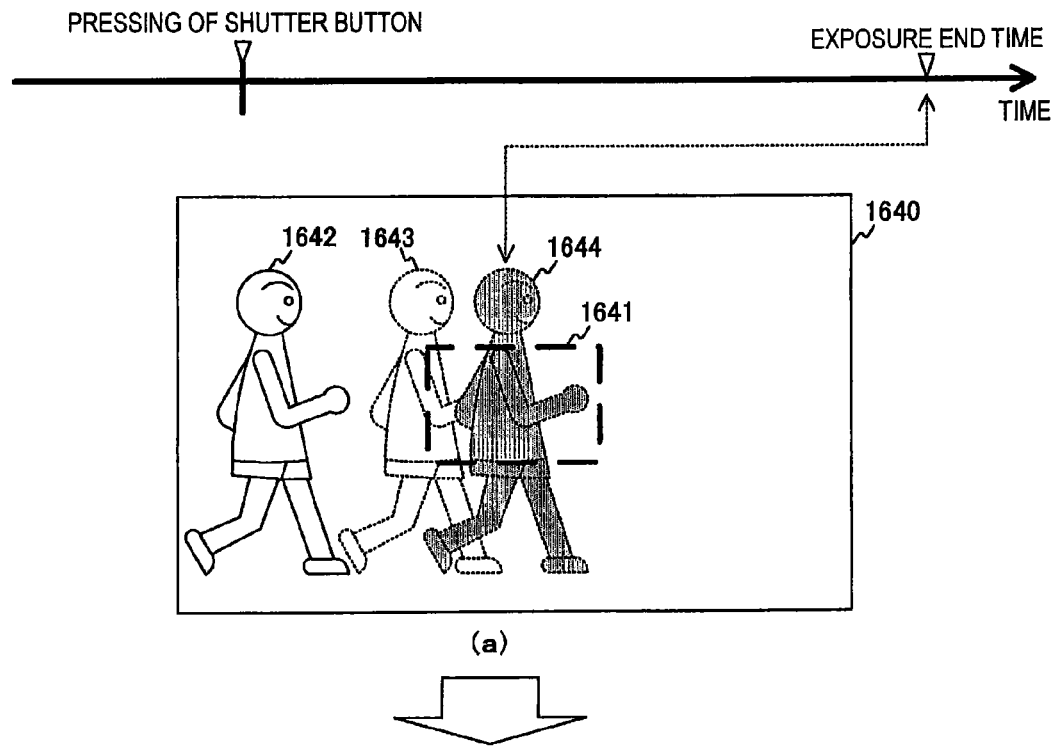
(a)
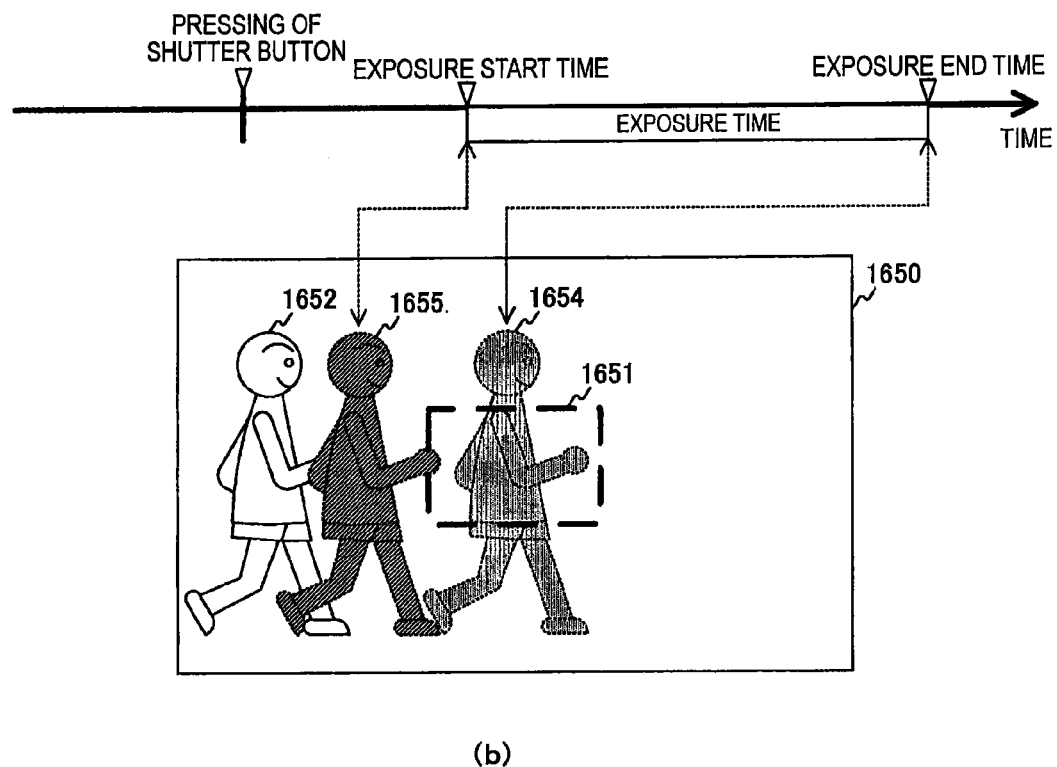
(b)

INFORMATION PROCESSING DEVICE, INFORMATION PROCESSING METHOD, AND PROGRAM

TECHNICAL FIELD

The present technology relates to an information processing device. Specifically, the technology relates to an information processing device and an information processing method which enable control of a during-exposure zoom imaging operation, and a program which causes a computer to execute the method.

BACKGROUND ART

In the related art, as an imaging method using an image processing device (for example, a digital still camera, and a digital single-lens reflex camera), a during-exposure zoom imaging operation (during-exposure zoom photography) has been widely known in which a zoom operation is performed during exposure so that an image is generated as if an image of a captured subject flows in a radial fashion.

Since it is necessary that a zoom lens is to be driven by a manual operation by a user during exposure, the during-exposure zoom imaging operation is an advanced imaging method in which a high level of skill is necessary. For this reason, performing the during-exposure zoom imaging operation is considered to be difficult for a novice.

Thus, a camera has been proposed which turns a captured image that is obtained from a during-exposure zoom imaging operation into a plurality of pattern simulations, displays the simulations on a display unit and then performs the during-exposure zoom imaging operation based on a simulation result selected by a user (for example, refer to Patent Literature 1).

CITATION LIST

Patent Literature

Patent Literature 1: JP 2010-200243A

SUMMARY OF INVENTION

Technical Problem

In the above-described related art, the main subject and the degree of change in the main subject in zooming are set by a user, the flow of an image of the main subject is simulated based on the setting, and thus an image having a composition reflecting the intention of the user can be generated. However, in the above-described related art, as it is necessary to perform a during-exposure zoom imaging operation while the user anticipates an appropriate change of the main subject to be made in a captured image, it is desirable for the user to have prior knowledge on the during-exposure zoom imaging operation. For this reason, it is important to ensure facilitation of the during-exposure zoom imaging operation so that a user who does not have knowledge of the during-exposure zoom imaging operation can also perform proper operation.

The present technology has been made in view of the above circumstance, and aims to facilitate a during-exposure zoom imaging operation.

Solution to Problem

The present technology is provided to solve the above-mentioned problems. According to a first embodiment of the present technology, there is provided an information processing device, an information processing method and a program including a control unit that, based on a specific subject that is an imaging target of a during-exposure zoom imaging operation, performs control to decide control details for a zoom lens in the during-exposure zoom imaging operation. Accordingly, an effect is exhibited in which the during-exposure zoom imaging operation is performed based on the control details of the zoom lens decided based on the specific subject that is an imaging target of the during-exposure zoom imaging operation in the performance of the during-exposure zoom imaging operation.

Further, according to the first embodiment, the control unit may decide the control details based on a position of the specific subject in an image captured by an imaging unit and a size of the specific subject in the image. Accordingly, an effect is exhibited in which the during-exposure zoom imaging operation is performed based on the control details of the zoom lens decided based on the position of the specific subject or the size of the specific subject in the image.

Further, according to the first embodiment, the control unit may decide the control details based on a relationship between a specific position in an image captured by an imaging unit and a position of the specific subject in the image. Accordingly, an effect is exhibited in which the during-exposure zoom imaging operation is performed based on the control details of the zoom lens decided based on the relationship between the specific position in the image and the position of the specific subject in the image.

Further, according to the first embodiment, the specific position may be the center position of the image. Accordingly, an effect is exhibited in which the during-exposure zoom imaging operation is performed based on the control details of the zoom lens decided based on the relationship between the center position of the image and the position of the specific subject in the image.

Further, according to the first embodiment, the control unit may determine whether or not the during-exposure zoom imaging operation is to be executed based on at least one of a position of the specific subject in an image captured by an imaging unit or a size of the specific subject in the image. Accordingly, an effect is exhibited in which whether or not the during-exposure zoom imaging operation is to be executed is determined based on at least one of the position of the specific subject in the image or the size of the specific subject in the image.

Further, according to the first embodiment, when it is determined that the during-exposure zoom imaging operation is not to be executed, the control unit may cause a guide image for correcting at least one of the position of the specific image in the image or the size of the specific subject in the image to be displayed on a display unit. Accordingly, an effect is exhibited in which the guide image for correcting at least one of the position of the specific subject in the image or the size of the specific subject in the image is displayed by the display unit when it is determined that the during-exposure zoom imaging operation is not to be executed.

Further, according to the first embodiment, the control unit may decide the control details based on a movement speed of the specific subject in an optical axis direction. Accordingly, an effect is exhibited in which the during-exposure zoom imaging operation is performed based on the control details of the zoom lens decided based on the movement speed of the specific subject in the optical axis direction.

Further, according to the first embodiment, the information processing device may further include an acquisition unit that acquires information of the type of the specific subject. The control unit may decide the control details based on the acquired type of the specific subject. Accordingly, an effect is exhibited in which the during-exposure zoom imaging operation is performed based on the control details of the zoom lens decided based on the type of the specific subject.

Further, according to the first embodiment, the control unit may determine whether or not the zoom lens reaches an end portion of an operable range of the zoom lens during the during-exposure zoom imaging operation based on the decided control details, and when it is determined that the zoom lens reaches the end portion of the operable range of the zoom lens, causes a guide screen for correcting a position of the zoom lens to be displayed on a display unit. Accordingly, an effect is exhibited in which the guide screen for correcting the position of the zoom lens is displayed on the display unit when it is determined that the zoom lens reaches the end portion of the operable range of the zoom lens during the during-exposure zoom imaging operation.

Further, according to the first embodiment, the control unit may determine whether or not the zoom lens reaches an end portion of an operable range of the zoom lens during the during-exposure zoom imaging operation based on the decided control details, and when it is determined that the zoom lens reaches the end portion of the operable range of the zoom lens, corrects a position of the zoom lens and then causes the during-exposure zoom imaging operation to start after the correction. Accordingly, an effect is exhibited in which the position of the zoom lens is corrected and the during-exposure zoom imaging operation is started after the correction when it is determined that the zoom lens reaches the end portion of the operable range of the zoom lens during the during-exposure zoom imaging operation.

Further, according to the first embodiment, the control unit may decide the control details based on the focal length when the control details are decided and the specific subject. Accordingly, an effect is exhibited in which the control details of the during-exposure zoom imaging operation are decided according to the focal length when the detailed controls are decided and the specific subject.

Further, according to the first embodiment, the control unit may decide the control details based on information of the distance between the specific subject when the control details are decided and the information processing device. Accordingly, the during-exposure zoom imaging operation is performed based on the control details of the zoom lens decided based on the distance between the specific subject and the information processing device.

Further, according to the first embodiment, the control unit may decide, as the control details, one operation mode among a plurality of operation modes respectively having different relationships between an exposure time and a zooming time in the during-exposure zoom imaging operation. Accordingly, an effect is exhibited in which the relationship between the exposure time and the zooming time in the during-exposure zoom imaging operation is decided based on the specific subject.

Further, according to the first embodiment, the control unit may decide the control details based on a movement of the specific subject in a direction orthogonal to the optical axis. Accordingly, an effect is exhibited in which the during-exposure zoom imaging operation is performed based on the control details of the zoom lens decided based on the movement of the specific subject in the direction orthogonal to the optical axis.

Further, according to the first embodiment, the control unit may perform movement prediction for the specific subject, and when the result of the movement prediction passes through the center position of the image or a position located within a predetermined distance from the center position and does not pass over the center position of the image or a position located within a predetermined distance from the center position until an exposure time of the during-exposure zoom imaging operation ends, determines that the during-exposure zoom imaging operation is to be executed. Accordingly, an effect is exhibited in which the during-exposure zoom imaging operation is determined to be performed when a movement of the specific subject in a direction orthogonal to the optical axis passes through the center position or the position located within the predetermined distance from the center position of the image and does not pass over the center position or the position located within the predetermined distance from the center position of the image until the exposure time of the during-exposure zoom imaging operation ends.

Further, according to the first embodiment, the control unit may decide the control details in which a time at which the specific subject moves to the center position or a position located within a predetermined distance from the center position is set to be an end time of an exposure time of the during-exposure zoom imaging operation and a time as early as the exposure time of the during-exposure zoom imaging operation from the end time is set to be a start time of the exposure time. Accordingly, an effect is exhibited in which the during-exposure zoom imaging operation is performed in which the time at which the specific subject moves to the center position or the position located within the predetermined distance from the center position is set to be the end time of the exposure time and a time as early as the exposure time from the end time is set to be the start time of the exposure time.

Further, according to the first embodiment, the control unit may decide a driving direction of the zoom lens in the during-exposure zoom imaging operation to be one of a zoom-in direction or a zoom-out direction based on a size of the specific subject. Accordingly, an effect is exhibited in which switching of the during-exposure zoom imaging operation in the zoom-in direction and the during-exposure zoom imaging operation in the zoom-out direction is performed based on the size of the specific subject.

Further, according to the first embodiment, the control unit determines whether or not a size of the specific subject in the during-exposure zoom imaging operation reaches a predetermined size based on the decided control details, and when it is determined that the size of the specific subject reaches the predetermined size, corrects a position of the zoom lens, and causes the during-exposure zoom imaging operation to start after the correction. Accordingly, an effect is exhibited in which, when it is determined that the size of the specific subject reaches the predetermined size during the during-exposure zoom imaging operation, the position of the zoom lens is corrected, and the during-exposure zoom imaging operation is caused to start after the correction.

In addition, according to the first aspect, when a predetermined ratio or higher of the specific subject falls within a predetermined range having the center position or a position within a predetermined distance from the center position of the image as the center, the control unit may be configured to determine that the during-exposure zoom imaging operation is to be executed. Accordingly, an effect is exhibited in which, when a predetermined ratio or higher of the specific subject falls within a predetermined range having the center position or the position within the predetermined distance from the center position of the image as the center, the during-exposure zoom imaging operation is determined to be executed.

In addition, according to the first aspect, when the distance from the center position or the position located within a predetermined distance from the center position of the image to the position of the specific subject is shorter than a threshold value, the control unit may be configured to determine that the during-exposure zoom imaging operation is to be executed. Accordingly, an effect is exhibited in which, when the distance from the center position or the position located within the predetermined distance from the center position of the image to the position of the specific subject is shorter than the threshold value, the during-exposure zoom imaging operation is determined to be executed.

In addition, according to the first aspect, when it is determined that the during-exposure zoom imaging operation is not to be executed, and even when an instruction operation for instructing start of the during-exposure zoom imaging operation is received, the control unit may be configured to stop the during-exposure zoom imaging operation by the instruction operation. Accordingly, an effect is exhibited in which, when it is determined that the during-exposure zoom imaging operation is not to be executed, and even when the instruction operation for instructing start of the during-exposure zoom imaging operation is received, the during-exposure zoom imaging operation by the instruction operation is stopped.

In addition, according to the first aspect, the control unit may be configured to decide a zoom amount and a zoom speed as the control details. Accordingly, an effect is exhibited in which the zoom amount and the zoom speed are decided as the control details.

Advantageous Effects of Invention

According to the present technology, an excellent effect of facilitating a during-exposure zoom imaging operation can be attained.

BRIEF DESCRIPTION OF DRAWINGS

FIG. 3 is a schematic diagram for describing the position and the size of a specific subject analyzed by a during-exposure zoom setting unit 330 according to the first embodiment of the present technology.

FIG. 4 is a schematic diagram showing an example of an image displayed on a display unit 272 when the during-exposure zoom setting unit 330 determines that the position of the specific subject is not appropriate or the size of the specific subject is not appropriate according to the first embodiment of the present technology.

FIG. 5 is a schematic diagram showing an example of an image displayed on the display unit 272 when the during-exposure zoom setting unit 330 determines that the movement speed of a specific subject is not appropriate according to the first embodiment of the present technology.

FIG. 6 is a diagram schematically showing an example of subject information used in the during-exposure zoom setting unit 330 according to the first embodiment of the present technology.

FIG. 7 is a diagram schematically showing the movement amount (zoom amount) of a zoom lens 211 computed by the during-exposure zoom setting unit 330 according to the first embodiment of the present technology.

FIG. 9 is a diagram schematically showing an example of an image captured in a during-exposure zoom mode by the imaging device 100 according to the first embodiment of the present technology.

FIG. 13 is a diagram schematically showing an example of subject information used in the during-exposure zoom setting unit 330 according to a second embodiment of the present technology.

FIG. 14 is a diagram schematically showing an example of the zoom amounts computed by the during-exposure zoom setting unit 330 according to a second embodiment of the present technology in accordance with the type of a specific subject.

FIG. 15 is a schematic diagram showing an example of an image displayed on the display unit 272 when the during-exposure zoom setting unit 330 determines in prior checking that a position or a size of the specific subject is not appropriate according to a third embodiment of the present technology.

FIG. 22 is a schematic diagram showing an example of an image displayed on the display unit 272 when the during-exposure zoom setting unit 330 determines that it is difficult to implement a change in the computed zoom amount according to a sixth embodiment of the present technology.

FIG. 25 is a diagram schematically showing an example of a driving distance of a zoom lens set by the during-exposure zoom setting unit 330 in accordance with the focal length at the start of zooming according to a seventh embodiment of the present technology.

FIG. 26 is a diagram schematically showing an example of a driving distance of a zoom lens computed by the during-exposure zoom setting unit 330 in accordance with the distance to and the type of a specific subject according to an eighth embodiment of the present technology.

FIG. 28 is a schematic diagram showing an example of an image displayed when the during-exposure zoom setting unit 330 determines that a size of a specific subject is not appropriate for a during-exposure zoom imaging operation in a zoom-in direction according to a ninth embodiment of the present technology.

FIG. 29 is a diagram schematically showing an example of an image captured by the imaging device 100 in a during-exposure zoom imaging operation in a zoom-in direction according to the ninth embodiment of the present technology.

FIG. 30 is a diagram schematically showing an example of an image captured by the imaging device 100 in a during-exposure zoom imaging operation in a zoom-out direction according to the ninth embodiment of the present technology.

FIG. 33 is a schematic diagram illustrating a size of a specific subject analyzed by the during-exposure zoom setting unit 330 according to a tenth embodiment of the present technology.

FIG. 34 is a schematic diagram showing an example of an image displayed when a size of a specific subject is determined not to be appropriate and when a during-exposure zoom imaging operation is determined to be performed after zoom-out according to the tenth embodiment of the present technology.

FIG. 40 is a diagram schematically showing examples of four operation modes of a during-exposure zoom imaging operation performed by the imaging device 100 according to an eleventh embodiment of the present technology.

FIG. 43 is a diagram schematically illustrating two operation modes set in accordance with a size of a specific subject according to the eleventh embodiment of the present technology.

FIG. 45 is a schematic diagram illustrating a movement of a specific subject in a direction orthogonal to the optical axis which is analyzed by the during-exposure zoom setting unit 330 according to a twelfth embodiment of the present technology.

FIG. 47 is a schematic diagram showing an example of computation of the start time and the end time of an exposure time of a during-exposure zoom imaging operation by the during-exposure zoom setting unit 330 according to the twelfth embodiment of the present technology.

DESCRIPTION OF EMBODIMENTS

Hereinafter, preferred embodiments (hereinafter referred to as "embodiments") of the present technology will be described. Description thereof will be provided in the following order.

1. First Embodiment (Imaging control: An example in which details of control of a during-exposure zoom imaging operation are set in accordance with a specific subject)

2. Second Embodiment (Imaging control: An example in which details of control of a during-exposure zoom imaging operation are set in accordance with the type of a recognized specific subject)

3. Third Embodiment (Imaging control: An example in which a during-exposure zoom imaging operation is started by selection of a user when a specific subject is analyzed not to be appropriate for the during-exposure zoom imaging operation)

4. Fourth Embodiment (Imaging control: An example in which the position of a specific subject is analyzed based on the distance from the center position of a captured image to the position of a specific subject)

5. Fifth Embodiment (Imaging control: An example in which the position and the size of a specific subject are analyzed by half-pressing of a shutter button and the movement amount thereof to the optical axis direction is analyzed by full-pressing thereof)

6. Sixth Embodiment (Imaging control: An example in which an operable range of a zoom lens is analyzed)

7. Seventh Embodiment (Imaging control: An example in which details of a during-exposure zoom imaging operation are set in accordance with a focal length)

8. Eighth Embodiment (Imaging control: An example in which details of a during-exposure zoom imaging operation are set in accordance with the distance between an imaging device and a specific subject (distance from a subject))

9. Ninth Embodiment (Imaging control: An example in which a zoom direction in a during-exposure zoom imaging operation is determined based on the size of a specific subject)

10. Tenth Embodiment (Imaging control: An example in which a during-exposure zoom imaging operation is performed after zoom-out when the size of a specific subject is excessively large)

11. Eleventh Embodiment (Imaging control: An example in which an operation mode of a during-exposure zoom imaging operation is determined based on information of a specific subject)

12. Twelfth Embodiment (Imaging control: An example in which a during-exposure zoom imaging operation is performed in accordance with a movement of a specific subject to the direction orthogonal to the optical axis)

1. First Embodiment

An Internal Configuration Example of an Imaging Device

Figure 1:
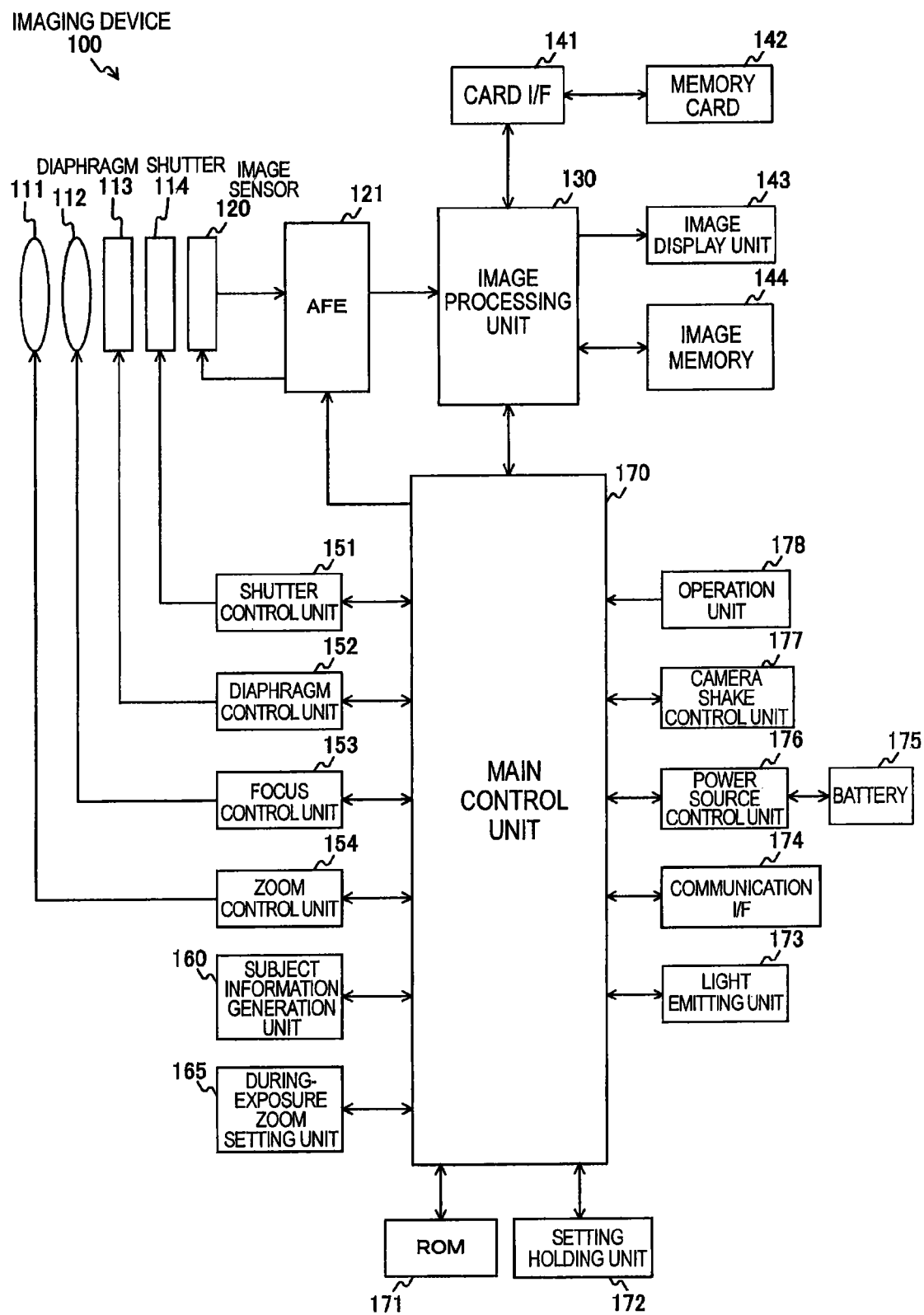
FIG. 1 is a schematic diagram showing an example of an internal configuration of an imaging device 100 according to a first embodiment of the present technology.

FIG. 1 is a schematic diagram showing an example of an internal configuration of an imaging device 100 according to a first embodiment of the present technology.

The imaging device 100 is an item (for example, a compact digital camera) which generates image data (digital data) after imaging a subject, and records the generated data as image content (still image content or moving image content). Note that, in FIG. 1, an internal configuration that is seldom used when capturing an image is not described for the sake of convenience.

The imaging device 100 includes a zoom lens 111, a focus lens 112, a diaphragm 113, a shutter 114, an image sensor 120, an AFE (Analog Front End) 121, an image processing unit 130, a card I/F (InterFace) 141, and a memory card 142. In addition, the imaging device 100 includes an image display unit 143, an image memory 144, a shutter control unit 151, a diaphragm control unit 152, a focus control unit 153, a zoom control unit 154, a subject information generation unit 160, and a during-exposure zoom setting unit 165. Moreover, the imaging device 100 includes a main control unit 170, a ROM (Read Only Memory) 171, a setting holding unit 172, a light emitting unit 173, a communication I/F 174, a battery 175, a power source control unit 176, a camera shake control unit 177, and an operation unit 178.

The zoom lens 111 is an item which adjusts a magnification of a subject to be included in a captured image by changing the focal length as the lens moves in the direction of the optical path.

The focus lens 112 is an item which adjusts focus as the lens moves in the direction of the optical axis.

The diaphragm 113 is a shielding object used to adjust the amount of light from a subject incident to the imaging device 100.

The shutter 114 is an item which opens and blocks the optical path of light incident from a subject to the image sensor 120 using a curtain moving in the upper and lower directions. The shutter 114 supplies light incident from a subject to the image sensor 120 when the optical path is open.

The image sensor 120 is an item that performs photoelectric conversion for light incident from a subject into an electric signal to generate an analog electric signal by sensing the light from the subject. In addition, the image sensor 120 is realized by, for example, a CMOS (Complementary Metal Oxide Semiconductor) sensor and a CCD (Charge Coupled Device) sensor.

The AFE 121 is an item which implements predetermined signal processing for an analog image signal supplied from the image sensor 120, for example, performs signal processing such as removal of noise in an analog image signal or amplification of such a signal. In addition, the AFE 121 converts an image signal that has undergone the signal processing into a digital signal to generate a digital image signal. Moreover, the AFE 121 generates a timing pulse with regard to an imaging operation of the image sensor 120 based on a reference clock supplied from the main control unit 170 so as to supply the generated timing pulse to the image sensor 120. This AFE 121 supplies a generated digital image signal (pixel value) to the image processing unit 130.

The image processing unit 130 is an item which implements predetermined signal processing for an image signal supplied from the AFE 121 so as to correct the image signal. The image processing unit 130 implements signal processing, for example, black level correction, defect correction, shading correction, color mixture correction, white balance correction, γ correction, demosaicing, or the like, for the image signal supplied from the AFE 121.

The card I/F 141 is an interface for enabling data transmission between the memory card 142 and the image processing unit 130.

The memory card 142 is a storing medium for retaining image signals and retains data supplied via the card I/F 141.

The image display unit 143 is an item which displays an image, and this image display unit 143 is constituted by, for example, a color liquid crystal panel. The image display unit 143 displays a captured image, a recorded image, a mode setting screen, and the like.

The image memory 144 is an item which temporarily retains captured image data. This image memory 144 is used, for example, as a work area for each signal processing in the image processing unit 130. In addition, the image memory 144 temporarily retains an image signal read from the memory card 142. The image memory 144 is realized by, for example, a DRAM (Dynamic Random Access Memory). Moreover, the image memory 144 is also used as a work area of the main control unit 170.

The shutter control unit 151 is an item which controls driving of the shutter 114 based on a control signal of the shutter 114 supplied from the main control unit 170. The shutter control unit 151, for example, supplies a driving signal to a motor (not shown) which drives the shutter so as to cause the shutter 114 to be open at a timing to open the shutter.

The diaphragm control unit 152 is an item which generates a signal for controlling driving of the diaphragm 113 based on information with regard to the diaphragm which is supplied from the main control unit 170. The diaphragm control unit 152 supplies the generated signal to a motor (not shown) which drives the diaphragm so as to change the degree of opening of the diaphragm.

The focus control unit 153 is an item which controls the position of the focus lens 112 in a barrel (not shown) so as to control focus. This focus control unit 153, for example, detects the current position of the focus lens 112 in the barrel. In addition, the focus control unit 153 computes an amount of driving of the focus lens 112 based on information on deviation of focus supplied from the main control unit 170 and the current position of the focus lens 112. After that, the focus control unit 153 drives a motor (not shown) which drives the focus lens 112 in accordance with the computed driving amount so as to move the focus lens 112.

The zoom control unit 154 is an item which controls the position of the zoom lens 111 in the barrel so as to control the focal length (the degree of zoom). This zoom control unit 154, for example, detects the current position of the zoom lens 111 in the barrel. In addition, the zoom control unit 154 computes an amount of driving of the zoom lens 111 based on information on the degree of zoom supplied from the main control unit 170 and the current position of the zoom lens 111. After that, the zoom control unit 154 drives a motor which drives the zoom lens 111 in accordance with the computed driving amount so as to move the zoom lens 111.

The subject information generation unit 160 is an item which generates information on a subject to be included in a captured image. This subject information generation unit 160, for example, detects a specific subject (for example, the face of a person, a figure, an animal, or the like) of a subject to be included in a captured image using an existing subject recognition technique so as to generate information (subject information) of the size, position, or the like of the detected captured image of the subject.

The during-exposure zoom setting unit 165 is an item which performs setting for a during-exposure zoom imaging operation. This during-exposure zoom setting unit 165, for example, sets a zoom amount, a zoom speed, and an exposure time during the during-exposure zoom imaging operation based on subject information in an image captured before imaging using the during-exposure zoom imaging operation.

Herein, a during-exposure zoom imaging operation will be described. The during-exposure zoom imaging operation refers to an imaging operation in which the zoom lens is moved (zooming) from opening of the shutter (start of exposure) to closing thereof (end of exposure). When this during-exposure zoom imaging operation is performed, a flow in a radial shape occurs in a captured image, which causes a sense of movement in the captured image. In addition, since this effect is slight around the center of the captured image (the scope should be an area of a predetermined range including the center point of the captured image, and the same applies hereinafter), it is possible to focus on an object (subject) imaged around the center of the captured image. In addition, an example of a captured image using the during-exposure zoom imaging operation will be described with reference to FIG. 9.

The main control unit 170 is an item which controls the operation of each unit of the imaging device 100 and causes each unit to operate based on a control program recorded on the ROM 171. The main control unit 170 is configured to be, for example, a micro-computer including a CPU (Central Processing Unit).

The ROM 171 is an item on which the control program for controlling the operation of each unit of the imaging device 100 is recorded.

The setting holding unit 172 is an item which retains information of setting of the imaging device 100 that is set by a user. This setting holding unit 172 is configured to be, for example, a non-volatile memory (for example, a flash memory) on which data can be deleted and recorded.

The light emitting unit 173 is an auxiliary light source for supplementing insufficiency of an amount of light by emitting light when the amount of light is insufficient.

The communication I/F 174 is an interface for enabling data transfer between an external device and the main control unit 170.

The battery 175 is an item which supplies power for operating the imaging device 100, and is configured to be, for example, a secondary battery such as a nickel-hydrogen rechargeable battery. In addition, the battery 175 supplies power to the power source control unit 176.

The power source control unit 176 is an item which controls the supply of power to each unit, which is essential for each unit to be operated in the imaging device 100. The power source control unit 176 converts a voltage of power supplied from the battery 175 to an operation voltage of each unit in the imaging device 100. When the main control unit 170 is operated with a voltage of 6 V, for example, the power source control unit 176 generates the voltage of 6 V and supplies the generated voltage to the main control unit 170. In addition, the power source control unit 176 supplies the generated voltage to each unit of the imaging device 100. Note that, in FIG. 1, a part of the power source supply line from the power source control unit 176 to each unit is omitted.

The camera shake control unit 177 is an item which detects camera shake of the imaging device 100 and controls each unit of the imaging device 100 so as to reduce the influence of the detected camera shake on a captured image. For example, the camera shake control unit 177 detects camera shake of the imaging device 100 using a gyro sensor, and causes the position of the image sensor 120 to move in accordance with the detected camera shake so as to reduce the influence of the camera shake on a captured image.

The operation unit 178 is an item which receives operations of a user, and when a shutter button (not shown) is pressed, for example, supplies a signal informing of the pressing to the main control unit 170. In addition, the operation unit 178 supplies a signal for an operation of a user to the main control unit 170.

[Functional Configuration Example of an Imaging System]

Figure 2:
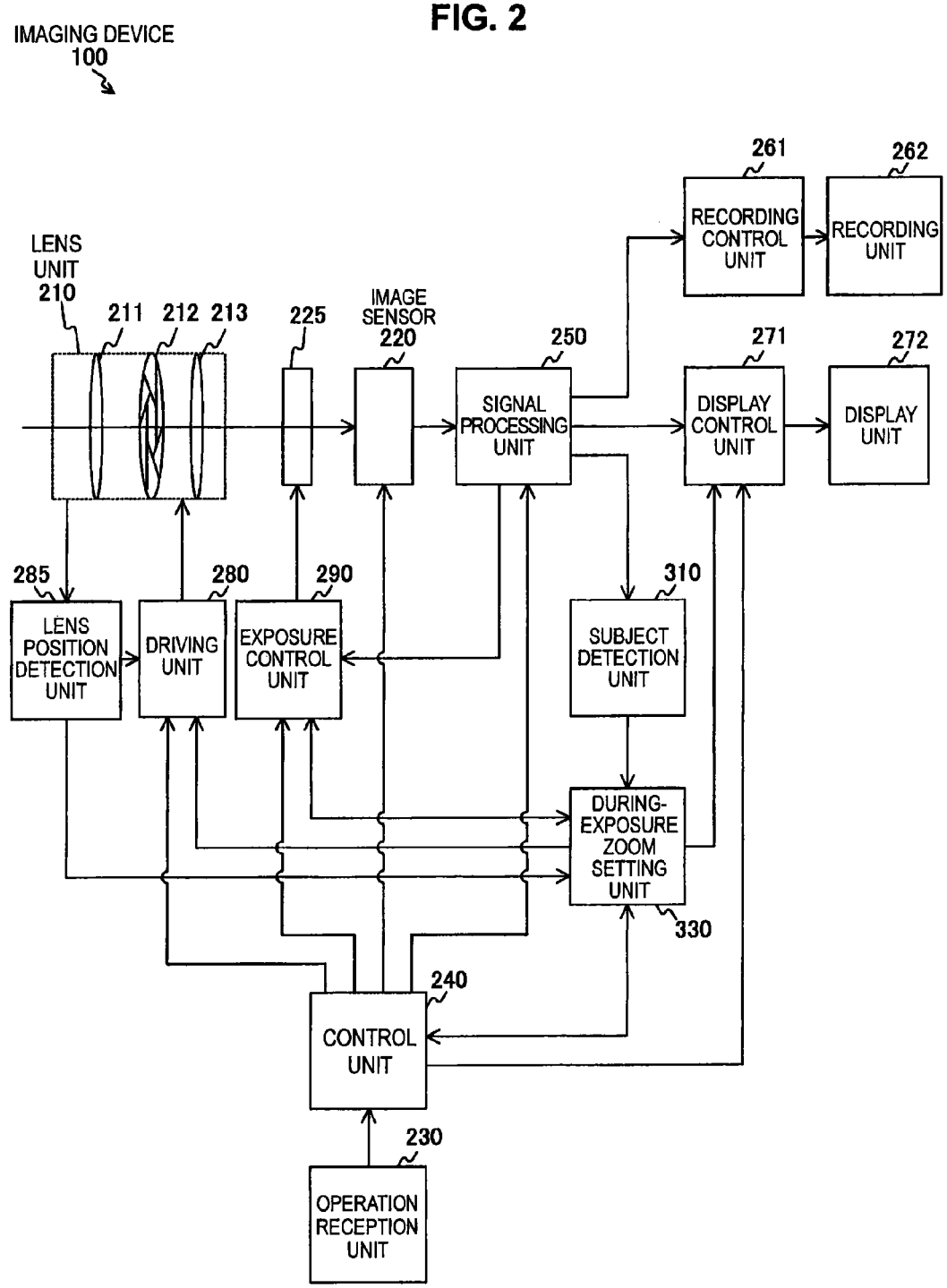
FIG. 2 is a block diagram showing an example of a functional configuration of the imaging device 100 according to the first embodiment of the present technology.

FIG. 2 is a block diagram showing an example of a functional configuration of the imaging device 100 according to the first embodiment of the present technology.

In the drawing, each configuration from selection of a during-exposure zoom mode by a user to recording of an image captured in the during-exposure zoom imaging operation in this mode will be described. Note that, in the first embodiment of the present technology, description will be provided on the assumption that, in a live view operation, a focus target is automatically focused, and imaging is performed in the during-exposure zoom imaging operation by pressing (one-time pressing) of the shutter button.

Herein, the during-exposure zoom mode will be described. The during-exposure zoom mode is a mode for executing the during-exposure zoom imaging operation. When a user selects this mode, a captured image acquired before the execution of imaging in the during-exposure zoom imaging operation (for example, an image acquired for live view display) is analyzed, and a guide is displayed so as to attain a proper composition for the during-exposure zoom imaging operation. In addition, when a composition is decided (for example, when the shutter button is pressed), an operation of the zoom lens during exposure (the amount and the speed of zooming) and the exposure time are decided, and then the during-exposure zoom imaging operation is performed by the decided operation.

The imaging device 100 includes a lens unit 210, a shutter 225, an image sensor 220, an operation reception unit 230, a control unit 240, a signal processing unit 250, a recording control unit 261, a recording unit 262, a display control unit 271, and a display unit 272. In addition, the imaging device 100 includes a subject detection unit 310, a during-exposure zoom setting unit 330, a driving unit 280, a lens position detection unit 285, and an exposure control unit 290.

The lens unit 210 is a unit for collecting light from a subject (subject light). This lens unit 210 includes a zoom lens 211, a diaphragm 212, and a focus lens 213.

The zoom lens 211 is an item which adjusts a magnification of a subject to be included in a captured image by changing the focal length as the lens moves in the optical axis direction by driving of the driving unit 280, and corresponds to the zoom lens 111 shown in FIG. 1. A current position of this zoom lens 211 in the barrel is detected by the zoom position detection unit 285. Note that the detected current position is used in, for example, computation of a current zoom magnification, or the like.

The diaphragm 212 is a shielding object used to adjust the amount of light from a subject incident to the imaging device 100, and corresponds to the diaphragm 113 shown in FIG. 1.

The focus lens 213 is an item which adjusts focus as the lens moves in the optical axis direction, and corresponds to the focus lens 112 shown in FIG. 1. A current position of this focus lens 213 in the barrel is detected by the lens position detection unit 285. Note that the detected current position is used in, for example, computation of a movement destination of the lens in focus control.

The shutter 225 is an item which controls an exposure time of the image sensor 220 using a curtain moving in the upper and the lower directions, and corresponds to the shutter 225 shown in FIG. 1.

The image sensor 220 is an item which performs photoelectric conversion on light incident from a subject into an electric signal, and corresponds to the image sensor 120 shown in FIG. 1.

The operation reception unit 230 is an item which receives an operation of a user, and corresponds to the operation unit 178 shown in FIG. 1. When this operation reception unit 230 receives a selection operation to set the during-exposure zoom mode, for example, the operation reception unit 230 supplies a signal informing of the selection operation to the control unit 240. In addition, when the shutter button (not shown) is pressed, the operation reception unit 230 supplies a signal informing of the pressing to the control unit 240.

The control unit 240 is an item which controls the operation of each unit of the imaging device 100. Note that, in FIG. 2, only main signal lines are depicted, and others are not. When an operation signal for starting the during-exposure zoom mode is received, for example, the control unit 240 supplies a signal for displaying a live view (a real-time (monitoring) image of the figure of a subject of which light is sensed by the image sensor) to the image sensor 220, the signal processing unit 250, and the display control unit 271. In addition, when the operation signal for starting this mode is received, the control unit 240 supplies a signal for analyzing a composition of a captured image based on information of an object (subject) included in an image captured for a live view (live view image) to the during-exposure zoom setting unit 330. In addition, using this live view image, the control unit 240 matches the focus with (performs focusing on) an object in a focus area (a range for designating a target to be focused) using a contrast system (the focusing relationship is not shown). In this case, the control unit 240 supplies information of driving of the focus lens 213 to the driving unit 280 so as to drive the focus lens 213.

In addition, when the shutter button is pressed in the during-exposure zoom mode, the control unit 240 supplies a signal for starting the during-exposure zoom imaging operation (zoom imaging start signal) to the image sensor 220, the signal processing unit 250, and the during-exposure zoom setting unit 330. In addition, when information indicating that details of control of the during-exposure zoom imaging operation have been decided is supplied from the during-exposure zoom setting unit 330, the control unit 240 performs the during-exposure zoom imaging operation by controlling the driving unit 280, the exposure control unit 290, the image sensor 220, and the signal processing unit 250. Note that the control unit 240 corresponds to the main control unit 170 shown in FIG. 1.

The signal processing unit 250 is an item which corrects an image signal by performing predetermined signal processing on an electric signal supplied from the image sensor 220. For example, after converting the electric signal supplied from the image sensor 220 into a digital electric signal (pixel value), this signal processing unit 250 performs signal processing such as black level correction, defect correction, shading correction, color mixture correction, white balance correction, γ correction, or demosaicing. The signal processing unit 250 supplies an image signal to be recorded on the recording unit 262 (for example, a signal of a captured image captured in a during-exposure zoom imaging operation) among signals of the captured image (image signals) that are processed for correction in this manner to the recording control unit 261. In addition, the signal processing unit 250 supplies an image signal to be displayed on the display unit 272 (for example, a signal of a live view image) among the captured images that are processed for correction in this manner to the display control unit 271. In addition, the signal processing unit 250 supplies an image signal to be used in deciding a composition and zoom setting in a during-exposure zoom imaging operation (for example, a signal of a live view image captured in the during-exposure zoom mode) among the captured images that are processed for correction in this manner to the subject detection unit 310. Note that the signal processing unit 250 corresponds to the AFE 121 and the image processing unit 130 shown in FIG. 1.

The recording control unit 261 is an item which controls recording of image content (image files) on the recording unit 262. When an image signal of an image captured in a during-exposure zoom imaging operation is supplied from the signal processing unit 250, for example, this recording control unit 261 implements a compression process on the image signal in a JPEG (Joint Photographic Experts Group) format. Then, the recording control unit 261 supplies the data that has undergone the compression process (recorded image data) to the recording unit 262 so as to be recorded on the recording unit 262. Note that the recording control unit 261 corresponds to the image processing unit 130 shown in FIG. 1.

The recording unit 262 is an item which records the recorded image data supplied from the recording control unit 261 as image content. As this recording unit 262, for example, a removable recording medium (one or a plurality of recording media) such as a disc including a DVD (Digital Versatile Disk) or a semiconductor memory including a memory card can be used. In addition, such a recording medium may be built in the imaging device 100 or may be detachable from the imaging device 100. Note that the recording unit 262 corresponds to the memory card 142 shown in FIG. 1.

The display control unit 271 is an item which controls an output of display on the display unit 272. When an image signal is supplied from the signal processing unit 250, this display control unit 271 generates an image to be displayed based on this image signal, and supplies the generated image data (display image data) to the display unit 272 to display a display image.

In addition, when a command for displaying a guide display (guide display command) has been supplied from the during-exposure zoom setting unit 330, for example, the display control unit 271 generates the guide display based on this guide display command. Then, the display control unit 271 generates display image data based on the generated guide display and a live view image, and supplies this display image data to the display unit 272 to display a live view image with a guide.

The display unit 272 is an item which displays various images based on the display image data supplied from the display control unit 271. This display unit 272 is realized as, for example, a color liquid crystal panel, and displays captured images, various setting screens, and the like. Note that the display unit 272 corresponds to the image display unit 143 shown in FIG. 1.

The subject detection unit 310 is an item which detects a specific subject (specific subject) included in a captured image by analyzing the captured image. When the face of a person is set as a specific subject, for example, the subject detection unit 310 detects the face of the person (specific subject) included in a captured image to be analyzed. In addition, the subject detection unit 310 detects the size and the position of the detected specific subject in the captured image. Note that the subject detection unit 310 recognizes the recognition of a subject using, for example, an existing subject recognition technology (refer to, for example, JP2009-212980A and JP2010-67102A). The subject detection unit 310 detects a specific subject from a captured image by, for example, matching a template on which luminance distribution information of the specific subject (for example, the face thereof) with a captured image. Note that, in the first embodiment of the present technology, description is provided on the assumption that the face of a person is a specific subject, but when a plurality of objects (for example, an animal, a vehicle, and the like, in addition to the face of a person) can be respectively recognized, the objects are recognized. Note that a case in which a plurality of objects can be recognized will be described with reference to FIGS. 13 and 14 as a second embodiment of the present technology. The subject detection unit 310 supplies a detection result to the during-exposure zoom setting unit 330.

Before the during-exposure zoom imaging operation is started, the during-exposure zoom setting unit 330 is an item which sets (decides) details of zooming (details of control) in a during-exposure zoom imaging operation based on information of a specific subject included in a captured image captured immediately before the during-exposure zoom imaging operation before the during-exposure zoom imaging operation is started. In addition, the during-exposure zoom setting unit 330 analyzes whether or not a composition of a captured image is appropriate for the during-exposure zoom imaging operation in a live view operation in the during-exposure zoom mode.

During the analysis of this composition, the during-exposure zoom setting unit 330 analyzes whether or not the position of the specific subject in the captured image is appropriate for the during-exposure zoom imaging operation based on information of the specific subject (subject information), and when it is not appropriate, generates a guide display command for displaying a guide to advise a user to change the position of the specific subject. In addition, in the analysis, the during-exposure zoom setting unit 330 analyzes whether or not the size (largeness) of the specific subject is appropriate for the during-exposure zoom imaging operation, and when it is not appropriate, generates a guide display command for displaying a guide to advise the user to change the size of the specific subject. The during-exposure zoom setting unit 330 supplies the generated guide display command to the display control unit 271 so as to cause a live view image with a guide display to be displayed. Note that, an example of analysis of the position of the specific subject and the guide display regarding the position will be described with reference to FIGS. 3(*a*) and 4(*a*). In addition, an example of analysis of the size of the specific subject and a guide display when the size is not appropriate will be described with reference to FIGS. 3(*b*) and 5(*b*). Subject information will be described with reference to FIG. 6.

Note that, in the first embodiment of the present technology, when the position or the size of the specific subject is not appropriate, the during-exposure zoom imaging operation is considered difficult to start. In other words, the during-exposure zoom setting unit 330 determines whether or not the during-exposure zoom imaging operation is to be executed based on the specific subject.

In addition, when a zoom imaging start signal is supplied from the control unit 240, the during-exposure zoom setting unit 330 checks the composition again based on the subject information in the captured image at the time when the zoom imaging start signal is supplied or immediately thereafter. Note that, in the re-checking of the composition, the during-exposure zoom setting unit 330 analyzes whether or not the movement speed of the specific subject in the optical axis direction (optical axis direction movement speed) is appropriate for the during-exposure zoom imaging operation. This optical axis direction movement speed will be described with reference to FIG. 5.

Then, after re-checking the composition, the during-exposure zoom setting unit 330 computes (determines) the zoom amount in the during-exposure zoom imaging operation based on the subject information. In the computation of the zoom amount, the during-exposure zoom setting unit 330 computes the degree of a change in a zoom magnification based on the size and the position of the specific subject.

In addition, the during-exposure zoom setting unit 330 computes (determines) the zoom speed and an exposure time based on the subject information, information on the exposure time supplied from the exposure control unit 290 (exposure time information), and the computed zoom amount. When the specific subject stands still, for example, the during-exposure zoom setting unit 330 computes the zoom speed so that zooming changes to the extent of the zoom amount computed for the exposure time indicated in the exposure time information. In addition, when the specific subject moves in the optical axis direction, the during-exposure zoom setting unit 330 newly determines the exposure time in accordance with the movement speed, and computes the zoom speed so that zooming changes to the zoom amount computed for the determined exposure time. The relationship between the movement speed of the specific subject, the zoom speed, and the exposure time will be described with reference to FIG. 8.

In other words, when the zoom imaging start signal is supplied, the during-exposure zoom setting unit 330 finally confirms the composition and decides the details of control of zooming based on the subject information of the captured image prior to start of the during-exposure zoom imaging operation. Then, the during-exposure zoom setting unit 330 supplies the computed zoom amount (the degree of the change in the zoom magnification) and the zoom speed to the driving unit 280. In addition, the during-exposure zoom setting unit 330 supplies the newly computed exposure time to the exposure control unit 290. In addition, the during-exposure zoom setting unit 330 transmits information indicating that the details of control of zooming have been decided to the control unit 240, and causes the control unit 240 to perform a process of starting imaging for the during-exposure zoom imaging operation. Note that the during-exposure zoom setting unit 330 corresponds to the during-exposure zoom setting unit 165 shown in FIG. 1. In addition, the control unit 240, the display control unit 271, and the during-exposure zoom setting unit 330 are examples of the decision unit described in the claims.

The driving unit 280 is an item which drives lenses in the lens unit 210. This driving unit 280, for example, computes the driving distance of the zoom lens 211 (for example, 5 mm on a telescopic-end side) based on the zoom amount (the degree of a change of zoom magnification) supplied from the during-exposure zoom setting unit 330 for the during-exposure zoom imaging operation. Then, the driving unit 280 moves the zoom lens 211 to the extent of the driving distance computed during the exposure period for the during-exposure zoom imaging operation based on the zoom speed supplied from the during-exposure zoom setting unit 330.

The lens position detection unit 285 is an item which detects the positions of the zoom lens 211 and the focus lens 213 in the barrel. This zoom position detection unit 285 supplies information on the detected positions of the focus lens 213 and the zoom lens 211 to the driving unit 280. In addition, when the during-exposure zoom setting unit 330 needs information on the position of the zoom lens 211, the lens position detection unit 285 supplies the information on the position of the zoom lens 211 to the during-exposure zoom setting unit 330. Note that, in the first embodiment of the present technology, an example is described in which the during-exposure zoom setting unit 330 does not use the information on the position of the zoom lens 211. An example in which the information on the position of the zoom lens 211 is used will be described as sixth to eighth embodiments of the present technology.

The exposure control unit 290 is an item which controls the exposure time of the image sensor 220 by controlling a timing at which the shutter 225 is to be open and closed. This exposure control unit 290 computes a proper amount of light (Automatic Exposure (AE)) based on image data supplied from the image sensor 220. Then, the exposure control unit 290 computes the exposure time of the image sensor 220 based on the computed amount of light, and opens or closes the shutter 225 based on the computed exposure time so as to control the exposure time for the during-exposure zoom imaging operation.

In addition, when information on the exposure time (exposure time information) is supplied from the during-exposure zoom setting unit 330, the exposure control unit 290 opens or closes the shutter 225 based on the supplied exposure time so as to control the exposure time for the during-exposure zoom imaging operation.

In this manner, by providing the during-exposure zoom setting unit 330, setting on the during-exposure zoom imaging operation (details of control) can be decided based on information on a subject included in a captured image.

Next, a composition (the position and the size of a specific subject) analyzed by the during-exposure zoom setting unit 330 will be described with reference to FIG. 3.

[An Example of Detecting the Position and the Size of a Specific Subject Appropriate for a During-Exposure Zoom Imaging Operation]

FIG. 3 is a schematic diagram for describing the position and the size of a specific subject analyzed by the during-exposure zoom setting unit 330 according to the first embodiment of the present technology.

FIG. 3(*a*) shows an image (image 410) for describing the position of the specific subject analyzed by the during-exposure zoom setting unit 330. In this image 410, the face (face 412) of one person is shown around the center of the image 410. In addition, in this image 410, a frame (frame 411) which defines a center region (center range) in a captured image is shown.

The range (center range) surrounded by the frame 411 is a range (region) defined as a center area (central periphery) in the captured image generated by the imaging device 100. In this center range, for example, a range of which the height is 50% of that of the captured image and the width is 50% of that of the captured image is set in the central periphery of the captured image (a region in the central periphery of the captured image which is equivalent to ¼ of the area of the captured image).

For example, when there is one specific subject and 50% or more of the specific subject (face 412) falls within the center range indicated by the frame 411, the during-exposure zoom setting unit 330 determines that the position of the specific subject is appropriate for the during-exposure zoom imaging operation. Note that this also applies to a specific subject other than a face, so that when a dog is a specific subject, and 50% or more of the whole dog (specific subject) falls within the center range, the position of the subject is determined to be appropriate for the during-exposure zoom imaging operation. In addition, when the number of specific subjects is plural and at least one or more specific subjects fall within the center range, the position of the subject is determined to be appropriate for the during-exposure zoom imaging operation. In other words, when a predetermined ratio or more of a specific subject falls within a predetermined range (within the center range) of which the center corresponds to the center position of a captured image or to the periphery thereof, the during-exposure zoom setting unit 330 determines that the position of the subject is appropriate for (execution of) a during-exposure zoom imaging operation.

Herein, a position of a specific subject in a during-exposure zoom imaging operation will be described. In the during-exposure zoom imaging operation, zooming is performed during exposure of the image sensor, and an image captured in a radial shape beginning from the center of a captured image flows. With regard to a change in this image, the change (flow in a radial shape) is shown slightly in an image (image at a position in which the image height is low) in the central periphery of the captured image, and the change is shown greatly in an image (image at a position in which the image height is high) near the edge of the captured image. In this manner, since the change is shown slightly in the image in the central periphery of the captured image, it is possible to generate an image in which a specific subject imaged in the central periphery of the captured image is set as a subject not to beed. In other words, since the specific subject outside of the central periphery of the image flows severely, when the specific subject is not positioned in the central periphery, an image of the specific subject that a user wants not to beed flows severely and a dissatisfying image is formed (an appropriate image is not formed).

Thus, the during-exposure zoom setting unit 330 analyzes whether or not the position of a specific subject is in the central periphery of an image, and when the specific subject is positioned in the central periphery, determines that the position of the specific subject is appropriate for a during-exposure zoom imaging operation. Note that, when the number of specific subjects is plural, and one or more specific subjects are positioned in the central periphery, it is determined that the positions of the specific subjects are appropriate for a during-exposure zoom imaging operation.

FIG. 3(*b*) shows an image (image 420) for describing a size of a specific subject analyzed by the during-exposure zoom setting unit 330. In this image 420, the face (face 422) of one person is shown as a specific subject. In addition, in this image 420, a frame (frame 421) for defining the upper limit of the size of the specific subject in a captured image is shown.

The range surrounded by the frame 421 (size range) is a range for defining the upper limit of the size of the specific subject in the captured image generated by the imaging device 100. For the size range, for example, a range obtained by excluding 5% of the upper edge, 5% of the lower edge, 5% of the left edge, and 5% of the right edge of the captured image is set. The during-exposure zoom setting unit 330 determines that the size of the specific subject is appropriate for the during-exposure zoom imaging operation when both of the upper and lower limits of the specific subject fall within the size range, and when the left and right edges of the specific subject fall within the size range (including all of the four corners).

Herein, a size of a specific subject in a during-exposure zoom imaging operation will be described. As described in FIG. 3(*a*), the image of the subject flows in a radial shape beginning from the center of the captured image in the during-exposure zoom imaging operation. Since imaging is performed while zooming in the during-exposure zoom imaging operation, an imaged object around an edge of the captured image at the start of exposure comes out from the captured image during exposure. In other words, if the size of the specific subject is excessively large when the whole of the specific subject is desired to be included in the captured image (for example, when four corners thereof belong to the captured image at the start of the exposure), a part of the specific subject runs over the captured image in the middle of the during-exposure zoom imaging operation, which results in a dissatisfying image being formed (an inappropriate image being formed).

Thus, the during-exposure zoom setting unit 330 analyzes whether or not the size of the specific subject is excessively large, and when the size is not excessively large, determines that the size of the specific subject is appropriate for the during-exposure zoom imaging operation.

As shown in FIGS. 3(*a*) and 3(*b*), the during-exposure zoom setting unit 330 analyzes the composition (the position and the size of the specific subject) in the during-exposure zoom imaging operation. Then, when the analysis result is not appropriate for the during-exposure zoom imaging operation, guide display is performed to inform the user of this so as to prompt the user to correct the position and the size of the specific subject.

Next, guide display on the position of a specific subject and guide display on the size thereof will be described with reference to FIG. 4.

[An Example of Guide Display]

FIG. 4 is a schematic diagram showing an example of an image displayed on the display unit 272 when the during-exposure zoom setting unit 330 according to the first embodiment of the present technology determines that the position of the specific subject is not appropriate or the size of the specific subject is not appropriate.

FIG. 4(*a*) shows a live view image (image 430) with a guide display displayed on the display unit 272 when the during-exposure zoom setting unit 330 analyzes that the position of the specific subject is not appropriate during a live view operation in a during-exposure zoom mode. In this image 430, the face of one person (face 432) is shown near the right end of the image 430 as a specific subject. In addition, the image 430 shows a frame (frame 431) defining the center region (center range) in a captured image, a region for display text to inform a user (a text display region 434), and an arrow (arrow 435) showing a direction in which the position of the specific subject is to be displaced.

The frame 431 is a frame defining the center range in the same manner as the frame 411 shown in FIG. 3(*a*). By displaying the frame 431 with the live view image, it is possible for a user to visually recognize what type of a composition for disposing the specific subject is better.

The text display region 434 is a region for displaying text to inform the user, and displays a desired operation (disposing the specific subject around the center) to the user using in the form of text.

The arrow 435 is an arrow showing the direction in which the position of the specific subject is displaced (moved), and is displayed so that the head of the arrow faces the center direction of the captured image and the tail thereof faces the specific subject between the position of the specific subject and the central position of the captured image. The user can put the specific subject in the center range by, for example, re-settling the imaging device 100 so that the specific subject is moved in the direction indicated by the arrow 435.

In this manner, when the position of the specific subject is detected not to be appropriate in the live view operation in the during-exposure zoom mode, the imaging device 100 causes the display unit 272 to display the live view image with guide display as shown in this image 430.

FIG. 4(*b*) shows a live view image (image 440) with guide display displayed on the display unit 272 when the during-exposure zoom setting unit 330 analyzes that the size of the specific subject is not appropriate during the live view operation. This image 440 shows the face (face 442) of one person large around the center of the image 440 as a specific subject. In addition, this image 440 shows a frame (frame 441) for defining the upper limit of a size and a text display region (text display region 444). Note that, since the text display region 444 is the same as the text display region 434 shown in FIG. 4(a), description thereof will be omitted herein.

The frame 441 is a frame of a range for defining the upper limit of the size of the specific subject in the same manner as the frame 421 shown in FIG. 3(b). It is possible for the user to visually recognize the upper limit of the size of the specific subject when the frame 441 is displayed with the live view image.

In this manner, the imaging device 100 causes the display unit 272 to display the live view image with guide display as shown in this image 440 when the size of the specific subject is detected not to be appropriate in the live view operation in the during-exposure zoom mode.

[An Example of Warning Display on a Movement Speed of a Specific Subject]

FIG. 5 is a schematic diagram showing an example of an image displayed on the display unit 272 when the during-exposure zoom setting unit 330 according to the first embodiment of the present technology determines that the movement speed of a specific subject is not appropriate.

FIG. 5 shows a warning image (image 460) displayed on the display unit 272 when the movement speed of the specific subject is analyzed not to be appropriate immediately before the start of a during-exposure zoom imaging operation. In addition, FIG. 5 shows an image (image 450) captured shortly before capture of the image 460 (for example, the last image of a captured image in a live view operation). From the time after the shutter button is pressed to the time when the during-exposure zoom imaging operation is started, the during-exposure zoom setting unit 330 analyzes whether or not the position, the size, and the movement speed of the specific subject are appropriate for the during-exposure zoom imaging operation.

The image 450 shows the specific subject (face 452), and the image 460 shows a specific subject (face 462), and a text display region (text display region 464). In addition, the image 450 and the image 460 show arrows (an arrow 453 and an arrow 463) indicating the width of the specific subject.

From the time after the shutter button is pressed to the time when the during-exposure zoom imaging operation is started, the during-exposure zoom setting unit 330 analyzes whether or not the movement speed of the specific subject is appropriate for the during-exposure zoom imaging operation. In the analysis, when the movement speed is excessively high (for example, greater than a threshold value), the during-exposure zoom setting unit 330 determines that the movement speed of the specific subject is not appropriate for the during-exposure zoom imaging operation. Then, the during-exposure zoom setting unit 330 that has determined that the speed is not appropriate displays a warning image as shown in the image 460 and then stops starting of the during-exposure zoom imaging operation.

Herein, the analysis of the movement speed of the specific subject will be described. The analysis of the movement speed of the specific subject is performed by the during-exposure zoom setting unit 330, for example, detecting a change in the size of the specific subject between a plurality of captured images. For example, the during-exposure zoom setting unit 330 detects a changed amount between the width (arrow 453) of the specific subject in the image (image 450) captured shortly before capture of the image 460 and the width (arrow 463) of the specific subject in the captured image (image 460) immediately before the start of the during-exposure zoom imaging operation.

In addition, the during-exposure zoom setting unit 330 retains information (characteristics) of the correlation between the change in the distance from a subject and a change amount of an image in advance. Then, the during-exposure zoom setting unit 330 computes the movement distance of the subject based on the characteristics and the width of the specific subject. Then, the during-exposure zoom setting unit 330 computes the movement speed of the specific subject based on the interval (elapsed time) of the times when two captured images are acquired used in the computation of the change amount of the width of the specific subject and the computed movement distance of the subject. After that, the during-exposure zoom setting unit 330 analyzes whether or not the movement speed of the specific subject is a speed available for a during-exposure zoom imaging operation by comparing a drivable speed of the zoom lens 211 to the computed movement speed of the specific subject. In other words, in this analysis, it is analyzed whether or not an image of an object other than the specific subject (background) can be imaged so that it seems to be flowing more than an image of the specific subject moving in the optical axis direction seems to. The movement speed thereof is determined not to be appropriate, for example, when the movement speed of the specific subject is higher than the driving speed of the zoom lens 211 and the focus lens 213, or when the movement speed of the specific subject is too high to secure an exposure time required to generate flow of an image of the background.

In this manner, from the time after the shutter button is pressed to the time when the during-exposure zoom imaging operation is started, the during-exposure zoom setting unit 330 analyzes whether or not the movement speed of the specific subject is appropriate for the during-exposure zoom imaging operation (prior checking). Then, when the movement speed is determined not to be appropriate, after the warning image as shown in the image 460 is displayed, the start of the during-exposure zoom imaging operation is stopped.

Note that, in the analysis of the prior checking, even when it is detected that the specific subject is not present around the center of the captured image, or that the size thereof is excessively large, warning as shown in the image 460 is given (text thereof is changed in a timely manner) to stop the start of the during-exposure zoom imaging operation.

In addition, in FIG. 5, the movement speed is computed using the size of the specific subject, but it is not limited thereto. It is assumed that the focus is matched (focused) to the specific subject. Thus, it may be configured that the focal lengths and the distances to the subject in two captured images are computed from information of the positions of the focus lens 213 and the zoom lens 211, and then the movement speed of the specific subject is computed from the changed amount of the computed distance to the subject and the elapsed time between the two captured images.

Herein, the computation of this movement speed will be described. When the distance to a subject is set to a, the distance from a lens to an image formed on the image sensor 220 is set to b, and the focal length of the lens is set to f, the following Formula 1 is satisfied.

$$(1/a)+(1/b)=1/f \quad \text{Formula 1}$$

In other words, b and f are computed from positional information of the focus lens 213 and the zoom lens 211 at a timing of imaging. Then, using Formula 1, the distance to a subject $a=1/((1/f)-(1/b))$ can be obtained. In addition, by computing the distance to a subject in a plurality of images, a change in the distance to a subject can be computed. Based on the change in the distance to a subject computed in this manner, the movement speed of a specific subject in the optical axis direction can be computed. Specifically, when a changed amount of the distance to a subject (movement amount of a subject) is set to DC1, and an interval of times (elapsed time) when the distances to a subject are acquired is set to t, the speed of the subject (subject speed V) at each time can be obtained using the following Formula 2.

$$V=DC1/t \qquad \text{Formula 2}$$

In this manner, the during-exposure zoom setting unit 330 computes the movement speed of a specific subject and analyzes whether or not the movement speed of the specific subject is appropriate for a during-exposure zoom imaging operation.

[An Example of Subject Information]

FIG. 6 is a diagram schematically showing an example of subject information used in the during-exposure zoom setting unit 330 according to the first embodiment of the present technology.

The table shown in FIG. 6 shows subject numbers (column 511) for identifying specific subjects detected by the subject detection unit 310, and sizes (column 512) indicating the largeness of subjects. Furthermore, this table shows positions (column 513) indicating the positions of the subjects in a captured image, and optical axis direction movement speed (column 514) indicating the movement speed of the subjects in the optical axis direction.

Herein, the computation of subject information will be described using the table shown in FIG. 6. First, when data of a captured image is supplied from the signal processing unit 250 in the during-exposure zoom mode, the subject detection unit 310 detects specific subjects included in the captured image, and assigns a unique identifying number (column 511) to each detected specific subject.

Further, the subject detection unit 310 detects the sizes (heights and widths in the captured image) or the areas (the largeness of a region recognized to be a subject), and the positions (XY positions when a predetermined position is set to the origin (for example, the lower left corner) in the captured image) of the detected specific subjects. For example, the height and the width of a rectangle are used for a size when a specific subject is recognized to be the rectangle, and the center of the rectangle is used for a position.

Then, the subject detection unit 310 supplies information of the detected specific subjects to the during-exposure zoom setting unit 330. Note that captured images continuous in a time series manner are supplied from the signal processing unit 250 to the subject detection unit 310, but a subject is detected so that the same subject number is given to the same specific subject in the different captured images.

Next, the during-exposure zoom setting unit 330 detects the movement speed of the subjects detected by the subject detection unit 310 in the optical axis direction. Note that since the computation of the optical axis direction movement speed has been described in FIG. 5, description thereof will be omitted herein.

In this manner, the sizes, the positions, and the optical axis direction movement speed of the subjects included in the captured images are computed by the subject detection unit 310 and the during-exposure zoom setting unit 330. Then, based on the computed subject information, decision on a composition and computation of zoom setting are performed for a during-exposure zoom imaging operation.

Next, setting of a during-exposure zoom imaging operation (a zoom amount, a zoom speed, and an exposure time) computed by the during-exposure zoom setting unit 330 will be described with reference to FIGS. 7 and 8.

[A Setting Example of a Movement Amount of a Zoom Lens]

FIG. 7 is a diagram schematically showing the movement amount (zoom amount) of the zoom lens 211 computed by the during-exposure zoom setting unit 330 according to the first embodiment of the present technology.

FIG. 7(*a*) shows a table indicating the relationship between the size and the number of a specific subject included in a captured image and a movement amount of the zoom lens 211.

The horizontal axis of the table (table 520) shown in FIG. 7(*a*) shows the size of a specific subject (column 522) and the vertical axis thereof shows the number of the specific subjects (column 521). In addition, each cell of the table schematically shows zoom amounts. Note that the size of specific subjects when the number of the specific subjects is plural indicates the average value of the sizes of the plurality of the subjects.

As shown in the table 520, the during-exposure zoom setting unit 330 sets a zoom amount (zoom magnification) to be smaller than a standard value when the size is small and the number thereof is plural (upper right side), when the size is large and the number thereof is plural (upper left side), and when the size is large and the number thereof is single (lower left side). Using this setting, it is possible to prevent running a part of a specific subject over a captured image caused by heavy zooming.

In addition, when the size of a specific subject is small and the number thereof is single, the during-exposure zoom setting unit 330 sets the zoom amount to be greater than the standard value. When there is a single specific subject having a small size, it is difficult for the specific subject to run over the captured image no matter how heavily zooming is performed, and thus it is possible to generate a widely flowing captured image. Note that the table 520 shows an example in which the number of specific subjects is plural and single, but the number may be fixed to be a predetermined number.

FIG. 7(*b*) shows a table showing the relationship between the position of a specific subject included in a captured image and a zoom amount.

The table (table 530) shown in FIG. 7(*b*) shows the relationship between the position of a specific subject (column 531) from the center of a captured image and a zoom amount (column 532). Note that, when the number of specific subjects is plural, the position of specific subjects is set to the average value of the positions of the plurality of specific subjects from the center of the captured image.

As shown in the table 530, when the specific subject is positioned distant from the center of a captured image (for example, the distance is farther than ¼ of the width of a screen from the center thereof), the during-exposure zoom setting unit 330 sets a zoom amount to be small. By this setting, it is possible to prevent an image of the specific subject from flowing widely by heavily zooming when the specific subject is distant from the center of the captured image.

In addition, when the specific subject is close to the center of the captured image (for example, the distance is lower than or equal to ¼ of the width of a screen from the center thereof), the during-exposure zoom setting unit 330 sets the zoom amount to be large. By performing heavy zooming when the specific subject is close to the center of the captured image, the flowing amount of an image of the specific subject is small, but the flowing amount of another object can generate a lot of images (since the smaller the degree of flowing of the images is, the closer the images are to the center of the captured image in a during-exposure zoom imaging operation). In other words, as shown in the table 530, the during-exposure zoom setting unit 330 sets a zoom amount in accordance with the position of a specific subject from a specific position (the center or a periphery thereof) of a captured image.

In this manner, the during-exposure zoom setting unit 330 computes a zoom amount in a during-exposure zoom imaging operation in accordance with a composition of a captured image, whereby zooming appropriate for an imaging target can be performed during the during-exposure zoom imaging operation.

[A Setting Example of a Movement Speed of a Zoom Lens]

Figure 8:
FIG. 8 is a diagram schematically showing the movement speed (zoom speed) of the zoom lens 211 computed by the during-exposure zoom setting unit 330 according to the first embodiment of the present technology.

FIG. 8 is a diagram schematically showing the movement speed (zoom speed) of the zoom lens 211 computed by the during-exposure zoom setting unit 330 according to the first embodiment of the present technology.

FIG. 8 shows a table (table 540) showing the relationship between the optical axis direction movement speed of a specific subject included in a captured image and the movement speed (zoom speed) of the zoom lens 211.

The table (table 540) shown in FIG. 8 shows the relationship between the optical axis direction movement speed of a specific subject (column 541), the movement speed of the zoom lens 211 (column 542), and an exposure time (column 543). Note that, when the number of specific subjects is plural, the optical axis direction movement speed of the specific subjects is set to be the average of the optical axis direction movement speed of the plurality of specific subjects. In addition, the exposure time computed by the exposure control unit 290 is set to be a standard exposure time, and a zoom speed of zooming in the standard exposure time as much as the zoom amount computed by the during-exposure zoom setting unit 330 when a specific subject stands still is set to be a standard zoom speed.

As shown in the table 540, when a specific subject stands still, the during-exposure zoom setting unit 330 computes a zoom speed (standard zoom speed) such that zooming of the zoom amount computed by the during-exposure zoom setting unit 330 is performed during the exposure time (standard exposure time) computed by the exposure control unit 290 based on a light measurement result. In addition, when a specific subject is moving at a predetermined speed in the optical axis direction, the zoom speed is set to a first speed that is higher than the standard zoom speed, and the exposure time is set to a first exposure time shorter than the standard exposure time. In addition, when the specific subject is moving at a speed higher than the first speed in the optical axis direction, the zoom speed is set to a second speed that is higher than the first speed, and the exposure time is set to a second exposure time that is shorter than the first exposure time. Note that the setting (computation) of the exposure time is performed so that zooming of the zoom amount (refer to FIG. 7) computed by the during-exposure zoom setting unit 330 is performed during the exposure time.

In this manner, by setting the zoom speed and the exposure time in accordance with the movement speed of a specific subject, it is possible to obtain a captured image resulting from a during-exposure zoom imaging operation by reducing the influence from the movement of the specific subject. In other words, by computing the zoom speed and the exposure time in the during-exposure zoom imaging operation in accordance with the optical axis direction movement speed of the specific subject, it is possible to perform zooming appropriate for an imaging target during the during-exposure zoom imaging operation.

[An Imaging Example of a During-Exposure Zoom Imaging Operation]

FIG. 9 is a diagram schematically showing an example of a captured image in a during-exposure zoom mode by the imaging device 100 according to the first embodiment of the present technology.

FIG. 9(a) shows a captured image (image 470) captured by setting the zoom amount to be large when a specific subject is small. As shown in the image 470, when the specific subject (the face shown at the center of the image 470) is small, the during-exposure zoom setting unit 330 performs a during-exposure zoom imaging operation by setting the zoom amount to be large. Accordingly, it is possible to obtain a captured image in which the image flows widely.

FIG. 9(b) shows a captured image (image 480) captured by setting the zoom amount to be small when the specific subject is large. As shown in the image 480, when the specific subject (the face shown at the center of the image 480) is large, the during-exposure zoom setting unit 330 performs a during-exposure zoom imaging operation by setting the zoom amount to be small. Accordingly, while flow of the image in the whole captured image is mild, it is possible to obtain the captured image in which the specific subject is clearly captured.

[An Operation Example of the Imaging Device]

Next, an operation of the imaging device 100 according to the first embodiment of the present technology will be described with reference to drawings.

Figure 10:
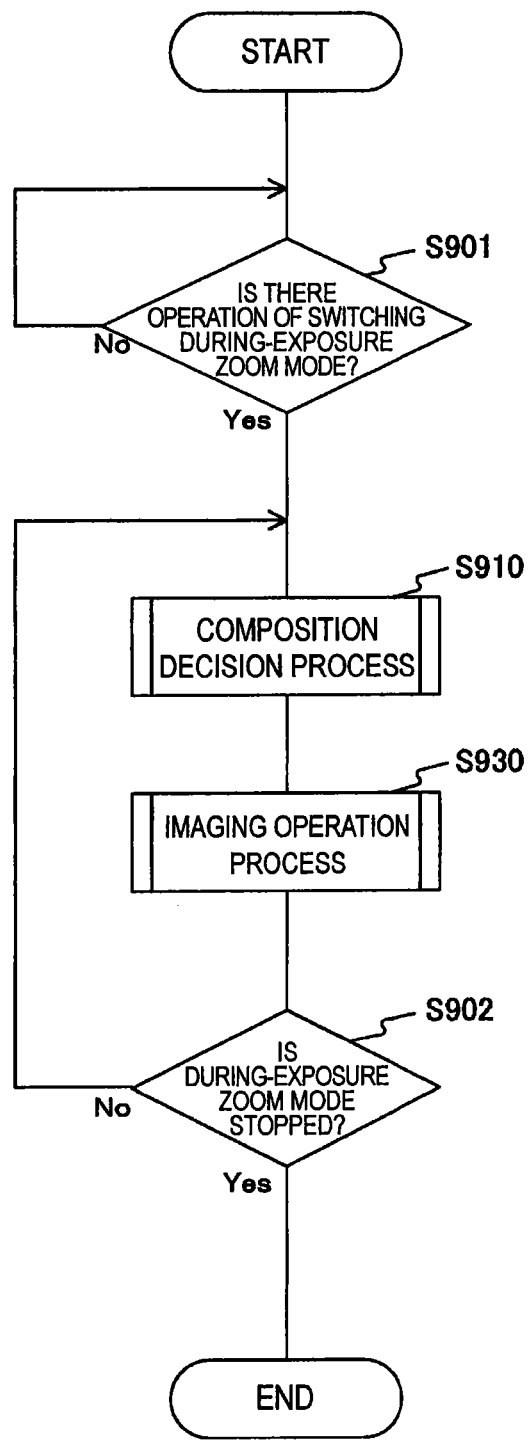
FIG. 10 is a flowchart showing an example of an imaging procedure when imaging is performed by the imaging device 100 in the during-exposure zoom mode according to the first embodiment of the present technology.

FIG. 10 is a flowchart showing an example of an imaging procedure when imaging is performed by the imaging device 100 in the during-exposure zoom mode according to the first embodiment of the present technology.

In the drawing, since the mode for the operation of the imaging device 100 is set to the during-exposure zoom mode, an operation until the during-exposure zoom mode ends will be described.

First, the control unit 240 determines whether or not a mode for the operation of the imaging device 100 is set to the during-exposure zoom mode (Step S901). Then, when it is determined that the mode is not set to the during-exposure zoom mode (Step S901), the process stands by until the mode is set to the during-exposure zoom mode.

On the other hand, when it is determined that the mode is set to the during-exposure zoom mode (Step S901), a composition decision process for deciding a composition in a during-exposure zoom imaging operation is performed (Step S910). Note that this composition decision process (Step S910) will be described with reference to FIG. 11. Next, settings (zoom amount, zoom speed, and exposure time) for the during-exposure zoom imaging operation are decided in the decided composition, and then an imaging operation process for performing the during-exposure zoom imaging operation is performed (Step S930). Note that the imaging operation process (Step S930) will be described with reference to FIG. 12.

Next, the control unit 240 determines whether or not the end of the during-exposure zoom mode is selected (Step S902). Then, when it is determined that the during-exposure zoom mode is not selected, the process returns to Step S910, and the during-exposure zoom mode is continued.

On the other hand, when it is determined that the during-exposure zoom mode is selected (Step S902), the imaging procedure ends.

Figure 11:
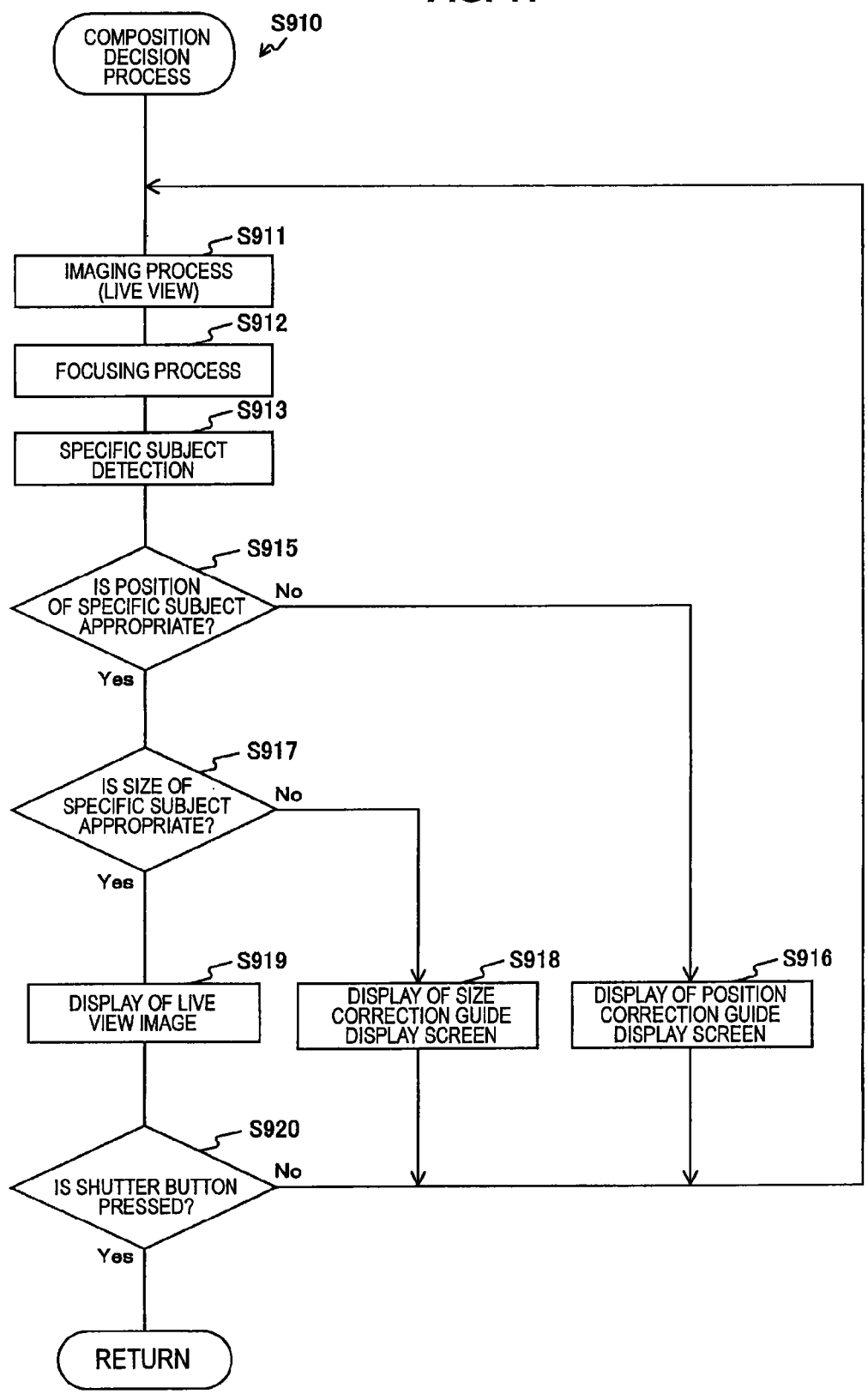
FIG. 11 is a flowchart showing an example of a procedure of a composition decision process (Step S910) in the imaging procedure according to the first embodiment of the present technology.

FIG. 11 is a flowchart showing an example of a procedure of a composition decision process (Step S910) in the imaging procedure according to the first embodiment of the present technology.

First, when the during-exposure zoom mode is set, the image sensor 220 performs imaging in order to display a live view (monitoring) image on the display unit 272 (Step S911). Next, a focusing process based on a contrast system (Step S912) is performed using a captured image generated in this imaging. In addition, using this captured image, the subject detection unit 310 detects a specific subject included in this captured image (Step S913). Note that, in this detection, the position and the size of the specific subject are detected.

Then, the during-exposure zoom setting unit 330 determines whether or not the detected position of the specific subject is appropriate (whether or not 50% or more thereof falls within the center range) (Step S915). Then, when the position of the specific subject is determined not to be appropriate (Step S915), a position alteration guide display screen (for example, refer to FIG. 4(a)) for altering the position of the specific subject on the captured image is displayed on the display unit 272 (Step S916), and the process returns to Step S911.

On the other hand, when the position of the specific subject is determined to be appropriate (Step S915), the during-exposure zoom setting unit 330 determines whether or not the size of the specific subject is appropriate (Step S917). Then, when the size of the specific subject is determined not to be appropriate (Step S917), a size alteration guide display screen (for example, refer to FIG. 4(b)) for altering the size of the specific subject is displayed on the display unit 272 (Step S918), and the process returns to Step S911.

Note that, when the size of the specific subject is appropriate (Step S917), a live view image (captured image without a guide display) is displayed on the display unit 272 (Step S919). Then, the control unit 240 determines whether or not the shutter button is pressed (Step S920). Then, when the shutter button is determined not to be pressed (Step S920), the process returns to Step S911, and the composition decision process is continued.

On the other hand, when the shutter button is determined to be pressed (Step S920), the procedure of the composition decision process ends.

Note that, in FIG. 11, the example in which the determination of the size (Step S917) is performed after the determination of the position (Step S915) has been described, but the technology is not limited thereto. It may be possible to perform the determination of the position (Step S915) after the determination of the size (Step S917) by changing the order. In addition, the example in which the detection of the specific subject (Step S913) is performed after the focusing process (Step S912), and then the determination of the position and the size (Step S915 and Step S917) is performed has been described, but the technology is not limited thereto. Since the result of the focusing process is not used in Step S915 and Step S917, it is possible to simultaneously perform the focusing process (Step S912) and Step S913 and the following procedure.

In other words, the determination of the position and the size (Step S915 and Step S917) by the during-exposure zoom setting unit 330 may be performed during the time from the detection of the specific subject from the captured image (Step S913) until the captured image is displayed.

Note that, in FIG. 11, the example in which the determination of the position and the determination of the size are set as separate procedures (Step S915 and Step S917), and when either of them is not appropriate, a guide display thereof (Step S916 and Step S918) is performed has been described for convenience of description. However, it may be possible for the position and the size to be simultaneously determined (determined together) and a guide to be displayed in accordance with the determination so that a proper guide display is performed even when neither of the position and the size is appropriate.

Figure 12:
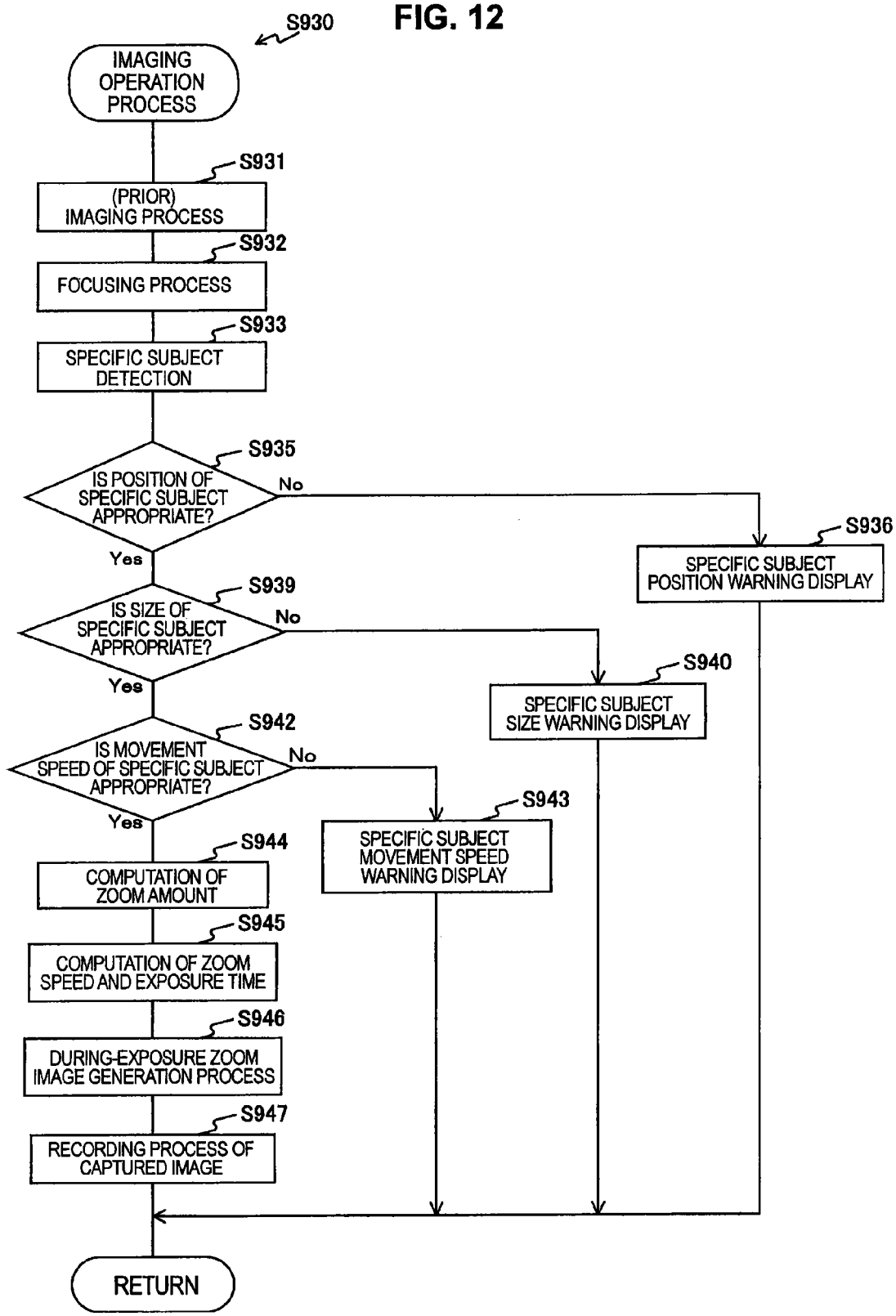
FIG. 12 is a flowchart showing an example of a procedure of an imaging operation process (Step S930) in the imaging procedure according to the first embodiment of the present technology.

FIG. 12 is a flowchart showing an example of a procedure of the imaging operation process (Step S930) in the imaging procedure according to the first embodiment of the present technology.

First, if the shutter button is pressed in the composition decision process (refer to Step S920 of FIG. 11), imaging is performed by the image sensor 220 before (in advance of) the execution of the during-exposure zoom imaging operation. Then, using this captured image captured in advance, a focusing process (Step S932), and a specific subject detection (Step S933) are performed (the same as Step S912 and Step S913 of FIG. 11)

Next, the during-exposure zoom setting unit 330 determines whether or not the position of the specific subject is appropriate (whether or not 50% or more thereof falls within the center range) (Step S935). Then, when the position of the specific subject is determined not to be appropriate (Step S935), a specific subject position warning display for informing that the position of the specific subject is not appropriate is displayed (Step S936), and then the procedure of the imaging operation process ends.

On the other hand, when the position of the specific subject is determined to be appropriate (Step S935), the during-exposure zoom setting unit 330 determines whether or not the size of the specific subject is appropriate (Step S939). Then, when the size of the specific subject is determined not to be appropriate (Step S939), a specific subject size warning display for informing that the size of the specific subject is not appropriate is displayed (Step S940), and then the procedure of the imaging operation process ends.

Note that, when the size of the specific subject is determined to be appropriate (Step S940), the during-exposure zoom setting unit 330 determines whether or not the movement speed of the specific subject is appropriate (Step S942). Then, when the movement speed of the specific subject is determined not to be appropriate (S942), specific subject movement speed warning display for informing that the movement speed of the specific subject is not appropriate is displayed (Step S943), and then the procedure of the imaging operation process ends.

On the other hand, when the movement speed of the specific subject is determined to be appropriate (Step S942), the during-exposure zoom setting unit 330 computes the zoom amount in the during-exposure zoom imaging operation based on the position, the size, and the number of specific subjects (Step S944). Then, based on the movement speed of the specific subject, the zoom amount, and the exposure time computed by the exposure control unit 290, the during-exposure zoom setting unit 330 computes the exposure time of the image sensor 220 and the zoom speed in the during-exposure zoom imaging operation (Step S945). Next, a during-exposure zoom image generation process for generating a captured image in the during-exposure zoom imaging operation is performed (Step S946) based on the computed zoom amount, zoom speed, and exposure time. Then, the captured image generated in the during-exposure zoom imaging operation is recorded on the recording unit 262 (Step S947), and the procedure of the imaging operation process ends. Note that Steps S944, S945, and S946 are examples of the control procedure described in the claims.

In this manner, according to the first embodiment of the present technology, by analyzing whether or not a composition is appropriate for the during-exposure zoom imaging operation based on a specific subject in a captured image, it is possible to reduce failure of imaging in the during-exposure zoom imaging operation. Further, based on the specific subject in the captured image, it is possible to easily perform the during-exposure zoom imaging operation by deciding each setting in the during-exposure zoom imaging operation.

Note that the relationship of determining the position, the size, and the movement speed (Steps S935, S939, and S942) is the same as the relationship of Step S915 and Step S917 of FIG. 11. In other words, a case in which the order is changed and a case in which determinations are simultaneously performed (determined together) are also assumed. In addition, the focusing process (Step S932) is also the same as in FIG. 11, and it is better for the focusing process to be finished before the during-exposure zoom imaging generation process (Step S946) starts.

2. Second Embodiment

In the first embodiment of the present technology, description has been provided on the assumption that the subject detection unit 310 detects the face of a person as a specific subject. However, when more types of specific subjects can be detected, it is possible to perform a during-exposure zoom imaging operation in accordance with the types.

Thus, in a second embodiment of the present technology, an example in which the subject detection unit 310 detects a plurality of types of subjects as specific subjects will be described with reference to FIGS. 13 and 14.

Note that since the functional configuration example and the flowcharts of the imaging device 100 according to the second embodiment of the present technology are the same as those shown in FIGS. 2 and 10 to 12, description thereof will be omitted herein.

[An Example of Subject Information]

FIG. 13 is a diagram schematically showing an example of subject information used in the during-exposure zoom setting unit 330 according to the second embodiment of the present technology.

The table (table 610) shown in FIG. 13 shows subject number (column 611), type indicating the type of subjects (column 612), size (column 613), position (column 614), and optical axis direction movement speed (column 615). Note that, since information other than the type (column 612) is the same as that shown in FIG. 6, description thereof will be omitted herein, and description will be provided herein mainly on the types detected by the subject detection unit 310.

In the second embodiment, the subject detection unit 310 detects a plurality of types of subjects as specific subjects among objects (subjects) included in a captured image supplied from the signal processing unit 250. In this detection, the subject detection unit 310 retains the characteristics of the plurality of types of specific subjects, for example, the characteristics of the faces of persons, the characteristics of dogs, the characteristics of trains, and the like, in advance, and detects specific subjects having the retained characteristics. The subject detection unit 310 detects a plurality of specific subjects from a captured image, for example, by matching a template on which luminance distribution information of each of the plurality of specific subjects is recorded with a captured image. Accordingly, the type of a specific subject is specified. Then, the subject detection unit 310 supplies subject information including information (column 612) indicating the type of the subject to the during-exposure zoom setting unit 330. In addition, the subject detection unit 310, for example, takes out a rectangular image including the detected specific image. Then, it may be possible for the feature amount of the taken image to be extracted, the extracted feature amount and the feature amount of the specific subject to be compared, and then the type of the detected specific subject to be identified based on the similarity. Herein, the feature amount is identifying information used to identify the specific subject, and in the case of a face, for example, is data indicating the feature and the characteristic of a face image for recognizing the positional relationship and shapes of each part including the eyes, the nose, the mouth, the eyebrows, and the like which constitutes the face. This feature amount is extracted based on, for example, values of color, luminance, and the like. Note that the subject detection unit 310 of the second embodiment is an example of the acquisition unit described in the claims.

Note that, in the second embodiment of the present technology, the example in which only a plurality of types of subjects having characteristics retained in advance are detected has been described, but the technology is not limited thereto. For example, an object is detected from a captured image based on the contour, and then, if the characteristics of a subject coincide with those retained in advance, information indicating a type coinciding therewith is given to the subject. A case in which a specific subject is detected is also considered by giving information set as "other" to a subject not having a coinciding characteristic.

Next, an example of zoom amounts decided in accordance with the kind of a specific subject by the during-exposure zoom setting unit 330 will be described with reference to FIG. 14.

[A Setting Example of Zoom Amounts]

FIG. 14 is a diagram schematically showing an example of the zoom amounts computed by the during-exposure zoom setting unit 330 according to a second embodiment of the present technology in accordance with the kind of a specific subject.

The table (table 620) shown in FIG. 14 shows the relationship between the kinds of specific subjects and zoom amounts.

As shown in the table 620, for example, the zoom amount is set to be larger than the standard to image a specific subject (for example, a vehicle, or an animal) of which motions are desired to be intensely expressed. Thus, when a specific subject of which motions are desired to be expressed is imaged using a during-exposure zoom imaging operation, a captured image of which the image (particularly, the background) flows wildly (the motions are large) is obtained.

In addition, the zoom amount is set to be smaller than the standard to image a specific subject (for example, a plant, or a person) so as to make a clear image with no blur. Thus, when a specific subject of which the image is desired to be clear with no blur is imaged using a during-exposure zoom imaging operation, a captured image of which the image of the specific subject has no blur while the image (particularly, the background) flows gently is obtained.

In this manner, according to the second embodiment of the present technology, by setting the zoom amount in accordance with the type of a detected specific subject, a during-exposure zoom imaging operation appropriate for the specific subject can be performed.

3. Third Embodiment

In the first and the second embodiments of the present technology, an example in which, when checking a composition (checking the position and the size of a specific subject) of a captured image after the shutter button is pressed, if the composition is not appropriate, a during-exposure zoom imaging operation is stopped has been described. However, even when the during-exposure zoom setting unit 330 determines that it is not appropriate, there is a case in which a user wants to perform imaging using the during-exposure zoom imaging operation.

Therefore, in a third embodiment of the present technology, an example in which, even when the during-exposure zoom setting unit 330 determines that a composition is not appropriate, a during-exposure zoom imaging operation can be started by selection of a user will be described with reference to FIGS. 15 to 17.

Note that, since a functional configuration example of the imaging device 100 according to the third embodiment of the present technology is the same as that shown in FIG. 2, description thereof will be omitted herein.

[An Example of Warning Display on the Position or the Size of a Specific Subject]

FIG. 15 is a schematic diagram showing an example of an image displayed on the display unit 272 when the during-exposure zoom setting unit 330 according to a third embodiment of the present technology determines in prior checking that the position or the size of a specific subject is not appropriate.

FIG. 15(*a*) shows a warning image (image 630) displayed on the display unit 272 when the during-exposure zoom setting unit 330 analyzes in prior checking that the position of a specific subject is not appropriate.

The image 630 shows the specific subject (face 632), a frame (frame 631), and a text display region (text display region 634). Note that, since the face 632 and the frame 631 are the same as the face 432 and the frame 431 shown in FIG. 4(*a*), the text display region 434 will be mainly described herein.

In the text display region 634, a stop button 635 and a start button 636 are shown in addition to text.

The stop button 635 is a button for stopping acquisition of a captured image from a during-exposure zoom imaging operation held off with display of the image 630.

The start button 636 is a button for starting acquisition of a captured image from a during-exposure zoom imaging operation held off with display of the image 630.

Herein, the selection buttons (the stop button 635 and the start button 636) shown on the image 630 will be described. In the imaging device 100 of the third embodiment of the present technology, even when the during-exposure zoom setting unit 330 determines that a composition is not appropriate, a during-exposure zoom imaging operation can be started with an intention of a user. In other words, when a position of a specific subject is analyzed not to be appropriate in prior checking of a during-exposure zoom imaging operation, the image 630 is displayed to make a user to select whether or not a during-exposure zoom imaging operation is to be performed even when the composition is not appropriate using the stop button 635 and the start button 636.

FIG. 15(*b*) shows a warning image (image 640) displayed on the display unit 272 when the during-exposure zoom setting unit 330 analyzes in prior checking that the size of a specific subject is not appropriate.

The image 640 shows the specific subject (face 642), a frame (frame 641), and a text display region (text display region 644). In addition, in the text display region (text display region 644), a stop button 645 and a start button 646 are shown in addition to text. Note that, since the face 642 and the frame 642 are the same as the face 442 and the frame 441 shown in FIG. 4(*b*), and the stop button 645 and the start button 646 are the same as the stop button 635 and the start button 636 shown in FIG. 15(*a*), description thereof will be omitted herein.

As shown in FIG. 15(*b*), when the size of the specific subject is analyzed not to be appropriate in the prior checking, the image 640 is displayed so as to cause the user to select whether or not a during-exposure zoom imaging operation is to be performed even when the composition is not appropriate using the stop button 645 and the start button 646.

[An Operation Example of the Imaging Device]

Next, an operation of the imaging device 100 according to the third embodiment of the present technology will be described with reference to drawings.

Figure 16:
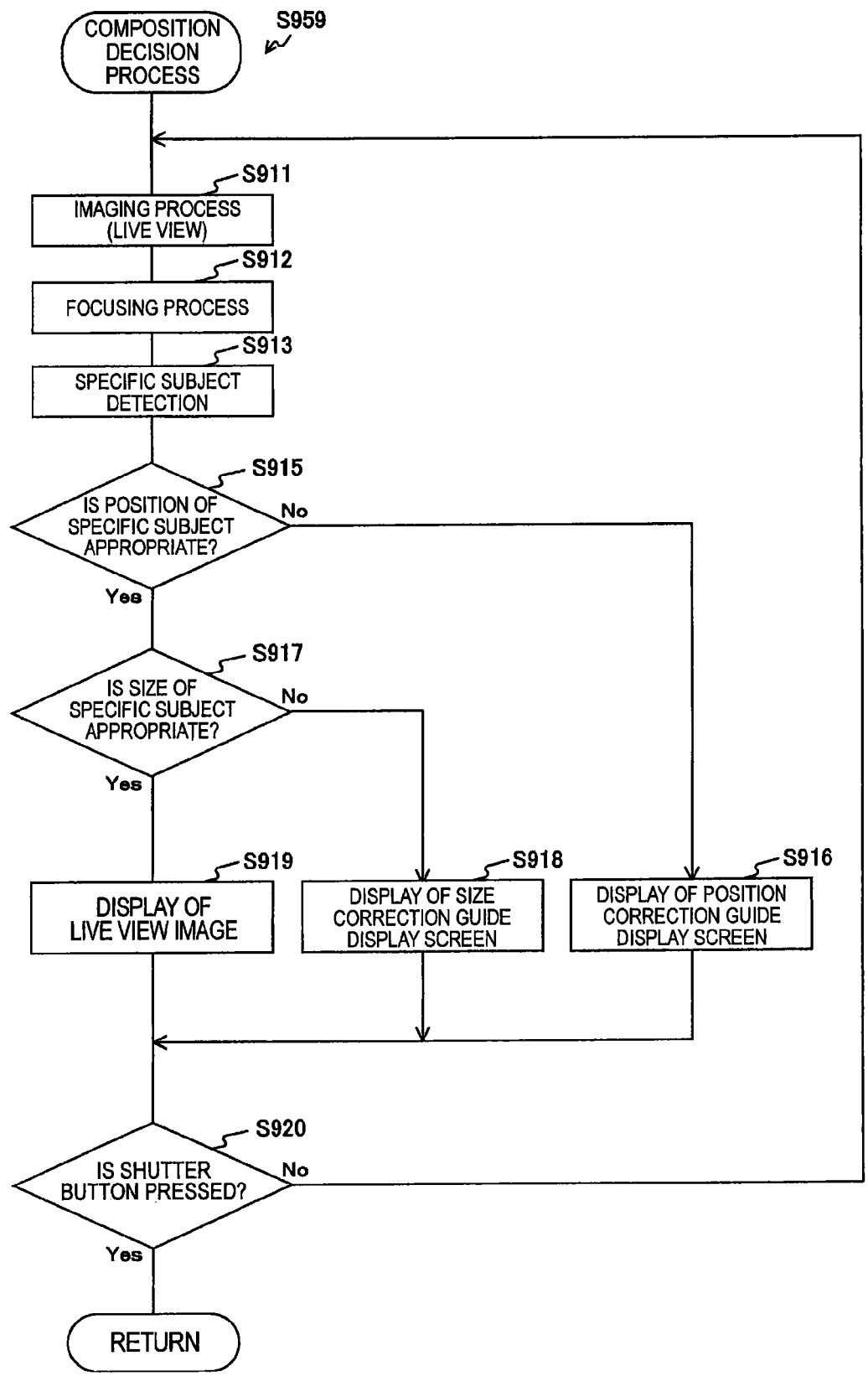
FIG. 16 is a flowchart showing an example of a procedure of a composition decision process (Step S959) in an imaging procedure according to the third embodiment of the present technology.

FIG. 16 is a flowchart showing an example of a procedure of a composition decision process (Step S959) in an imaging procedure according to the third embodiment of the present technology.

Note that FIG. 16 is a modified example of the composition decision process (Step S910) shown in FIG. 11, and a difference between the two cases is that, if FIG. 16, even when a position or a size of a specific subject is not appropriate, the shutter button can be pressed.

In other words, in the composition decision process (Step S959), the process proceeds to determine whether or not the shutter button is pressed (Step S920) after the size alteration guide display screen is displayed (Step S918) and after the position alteration guide display screen is displayed (Step S916).

On the other hand, in the composition decision process (Step S910) of the first embodiment of the present technology, the process returns to Step S911 after the size alteration guide display screen is displayed (Step S918) and after the position alteration guide display screen is displayed (Step S916). After returning to Step S911, it is decided that a during-exposure zoom imaging operation will not be performed (the shutter will not be operated) in the state in which the guide display screen is displayed in the first embodiment of the present technology.

Note that, since points other than this are the same as the composition decision process (Step S910) shown in FIG. 11, description thereof will be omitted.

Figure 17:
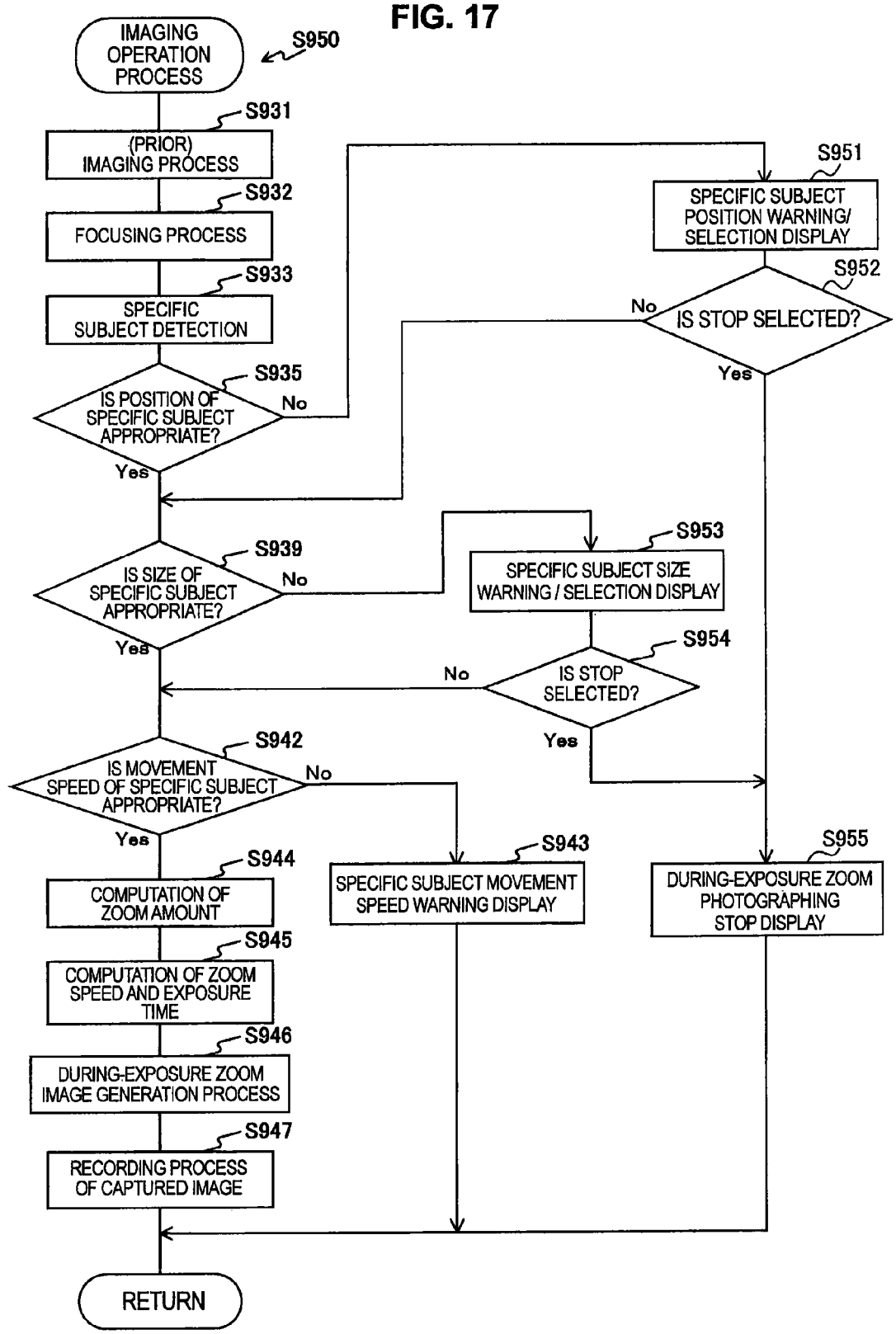
FIG. 17 is a flowchart showing an example of a procedure of an imaging operation process (Step S950) in the imaging procedure according to the third embodiment of the present technology.

FIG. 17 is a flowchart showing an example of a procedure of an imaging operation process (Step S950) in the imaging procedure according to the third embodiment of the present technology.

Note that FIG. 17 is a modified example of the imaging operation process (Step S930) shown in FIG. 12, and the procedure taken when a position or a size of a specific subject is not appropriate is different. Thus, the same reference numerals are given to procedures common to those in FIG. 12, and description thereof will be omitted herein.

In determining whether or not a position of a specific subject is appropriate (Step S935), when the position of the specific subject is determined not to be appropriate, a specific subject position warning/selection display is displayed (Step S951). Accordingly, a user is informed that the position of the specific subject is not appropriate and display is performed to cause the user to select whether or not a during-exposure zoom imaging operation is started even though the position is not appropriate.

Next, in this specific subject position warning/selection display (for example, refer to FIG. 15(*a*)), the control unit 240 determines whether or not stop is selected (Step S952). Then, when it is determined that stop is not selected (for example, when the start button 636 of FIG. 15(*a*) is pressed) (Step S952), the process proceeds to determination of whether or not a size of the specific subject is appropriate (Step S939).

On the other hand, when it is determined that stop is selected (for example, when the stop button 635 of FIG. 15(*a*) is pressed) (Step S952), a display (during-exposure zoom imaging operation stop display) for informing that the during-exposure zoom imaging operation is stopped is displayed (Step S955), and then the procedure of the imaging operation process ends.

In addition, in determining whether or not the size of the specific subject is appropriate (Step S939), when the size of the specific subject is determined not to be appropriate, a specific subject size warning/selection display is displayed (Step S953). Accordingly, the user is informed that the size of the specific subject is not appropriate and display is performed to cause the user to select whether or not a during-exposure zoom imaging operation is started even though the size is not appropriate.

Next, in this specific subject size warning/selection display (for example, refer to FIG. 15(b)), the control unit 240 determines whether or not stop is selected (Step S954). Then, when it is determined that stop is not selected (for example, when the start button 646 of FIG. 15(b) is pressed) (Step S954), the process proceeds to determination of whether or not the movement speed of the specific subject is appropriate (Step S942).

On the other hand, when it is determined that stop is selected (for example, when the stop button 645 of FIG. 15(b) is pressed) (Step S954), a during-exposure zoom imaging operation stop display is displayed (Step S955), and then the procedure of the imaging operation process ends.

In this manner, according to the third embodiment of the present technology, even when the during-exposure zoom setting unit 330 determines that a composition is not appropriate, it is possible to perform a during-exposure zoom imaging operation which is started by selection of a user while further reflecting the intention of the user.**

4. Fourth Embodiment

In the first embodiment of the present technology, the example in which the during-exposure zoom setting unit 330 analyzes whether or not a position of a specific subject is appropriate using the center range has been described. However, this analysis can also be determined using the position of the specific subject from the center of a captured image (distance from the center).

Thus, in a fourth embodiment of the present technology, an example in which a position of the specific subject is determined to be appropriate when the distance of the specific subject from the center of a captured image is shorter than a threshold value will be described with reference to FIG. 18. Note that, in the fourth embodiment of the present technology, since only the method of determining of a position of a specific subject is different from that of the first embodiment of the present technology, the method will be described only using a drawing corresponding to FIG. 3(a).

[An Example of Detection of a Position of a Specific Subject Appropriate for a During-Exposure Zoom Imaging Operation]

Figure 18:
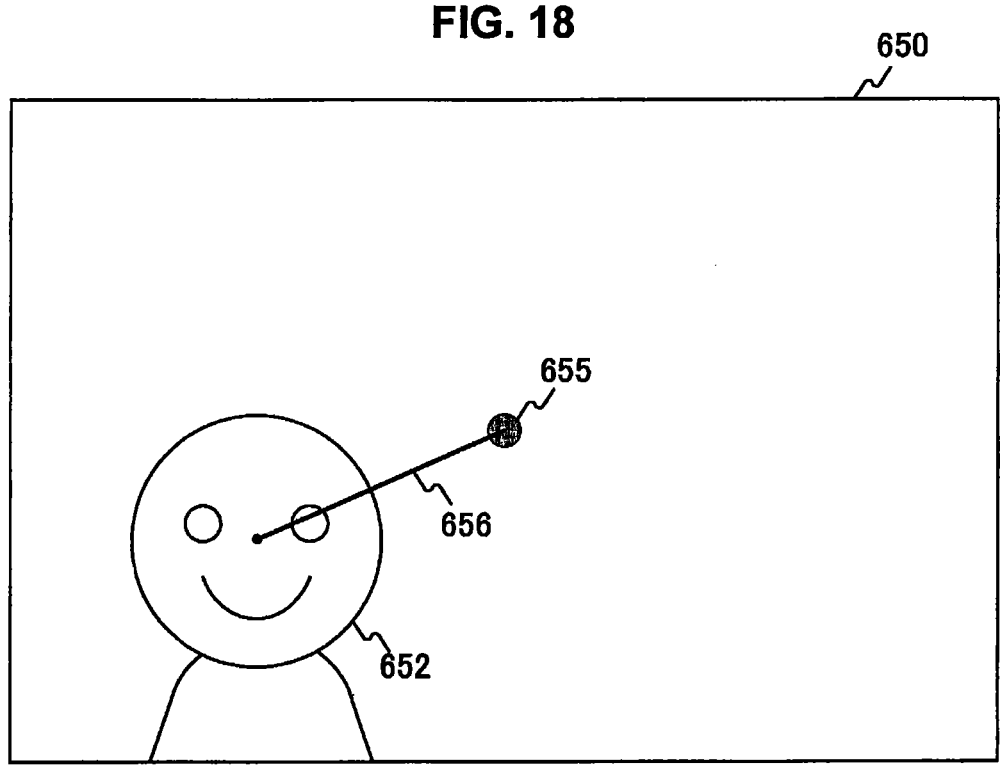
FIG. 18 is a schematic diagram for describing the analysis of a position of a specific subject by the during-exposure zoom setting unit 330 according to a fourth embodiment of the present technology.

FIG. 18 is a schematic diagram for describing the analysis of a position of a specific subject by the during-exposure zoom setting unit 330 according to the fourth embodiment of the present technology.

FIG. 18 shows an image (image 650) for describing the analysis of a position of a specific subject by the during-exposure zoom setting unit 330 according to the fourth embodiment of the present technology. In the image 650, the face (face 652) of one person is shown near the lower left side of the image 650 as a specific subject. In addition, in this image 650, a point (point 655) indicating the center of the captured image and a line (line 656) indicating the distance between the point 655 and the center of the face 652 are shown.

In this manner, the during-exposure zoom setting unit 330 according to the fourth embodiment of the present technology determines whether or not the position of the specific subject is appropriate for a during-exposure zoom imaging operation based on how far the specific subject is separated from the center of the captured image (based on the distance). When the distance from the center of the captured image to the center of the specific subject (specific subject distance) is compared to a threshold value, for example, if the specific subject distance is shorter than the threshold value, the position is determined to be appropriate for the during-exposure zoom imaging operation. Note that, when there are a plurality of specific subjects, determination may be made using the average value of respective specific subject distances of the plurality of specific subjects.

5. Fifth Embodiment

In the first embodiment of the present technology, description has been provided on the assumption of an imaging device including a shutter button which is simply pressed (one-time pressing). However, an imaging device is provided with a shutter button that enables full-pressing and half-pressing may also be considered.

Therefore, in a fifth embodiment of the present technology, an example in which a during-exposure zoom imaging operation is performed by analyzing a position and a size of a specific subject in a state in which a shutter button is half-pressed and analyzing an optical axis direction movement speed after the shutter button is pressed will be described.

Note that, since a functional configuration example of the imaging device 100 according to the fifth embodiment of the present technology is the same as that shown in FIG. 2, description thereof will be omitted herein.

[An Operation Example of the Imaging Device]

An operation of the imaging device 100 according to the fifth embodiment of the present technology will be described with reference to drawings.

Figure 19:
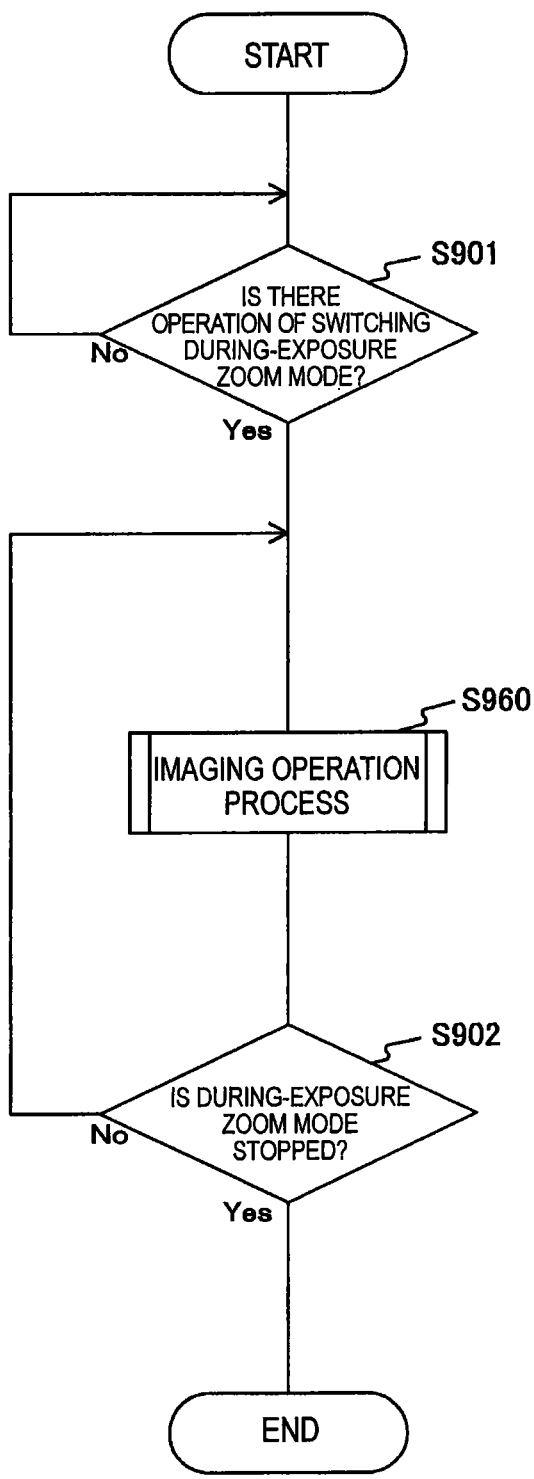
FIG. 19 is a flowchart showing an example of an imaging procedure when the imaging device 100 performs imaging in a during-exposure zoom mode according to a fifth embodiment of the present technology.

FIG. 19 is a flowchart showing an example of an imaging procedure when the imaging device 100 according to the fifth embodiment of the present technology performs imaging in a during-exposure zoom mode.

Note that FIG. 19 is a modification example of the imaging procedure shown in FIG. 10, and is different only in that an imaging operation process (Step S960) is provided instead of the composition decision process (Step S910) and the imaging operation process (Step S930). Thus, this imaging operation process (Step S960) will be described with reference to FIGS. 20 and 21.

Figure 20:
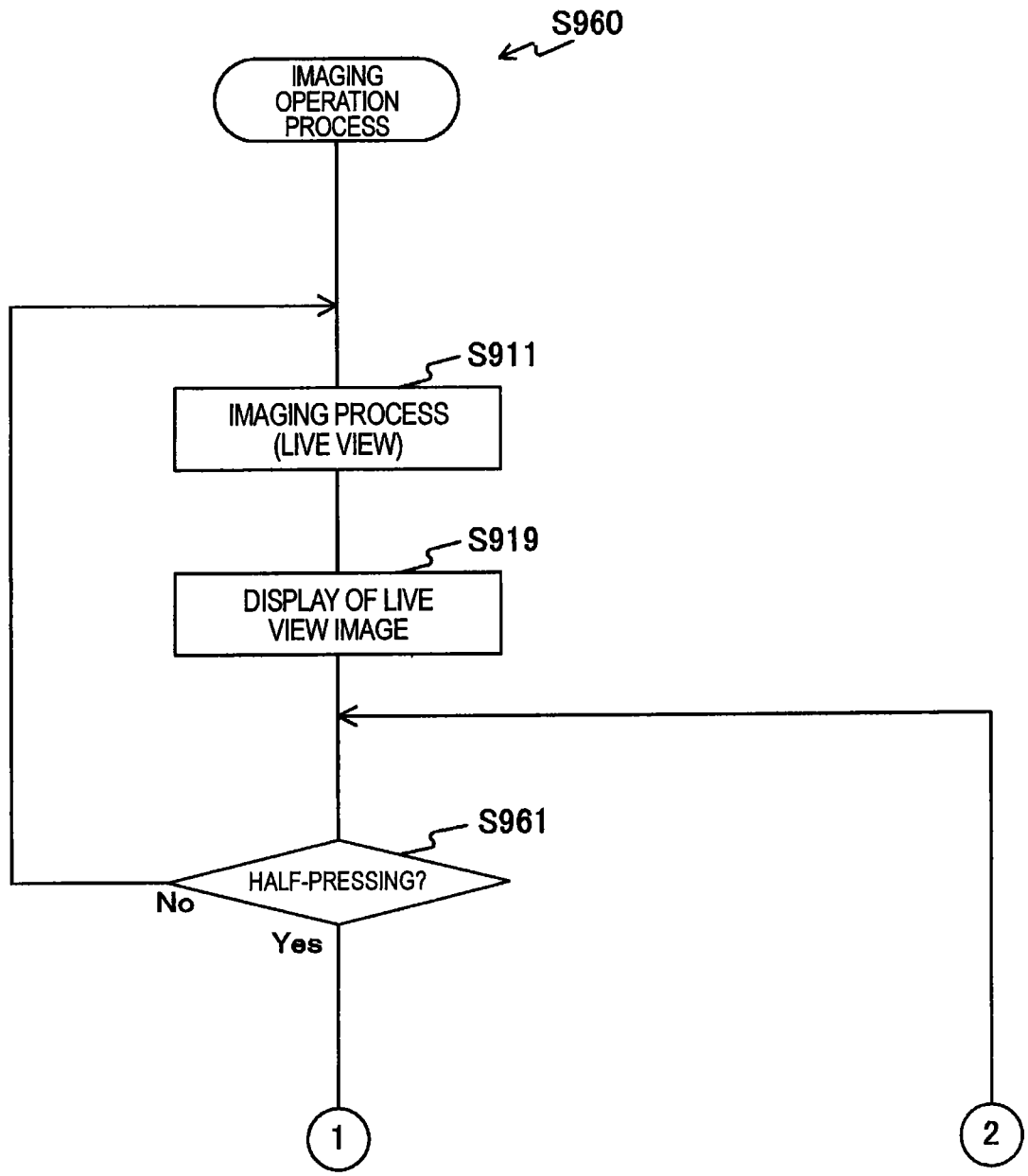
FIG. 20 is a flowchart showing an example of a procedure of an imaging operation process (Step S960) in an imaging procedure according to the fifth embodiment of the present technology.
Figure 21:
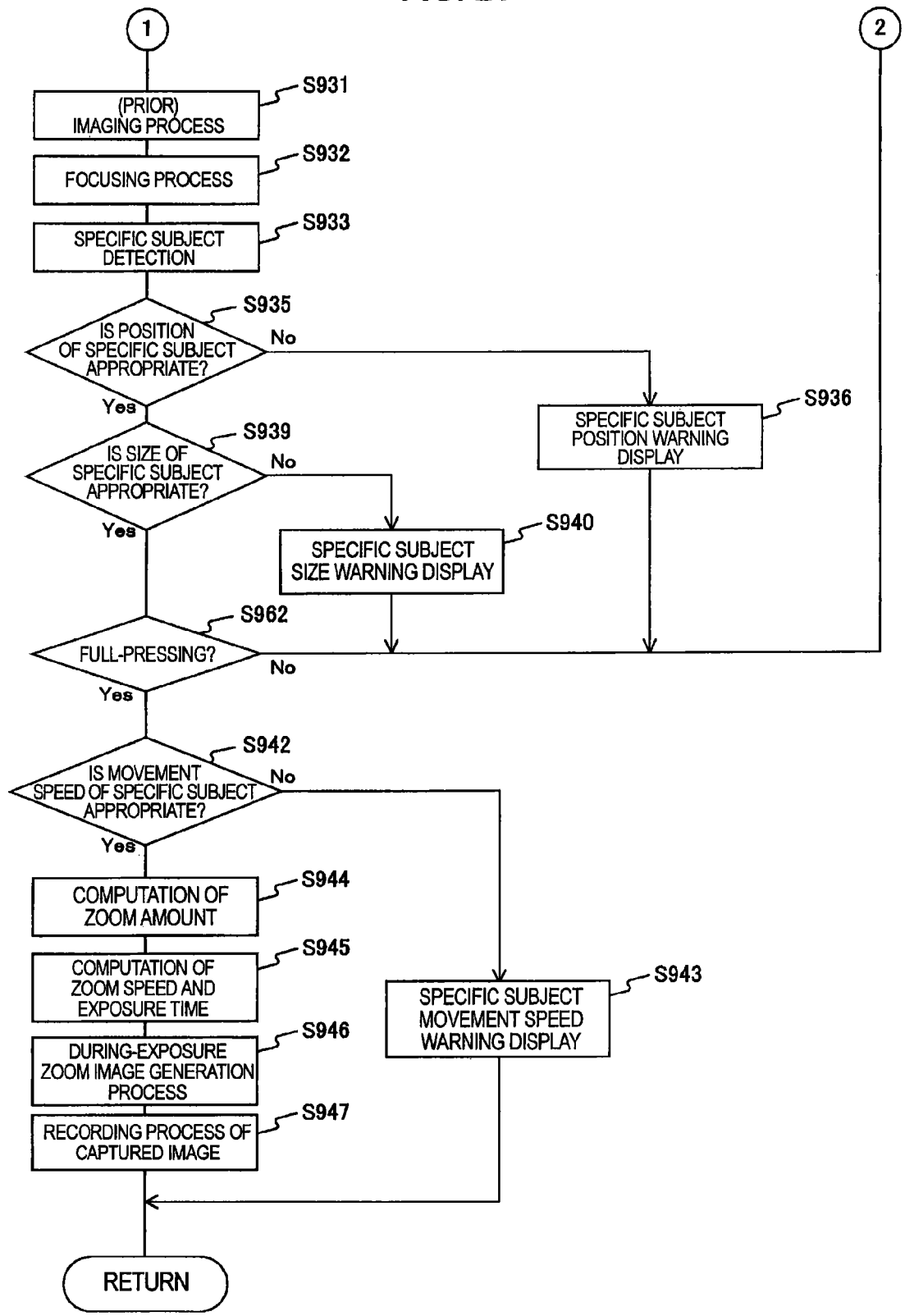
FIG. 21 is a flowchart showing the example of the procedure of the imaging operation process (Step S960) in the imaging procedure according to the fifth embodiment of the present technology.

FIGS. 20 and 21 are flowcharts showing an example of a procedure of the imaging operation process (Step S960) in the imaging procedure according to the fifth embodiment of the present technology.

Note that the imaging operation process (Step S960) is a modification example of the composition decision process (Step S910) of FIG. 11 and the imaging operation process (Step S930) of FIG. 12. This imaging operation process (Step S960) is different from the procedures shown in FIGS. 11 and 12 in that a position and a size of a specific subject are analyzed when a shutter button is half-pressed and a movement speed of the specific subject is analyzed when the shutter button is fully pressed in the process. Thus, the same reference numerals are given to the same procedures and description thereof will be simplified.

First, when a during-exposure zoom mode is set, the image sensor 220 performs imaging (Step S911) to display a live view (monitoring) image on the display unit 272. Next, the live view image is displayed on the display unit 272 (Step S919). Then, the control unit 240 determines whether or not the shutter button is half-pressed (Step S961). Then, when it is determined that the shutter button is not half-pressed (Step S961), the process returns to Step S911, and the live view operation is continued.

On the other hand, when the shutter button is determined to be half-pressed (Step S961), an imaging process (Step S931) is performed, and then, a focusing process (Step S932), and specific subject detection (Step S933) are performed.

Then, it is determined whether or not the position of the specific subject is appropriate (Step S935), and when the position is determined not to be appropriate, specific subject position warning display is displayed (Step S936), and then, the process returns to Step S961, and it is determined whether or not the state of half-pressing is maintained.

In addition, when the position of the specific subject is determined to be appropriate (Step S935), it is determined whether or not the size of the specific subject is appropriate (Step S939), and when the size is determined not to be appropriate, specific subject size warning display is displayed (Step S940). After the display, the process returns to Step S961, and it is determined whether or not the state of half-pressing is maintained.

On the other hand, when the size of the specific subject is determined to be appropriate (Step S939), the control unit 240 determines whether or not the shutter button is fully pressed (Step S962). Then, when the shutter button is determined not to be fully pressed (Step S962), the process returns to Step S961, and it is determined whether or not the state of half-pressing is maintained.

Note that, when the shutter button is determined to be fully pressed (Step S962), it is determined whether or not the movement speed of the specific subject in the optical axis direction is appropriate for a during-exposure zoom imaging operation (Step S942). Then, when the movement speed is determined not to be appropriate (Step S942), specific subject movement speed warning display is displayed (Step S943), and the procedure of the imaging operation process ends. Note that since the procedure after the movement speed is determined to be appropriate (Step S942) is the same as that of FIG. 12, description thereof will be omitted herein.

In this manner, according to the fifth embodiment of the present technology, it is possible to swiftly start a during-exposure zoom imaging operation by analyzing the specific subject after full pressing only using the movement speed.

6. Sixth Embodiment

In the first to fifth embodiments of the present technology, the example in which a position of the zoom lens is not considered has been described. However, when the zoom lens is provided near an end portion (telescopic-end or wide end) in a range in which the zoom lens is operable, and the zoom lens is driven in the end portion direction based on a computed zoom magnification, the zoom lens reaches the end portion, and accordingly, there is a possibility of a during-exposure zoom imaging operation failing. In other words, when a during-exposure zoom imaging operation is performed, it is desirable to also consider a position of the zoom lens in the barrel.

Thus, in a sixth embodiment of the present technology, an example in which it is analyzed whether or not a change of a computed zoom magnification can be executed will be described with reference to FIGS. 22 to 24.

[A Guide Display Example and a Notification Display Example for a Zoom Amount]

FIG. 22 is a schematic diagram showing an example of an image displayed on the display unit 272 when the during-exposure zoom setting unit 330 according to a sixth embodiment of the present technology determines that it is difficult to make a change in the computed zoom amount.

FIG. 22(a) shows a live view image (image 660) with guide display displayed on the display unit 272 when it is analyzed that a change in a zoom amount computed in the during-exposure zoom setting unit 330 is not able to be executed in a live view operation.

In this image 660, a specific subject (face 662) and a text display region (text display region 663) are shown.

Herein, a condition in which the image 660 is displayed will be described. The during-exposure zoom setting unit 330 of the sixth embodiment of the present technology computes a zoom amount (zoom magnification) when the position and the size of the specific subject are determined to be appropriate in the live view operation. Note that this computation is the same as that shown in FIG. 7.

Next, the during-exposure zoom setting unit 330 analyzes whether or not driving of the computed zoom amount is executable based on the computed zoom amount and the current position of the zoom lens 211 (information from the lens position detection unit 285). In other words, the during-exposure zoom setting unit 330 computes a driving distance of the zoom lens 211 based on the computed zoom amount (zoom magnification). Then, the during-exposure zoom setting unit 330 analyzes whether or not the zoom lens 211 is brought into contact with an end portion (wide-end or telescopic-end) of an operable range when the zoom lens 211 is driven to the extent of the computed driving distance.

When the during-exposure zoom setting unit 330 determines that the zoom lens is brought into contact with an end portion of the operable range (a during-exposure zoom imaging operation cannot be properly performed), the user is notified of this fact and an image (for example, the image 660) for correcting the zoom magnification is displayed on the display unit 272.

FIG. 22(b) shows a notification image (image 670) for notifying that imaging is performed after automatic zoom-out when it is determined that driving of the computed zoom amount is not executable in prior checking before the during-exposure zoom imaging operation.

In this image 670, a specific subject (face 672) and a text display region (text display region 673) are shown.

Herein, a condition in which the image 670 is displayed will be described. The during-exposure zoom setting unit 330 of the sixth embodiment of the present technology analyzes whether or not driving of the computed zoom amount is executable (whether or not the zoom lens is brought into contact with the end portion during the during-exposure zoom imaging operation) in the prior checking. Then, when it is determined not to be executable, the during-exposure zoom imaging operation is executed after the zoom lens 211 is driven to the front side to as to be separated from the end portion so that the zoom lens 211 does not come into contact with the end portion during the during-exposure zoom imaging operation. When the during-exposure zoom imaging operation is performed using zoom-in, for example, the during-exposure zoom imaging operation is started after performing zoom-out before the during-exposure zoom imaging operation is executed so that the zoom lens 211 does not come into contact with the end portion (telescopic-end) during the during-exposure zoom imaging operation. Note that, a driving amount when this zoom lens 211 is separated from the end portion is set to be as small a driving amount as possible so that the zoom lens 211 is brought into contact with the end portion when, for example, the during-exposure zoom imaging operation ends. Accordingly, the during-exposure zoom imaging operation is performed to prevent a composition that the user intends from breaking down whenever possible.

[An Operation Example of the Imaging Device]

Next, an operation of the imaging device 100 according to the sixth embodiment of the present technology will be described with reference to drawings.

Figure 23:
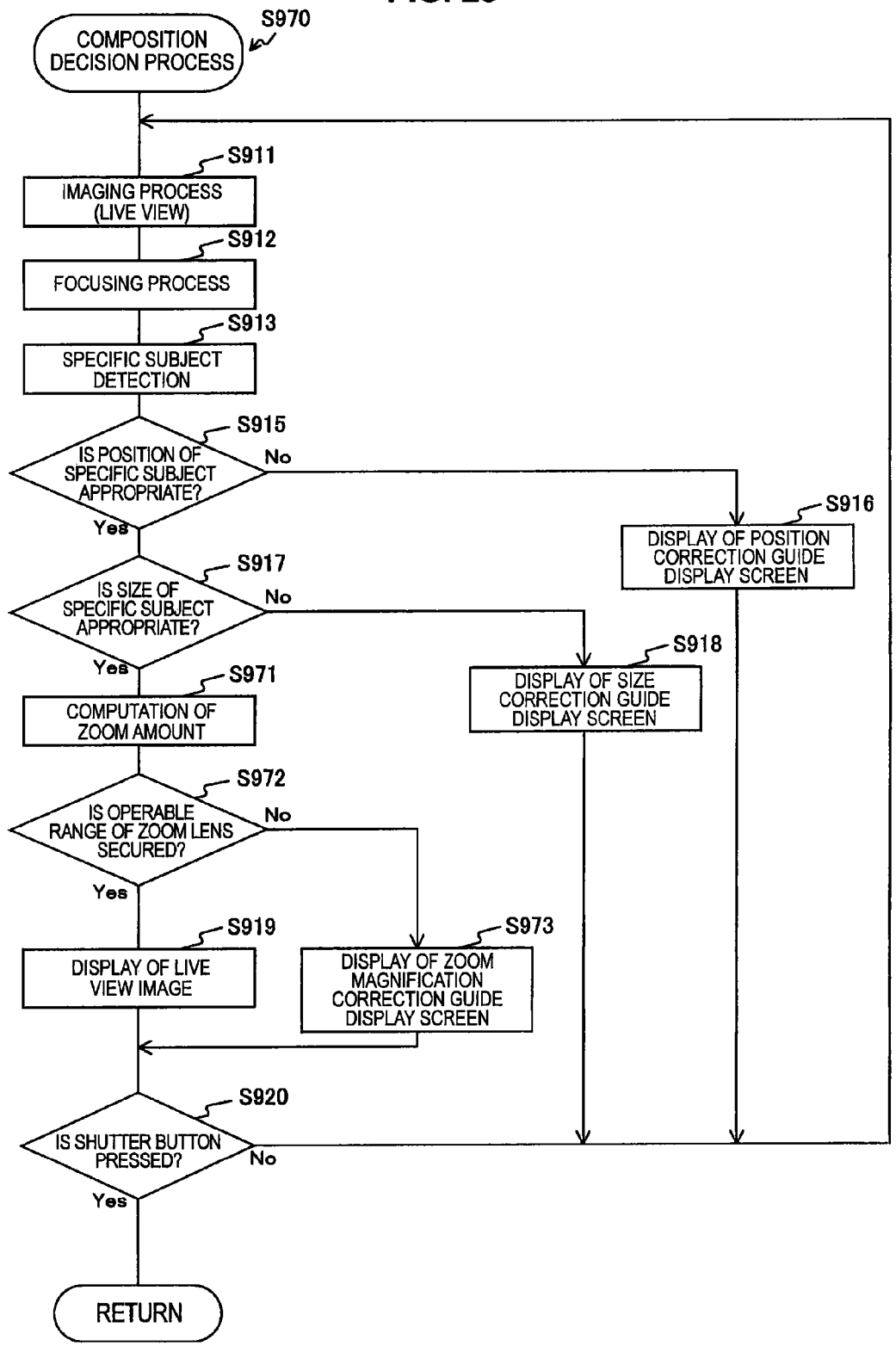
FIG. 23 is a flowchart showing an example of a procedure of a composition decision process (Step S970) in an imaging procedure according to the sixth embodiment of the present technology.

FIG. 23 is a flowchart showing an example of a procedure of a composition decision process (Step S970) in an imaging procedure according to the sixth embodiment of the present technology.

Note that FIG. 23 is a modification example of the composition decision process (Step S910) shown in FIG. 11, and is different in that it is analyzed whether or not driving of a computed zoom amount is executable. Thus, the same reference numerals are given to the procedures common to FIG. 11, and description thereof will be omitted herein.

In determining whether or not the size of the specific subject is appropriate (Step S917), when the size of the specific subject is determined to be appropriate, a zoom amount (zoom magnification) is computed based on information of the subject (Step S971). Then, the movement distance of the zoom lens is computed from the computed zoom amount, and the during-exposure zoom setting unit 330 determines whether or not the zoom lens is brought into contact with the end portion (whether or not an operable range of the zoom lens is secured) (Step S972). Then, when the zoom lens is determined not to be brought into contact with the end portion (an operable range of the zoom lens is secured) (Step S972), a live view image without guide display is displayed (Step S919).

On the other hand, when the zoom lens is determined to be brought into contact with the end portion (the operable range of the zoom lens is not secured) (Step S972), a zoom magnification correction guide display screen (for example, refer to FIG. 22(b)) is displayed on the display unit 272 (Step S973). This zoom magnification correction guide display screen is a screen for causing a zoom magnification to be corrected by notifying that the zoom lens is brought into contact with the operable range thereof. Then, after the zoom magnification correction guide display screen is displayed (Step S973), the process proceeds to Step S920.

Figure 24:
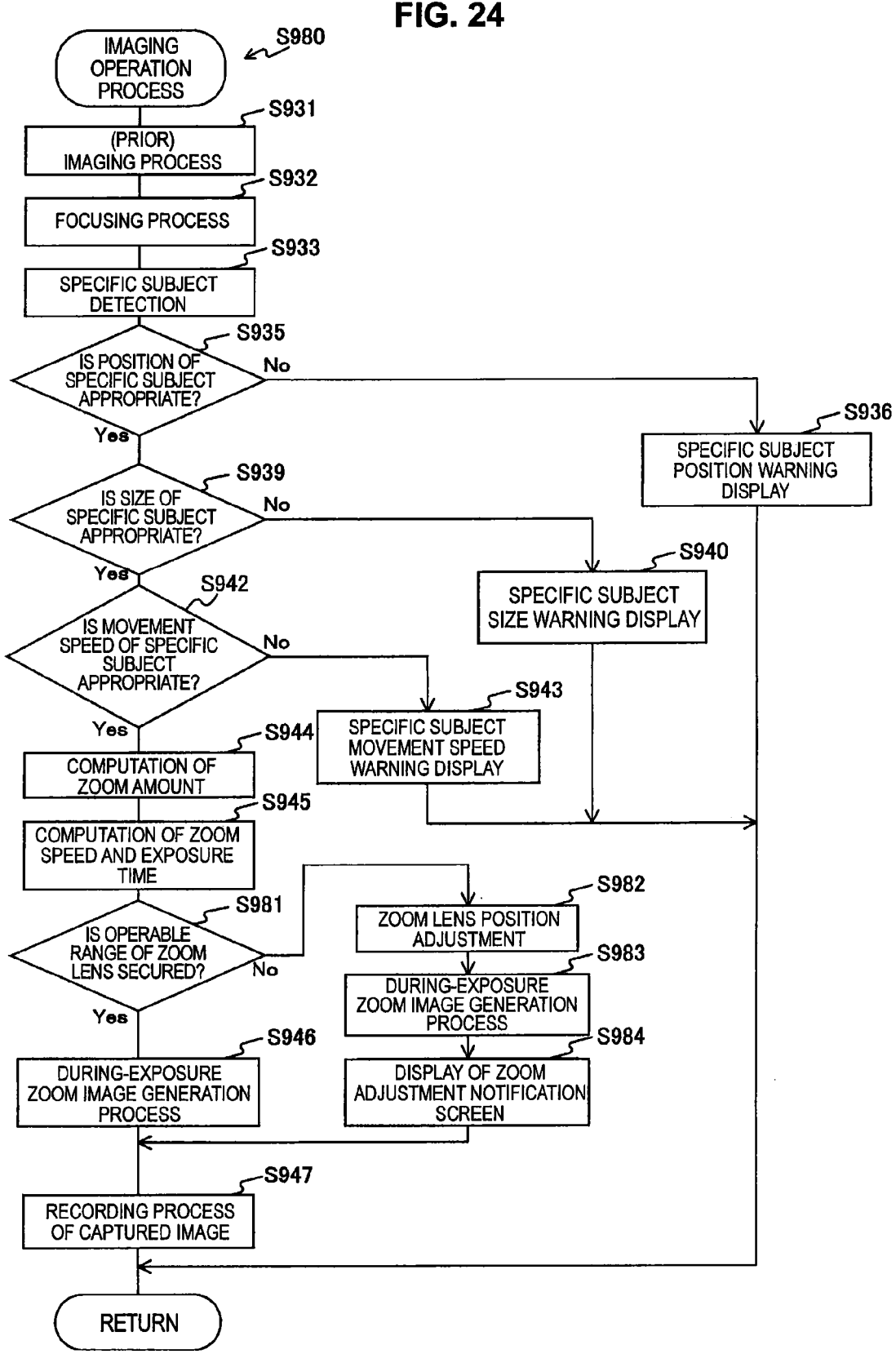
FIG. 24 is a flowchart showing an example of a procedure of an imaging operation process (Step S980) in the imaging procedure according to the sixth embodiment of the present technology.

FIG. 24 is a flowchart showing an example of a procedure of an imaging operation process (Step S980) in the imaging procedure according to the sixth embodiment of the present technology.

Note that FIG. 24 is a modification example of the imaging operation process (Step S930) shown in FIG. 12, and is different in that it is analyzed whether or not driving of a computed zoom amount is executable, and when it is not executable, a during-exposure zoom imaging operation is performed after a position of the zoom lens is adjusted. Thus, the same reference numerals are given to the procedures common in FIG. 12, and description thereof will be omitted herein.

After an exposure time and a zoom speed are computed in a during-exposure zoom imaging operation (Step S945), the during-exposure zoom setting unit 330 determines whether or not an operable range of the zoom lens during the during-exposure zoom imaging operation is secured (Step S981). Then, when it is determined that the operable range of the zoom lens is secured (Step S981), a during-exposure zoom image generation process is performed based on the computed zoom amount, zoom speed, and exposure time (Step S946).

On the other hand, when it is determined that the operable range of the zoom lens is not secured (Step S981), zoom lens position adjustment is performed to secure the operable range of the zoom lens (Step S982). Then, a during-exposure zoom image generation process is performed based on the computed zoom amount, zoom speed, and exposure time (Step S983). Successively, a zoom adjustment notification screen (for example, refer to FIG. 22(b)) for notifying that the during-exposure zoom imaging operation has been performed through zoom lens position adjustment is displayed, and the process proceeds to Step S947.

In this manner, according to the sixth embodiment of the present technology, it is possible to prevent failure of imaging caused by stop of driving of the zoom lens in the middle of the during-exposure zoom imaging operation (reaching an end portion of the operable range), by considering a position of the zoom lens in the barrel.

7. Seventh Embodiment

In the first to sixth embodiments of the present technology, the example in which the subject detection unit 310 computes the degree of a change in a zoom magnification based on a position and a size of a specific subject, and a driving distance of the zoom lens in during-exposure zoom imaging is computed from the degree of a change in a zoom magnification has been described. However, the technology is not limited thereto, and a case in which the relationship between a focal length and a driving distance of a zoom lens is set in advance can also be considered.

Thus, in a seventh embodiment of the present technology, an example in which information indicating the relationship between a focal length and a driving distance of a zoom lens (driving distance information) is retained in advance, and a driving distance of the zoom lens in during-exposure zoom imaging is computed using this driving distance information will be described with reference to FIG. 25.

Note that each configuration of the imaging device in the seventh embodiment of the present technology will be described with reference to FIG. 2 since the configuration is the same as that of the imaging device 100 shown in FIG. 2, and description thereof will be omitted herein. Note that each configuration of an eighth and following embodiments of the present technology will be described with reference to FIG. 2 since the configuration is the same as that of the imaging device 100 shown in FIG. 2.

In addition, since an operation example of the imaging device in the seventh embodiment of the present technology is the same as the operation (refer to FIGS. 10 to 12) of the imaging device 100 in the first embodiment of the present technology except that the detail of Step S944 of FIG. 12 (computation of a zoom amount) is different, description thereof will be omitted.

[An Example of Relationship Between a Focal Length and a Driving Distance of the Zoom Lens]

FIG. 25 is a diagram schematically showing an example of a driving distance of the zoom lens set by the during-exposure zoom setting unit 330 according to the seventh embodiment of the present technology in accordance with the focal length at the start of zooming.

The table (table 1110) shown in FIG. 25 shows the relationship between the focal length (focal length at the start of zooming) when a during-exposure zoom imaging operation is started (at the start of exposure) and the focal length (zoom target focal length) at the end of the during-exposure zoom imaging operation (at the end of exposure). Note that the value obtained by subtracting a focal length at the start of zooming from a zoom target focal length shown in the table 1110 is equivalent to a zoom amount of during-exposure zoom imaging (a driving distance of a zoom lens). In other words, as shown in the table 1110, a zoom amount is set according to a focal length at the start of zooming in the seventh embodiment of the present technology.

When a focal length at the start of zooming is "20 mm" as shown in the table 1110, for example, a zoom amount of "10 mm" (30 mm-20 mm) is set. In addition, when a focal length at the time of zooming is "60 mm", a zoom amount of "30 mm" (90 mm-60 mm) is set.

In this manner, in the during-exposure zoom setting unit 330 of the seventh embodiment of the present technology, a zoom amount according to a focal length at the start of zooming is set. In other words, the during-exposure zoom setting unit 330 of the seventh embodiment of the present technology retains information indicating the relationship of a driving distance of the zoom lens according to a focal length at the start of zooming (driving distance information). Then, the during-exposure zoom setting unit 330 detects a focal length at the start of zooming based on information of the position of the zoom lens 211 supplied from the lens position detection unit 285 when execution of during-exposure zoom imaging is started (after it is determined as appropriate in Step S942 of FIG. 12). Then, the during-exposure zoom setting unit 330 decides a zoom amount according to the focal length at the start of zooming based on the driving distance information. Note that the during-exposure zoom setting unit 330 adjusts the zoom amount according to the size and the number of specific subjects included in a captured image (refer to FIG. 7), and then finally computes the zoom amount.

Then, the during-exposure zoom setting unit 330 computes the exposure time and zoom speed of the image sensor 220 in the during-exposure zoom imaging operation based on the computed zoom amount, the movement speed of the specific subject, and the exposure time computed by the exposure control unit 290 (refer to Step S945 of FIG. 12). Successively, the during-exposure zoom image generation process is performed based on the computed zoom amount, zoom speed, and exposure time (refer to Step S946 of FIG. 12).

In this manner, by setting a zoom amount according to a focal length at the start of zooming, an appropriate zoom amount can be set. For example, imaging can be performed by making the degree of flow in a radial shape equal. Note that, since a focal length corresponds to an angle of view, a zoom amount according to an angle of view can be set according to the seventh embodiment of the present technology.

8. Eighth Embodiment

In the first embodiment of the present technology, the example in which the subject detection unit 310 recognizes the face of a person as a specific subject has been described. While not given particular consideration in the first embodiment of the present technology, a facial expression is difficult to see if the face of a person is too small, and thus it is considered that a face large enough for imaging is appropriate for a during-exposure zoom imaging. In addition, as shown in FIG. 14, when the face of a person is a specific subject, a facial expression of the person can be imaged well by reducing a zoom amount.

Thus, in an eighth embodiment of the present technology, an example in which a zoom amount is computed based on the distance from the imaging device to a specific subject (subject distance) and a focal length will be described with reference to FIG. 26. Note that, since an example of computation of a subject distance has been described in FIG. 5, description thereof will be omitted herein.

[An Example of Relationship Between the Distance to and the Type of a Specific Subject and a Driving Distance of the Zoom Lens]

FIG. 26 is a diagram schematically showing an example of a driving distance of the zoom lens computed by the during-exposure zoom setting unit 330 in accordance with the distance to and the type of a specific subject according to the eighth embodiment of the present technology.

The table (table 1120) shown in FIG. 26 shows the relationship between a distance to a specific subject (column 1121) and a during-exposure zoom imaging operation when a person is included in the specific subject (column 1122) in a case in which a focal length at the start of zooming (starting focal length) is 20 mm. In addition, the table 1120 shows the relationship between a distance to a specific subject (column 1121) and a during-exposure zoom imaging operation when a person is not included in the specific subject (column 1123) in the case of the same starting focal length (20 mm).

As shown in column 1121 of the table 1120, the during-exposure zoom setting unit 330 of the eighth embodiment of the present technology computes a zoom amount (a difference between a zoom target focal length and a focal length at the start of zooming) based on the distance from the imaging device to a specific subject (subject distance). In addition, as shown in columns 1122 and 1123 of the table 1120, the during-exposure zoom setting unit 330 starts a during-exposure zoom imaging operation after the focal length at the start of zooming is adjusted according to a subject distance when a person is included in the specific subject.

When a person is included in the specific subject, and the subject distance is smaller than 5 meters in the case in which the starting focal length is 20 mm as shown in the table 1120, for example, the zoom target focal length is set to be 22 mm (the zoom amount is 2 mm). On the other hand, when a person is not included in the specific subject and the subject distance is smaller than 5 meters in the case in which the starting focal length is 20 mm, the zoom target focal length is set to be 25 mm (the zoom amount is 5 mm). In this manner, by adjusting a zoom amount according to the type of a specific subject (whether or not a person is included therein), the zoom amount can be reduced when there is a person, and accordingly, a facial expression of the person can be imaged well.

In addition, when a person is included in the specific subject and the subject distance is in the range of 5 meters to 15 meters in the case in which the stating focal length is 20 mm, the zoom amount is set to be 3 mm after the starting focal length is set to be 30 mm (after performing zoom-in). In other words, during-exposure zoom imaging is performed in which the focal length of the zoom lens is driven from 30 mm to 33 mm. On the other hand, when a person is not included in the specific subject and the subject distance is in the range of 5 meters to 15 meters in the case in which the starting focal length is 20 mm, during-exposure zoom imaging is performed in which the focal length of the zoom lens is driven from 20 mm to 30 mm.

In addition, when a person is included in the specific subject and the subject distance is greater than 15 meters in the case in which the starting focal length is 20 mm, the zoom amount is set to be 5 mm after the starting focal length is set to be 50 mm (after performing zoom-in). In other words, during-exposure zoom imaging is performed in which the focal length of the zoom lens is driven from 50 mm to 55 mm. On the other hand, when a person is not included in the specific subject and the subject distance is greater than 15 meters in the case in which the starting focal length is 20 mm, during-exposure zoom imaging is performed in which the focal length of the zoom lens is driven from 20 mm to 40 mm.

In this manner, when a person is included in the specific subject, during-exposure zoom imaging is performed with a small zoom amount after zoom-in is performed in advance (after the size is adjusted to a size at which a facial expression is easily seen) so that a facial expression is clearly seen. Note that zoom-in performed in advance is set according to a subject distance so as to reduce deviation from a composition that a user decided (table 1120 is an example of three-stage setting). In addition, a small zoom amount is set according to a starting focal length after zoom-in.

Note that, when a person is not included in the specific subject, during-exposure zoom imaging is performed by setting the focal length when the composition is decided to be the starting focal length. In this case, a zoom amount is adjusted according to the subject distance, and accordingly, a favorable during-exposure zoom captured image considering the distance from the imaging device to the specific subject can be obtained.

Note that, in FIG. 26, it is assumed that the starting focal length is 20 mm, but also when a focal length is another distance, a zoom amount is set based on a subject distance and the type of a subject (whether it is a person or not) in the same manner.

Note that, in the table 1120, the example in which during-exposure zoom imaging is performed after performing zoom-in according to a subject distance when a person is included in a specific subject has been described, but the present technology is not limited thereto. The size of a person that is a specific subject in a captured image changes due to factors such as the length of a starting focal length, a subject distance, and the performance of an imaging device (the size of an image sensor). In other words, a zoom operation when a size is adjusted to a size at which a facial expression is easily seen may be decided according to the size of a person that is a specific subject. In the table 1120, the case in which zoom-in is performed due to a small size has been shown, but in a case of an appropriate size, during-exposure zoom imaging may be performed without performing zoom-in, but in a case of an excessive size, during-exposure zoom imaging may be performed after performing zoom-out.

In addition, the example in which during-exposure zoom imaging is performed by setting a focal length when a composition is decided to be a starting focal length in a case in which a person is not included in a specific subject has been described, but the present technology is not limited thereto. Even when a thing other than a person is a specific subject, if the size is excessively small, there are cases in which a proper image is not obtained in during-exposure zoom imaging (for example, a case of an image in which it is difficult to know what is focused on). For this reason, when a person is not included in a specific subject, if the size of the specific subject is small (for example, less than 1/10 of the screen area), during-exposure zoom imaging may be performed after performing zoom-in.

[An Operation Example of the Imaging Device]

Next, an operation of the imaging device 100 according to the eighth embodiment of the present technology will be described with reference to a drawing.

Figure 27:
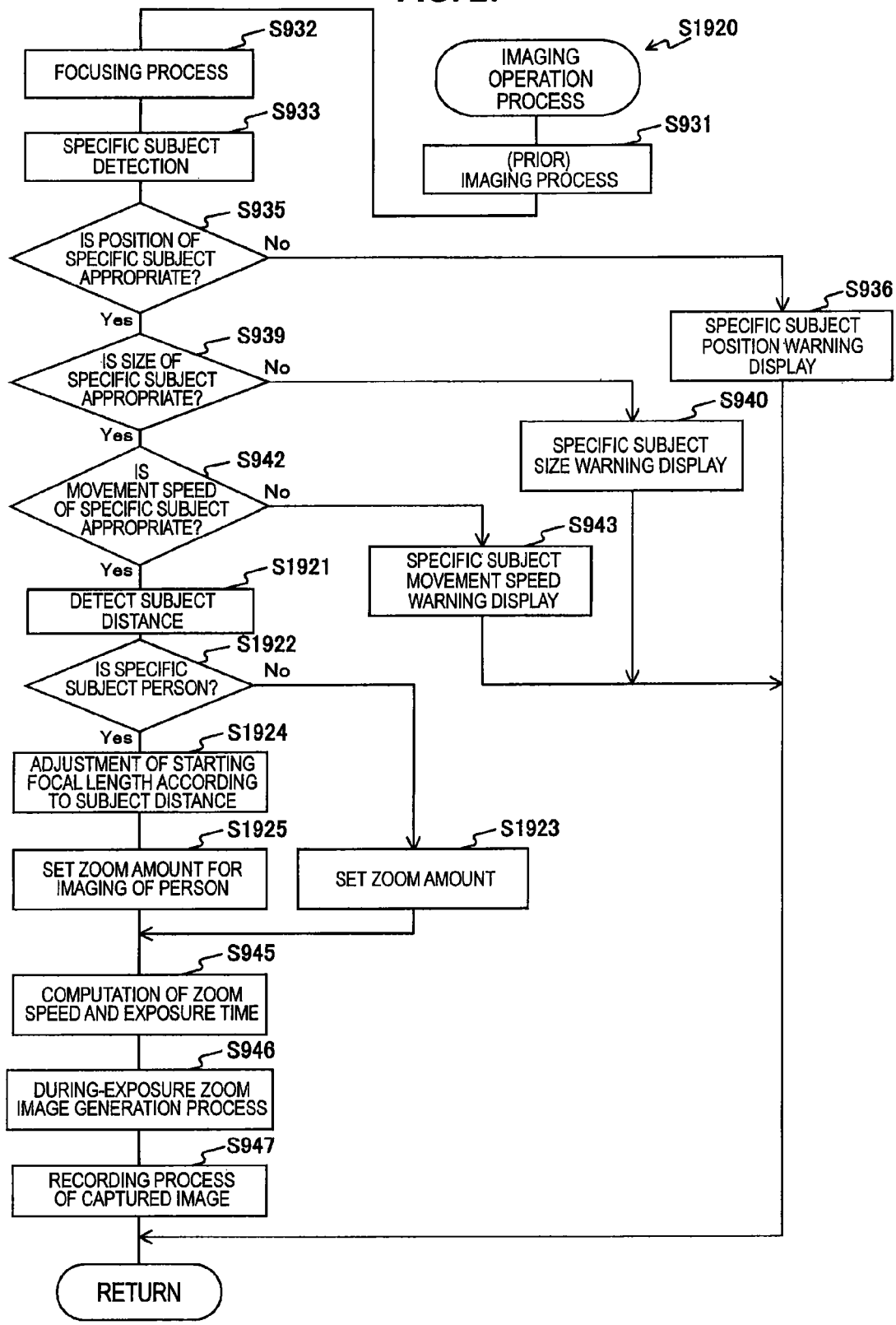
FIG. 27 is a flowchart showing an example of a procedure of an imaging operation process (Step S1920) in an imaging procedure according to the eighth embodiment of the present technology.

FIG. 27 is a flowchart showing an example of a procedure of an imaging operation process (Step S1920) in an imaging procedure according to the eighth embodiment of the present technology.

Note that FIG. 27 is a modification example of the imaging operation process (Step S930) shown in FIG. 12, and is different in that a process of adjusting a starting focal length is added when a person is a specific subject and a subject distance is used in computation of a zoom amount. Thus, the same reference numerals are given to the procedures common in FIG. 12, and description thereof will be omitted herein.

When the movement speed of the specific subject is determined to be appropriate in Step S942, the during-exposure zoom setting unit 330 detects the distance between the specific subject and the imaging device (subject distance) (Step S1921). Then, the during-exposure zoom setting unit 330 determines whether or not a person is included in the specific subject (Step S1922). Then, when a person is determined not to be included in the specific subject (Step S1922), a zoom amount in a during-exposure zoom imaging operation is computed (Step S1923) based on the subject distance, and the starting focal length, and the process proceeds to Step S945.

On the other hand, when a person is determined to be included in the specific subject (Step S1922), the starting focal length is adjusted according to the subject distance (Step S1924). Accordingly, zoom-in is performed when the subject distance is great, and accordingly, a focal length at the start of a during-exposure zoom imaging operation is set. Then, a zoom amount in the during-exposure zoom imaging operation is computed based on the starting focal length after the adjustment and the type (person) of the subject (Step S1925), and the process proceeds to Step S945.

In this manner, according to the eighth embodiment of the present technology, a zoom amount can be decided according to a subject distance. In other words, based on information relating to the distance from the imaging device to a specific subject (subject distance), control content of a during-exposure zoom imaging operation can be decided. In addition, according to the eighth embodiment of the present technology, when a person is a specific subject, a focal length at the start of a during-exposure zoom imaging operation is adjusted according to the subject distance, and then the during-exposure zoom imaging operation can be performed at the position of the zoom lens after the adjustment. Since a standard size of the face of a person is known beforehand, it is possible to capture an image in which a facial expression is easily seen by performing a during-exposure zoom imaging operation after a focal length at the start of the operation is adjusted (adjusted beforehand to a size at which the facial expression can be easily seen) according to a subject distance.

9. Ninth Embodiment

In the first to eighth embodiments of the present technology, description has been provided on the assumption that the number of zoom directions of a during-exposure zoom imaging operation is one (zoom-in direction). However, the during-exposure zoom imaging operation can be performed even by performing imaging while the zoom lens is driven in a zoom-out direction. The first to eighth embodiments of the present technology can be applied also to the during-exposure zoom imaging operation in the zoom-out direction in the same manner. In addition, the during-exposure zoom setting unit 330 deciding in which direction between the zoom-in direction and the zoom-out direction the zoom lens is to be driven so as to perform a during-exposure zoom imaging, based on subject information, may also be considered.

Thus, in a ninth embodiment of the present technology, an example of a during-exposure zoom imaging operation in which a zoom direction of the during-exposure zoom imaging operation in an initial state (default) is set to be the zoom-in direction and the zoom direction is changed to the zoom-out direction according to subject information will be described.

[An Example of Displaying a Warning of Zoom Direction Inversion and a Warning of No Imaging]

FIG. 28 is a schematic diagram showing an example of an image displayed when the during-exposure zoom setting unit 330 determines that a size of a specific subject is not appropriate for a during-exposure zoom imaging operation in the zoom-in direction according to the ninth embodiment of the present technology.

FIG. 28(*a*) shows a live view image (image 1210) with guide display displayed when it is analyzed that a during-exposure zoom imaging operation can be executed in the zoom-out direction but will not be executed in the zoom-in direction during a live view operation in a during-exposure zoom mode. This image 1210 shows a frame (frame 1211) for defining the upper limit of a size and a text display region (text display region 1214). In addition, as a specific subject, this image 1210 shows the face of a person (face 1212) that is large enough to extend beyond the frame 1211 but not large enough to extend beyond the image 1210 around the center of the image 1210.

Herein, a condition under which the image 1210 is displayed will be described. Since, in the imaging device 100, a zoom direction of a during-exposure zoom imaging operation in an initial state (default) is set to the zoom-in direction, when the size of the specific subject falls within the frame 1211, the during-exposure zoom imaging operation in the zoom-in direction is performed. On the other hand, when the size of the specific subject extends beyond the frame 1211 but does not extend beyond the image 1210, it is determined whether or not the during-exposure zoom imaging operation in the zoom-out direction is possible. A case in which the during-exposure zoom imaging operation in the zoom-out direction is possible refers to a case in which the zoom lens is not brought into contact with an end portion during driving thereof in the zoom-out direction (an operable range of the zoom lens is secured). Note that, when the size also extends beyond the image 1210, the size of the specific subject is determined not to be appropriate for the during-exposure zoom imaging operation.

In this manner, when the size of the specific subject extends beyond the frame 1211 but does not extend beyond the image 1210 during the live view operation of the during-exposure zoom mode, it is determined whether or not the during-exposure zoom imaging operation in the zoom out direction is possible. Then, when the during-exposure zoom setting unit 330 determines that the operation is possible, a live view image with guide display as shown in the image 1210 is shown on the display unit 272, and a user is notified that imaging is performed using the during-exposure zoom imaging operation in the zoom-out direction. Note that, when the operation is determined not to be possible (be impossible), an image (image 1220) as shown in next FIG. 28(*b*) is displayed.

FIG. 28(*b*) shows a live view image (image 1220) with guide display displayed when it is analyzed that a during-exposure zoom imaging operation cannot be executed in both of the zoom-in direction and the zoom-out direction during the live view operation in the during-exposure zoom mode. Note that, in the image 1220, a frame 1221, a face 1222, and a text display region 1224 respectively correspond to the frame 1211, the face 1212, and the text display region 1214 in the image 12310 of FIG. 28(*a*).

As shown in the image 1220, when the during-exposure zoom setting unit 330 analyzes whether or not the during-exposure zoom imaging operation in the zoom-out direction is possible and then analyzes that the operation is not possible, the user is notified that the during-exposure zoom imaging operation is not possible.

Next, a difference between imaging using the during-exposure zoom imaging operation in the zoom-in direction and imaging using the during-exposure zoom imaging operation in the zoom-out direction will be described with reference to FIGS. 29 and 30.

[An Example of During-Exposure Zoom Imaging Operations in the Zoom-in Direction and the Zoom-Out Direction]

FIG. 29 is a diagram schematically showing an example of an image captured by the imaging device 100 according to the ninth embodiment of the present technology in a during-exposure zoom imaging operation in the zoom-in direction.

FIG. 29 schematically shows an image (image 1230) showing a subject at the start of a during-exposure zoom imaging operation and an image (image 1240) captured using the during-exposure zoom imaging operation.

Note that, since a frame 1231 and a face 1232 of the image 1230 correspond to the frame and the face shown in FIG. 28, description thereof will be omitted herein. The image 1240 shows a face 1242 that has the same size as that of the face 1232 of the image 1230 and shows the size of the specific subject at the start of a during-exposure zoom imaging operation (at the start of exposure) in solid line. Moreover the image 1240 shows a face 1243 showing the size of the specific subject at the end of the during-exposure zoom imaging operation (at the end of exposure) in a dotted line.

As shown in the image 1230, when the face 1232 falls within the frame 1231, the during-exposure zoom setting unit 330 determines that a default during-exposure zoom imaging operation (in the zoom-in direction) is possible. Then, the during-exposure zoom imaging operation in the zoom-in direction is performed when the shutter button is pressed, and then the image (image 1240) captured using the during-exposure zoom imaging operation in the zoom-in direction is generated.

FIG. 30 is a diagram schematically showing an example of an image captured by the imaging device 100 according to the ninth embodiment of the present technology in the during-exposure zoom imaging operation in the zoom-out direction.

FIG. 30 schematically shows an image (image 1250) showing a subject at the start of a during-exposure zoom imaging operation and an image (image 1260) captured using the during-exposure zoom imaging operation.

Note that, since frame 1251 and a face 1252 of the image 1250 correspond to the frame and the face shown in FIG. 28, description thereof will be omitted herein. In the image 1260, a face 1262 indicating the size of the specific subject at the start of the during-exposure zoom imaging operation is shown in solid lines, and a face 1263 indicating the size of the specific subject at the end of the during-exposure zoom imaging operation is shown in dotted lines.

As shown in the image 1250, when the face 1252 does not extend beyond the image 1250 but does extend beyond the frame 1251 (when the size exceeds the upper limit), it is determined whether or not the during-exposure zoom imaging operation in the zoom-out direction is possible. Then, when it is determined to be possible, the during-exposure zoom imaging operation in the zoom-out direction is performed when the shutter button is pressed, and then the image (image 1260) captured using the during-exposure zoom imaging operation in the zoom-out direction is generated.

[An Operation Example of the Imaging Device]

Next, an operation of the imaging device 100 according to the ninth embodiment of the present technology will be described with reference to drawings.

Figure 31:
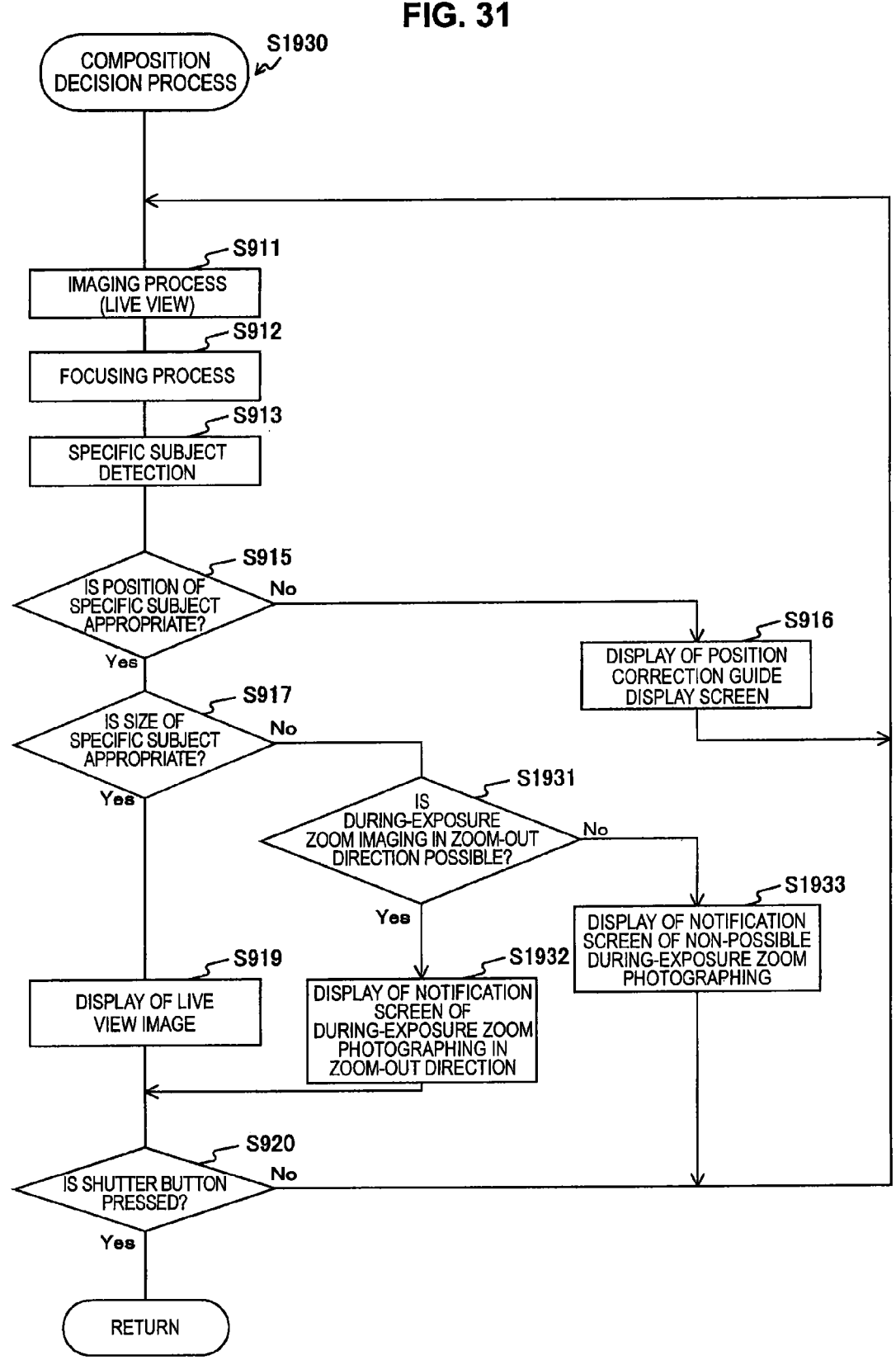
FIG. 31 is a flowchart showing an example of a procedure of a composition decision process (Step S1930) in an imaging procedure according to the ninth embodiment of the present technology.

FIG. 31 is a flowchart showing an example of a procedure of a composition decision process (Step S1930) in an imaging procedure according to the ninth embodiment of the present technology.

Note that FIG. 31 is a modification example of the composition decision process (Step S910) shown in FIG. 11, and is different in that it is determined whether or not a during-exposure zoom imaging operation in the zoom-out direction is executable when the size of the subject is not appropriate for the during-exposure zoom imaging operation in the zoom-in direction (during-exposure zoom photographing). Thus, the same reference numerals are given to the procedures common in FIG. 11, and description thereof will be omitted herein.

In determining whether or not the size of the specific subject is appropriate (Step S917), when the size of the specific subject is determined not to be appropriate, the during-exposure zoom setting unit 330 determines whether or not a during-exposure zoom imaging operation (during-exposure zoom photographing) in the opposite direction (zoom-out direction) is possible (Step S1931). When the size of the specific subject exceeds the size of the image in the determination of Step S1931, it is determined that the during-exposure zoom imaging operation is not possible in both of the zoom-in and zoom-out directions. In addition, when the size of the specific subject does not exceed the size of the image in the determination of Step S1931, it is analyzed whether or not the zoom lens is brought into contact with an end portion during driving in the zoom-out direction based on position information of the zoom lens supplied from the lens position detection unit 285. In other words, when the size thereof does not exceed the size of the image, it is analyzed whether or not an operable distance of the zoom lens in the zoom-out direction is secured.

Then, when the during-exposure zoom imaging operation in the zoom-out direction is determined not to be possible (Step S1931), a notification screen notifying that the during-exposure zoom imaging operation is not possible (for example, refer to FIG. 28(b)) is displayed on the display unit 272 (Step S1933). Then, after Step S1933, the process returns to Step S911.

On the other hand, when the during-exposure zoom imaging operation in the zoom-out direction is determined to be possible (Step S1931), a notification screen notifying the during-exposure zoom imaging operation in the zoom-out direction (for example, refer to FIG. 28(a)) is displayed on the display unit 272 (Step S1932). Then, after Step S1932, the process returns to Step S920.

Figure 32:
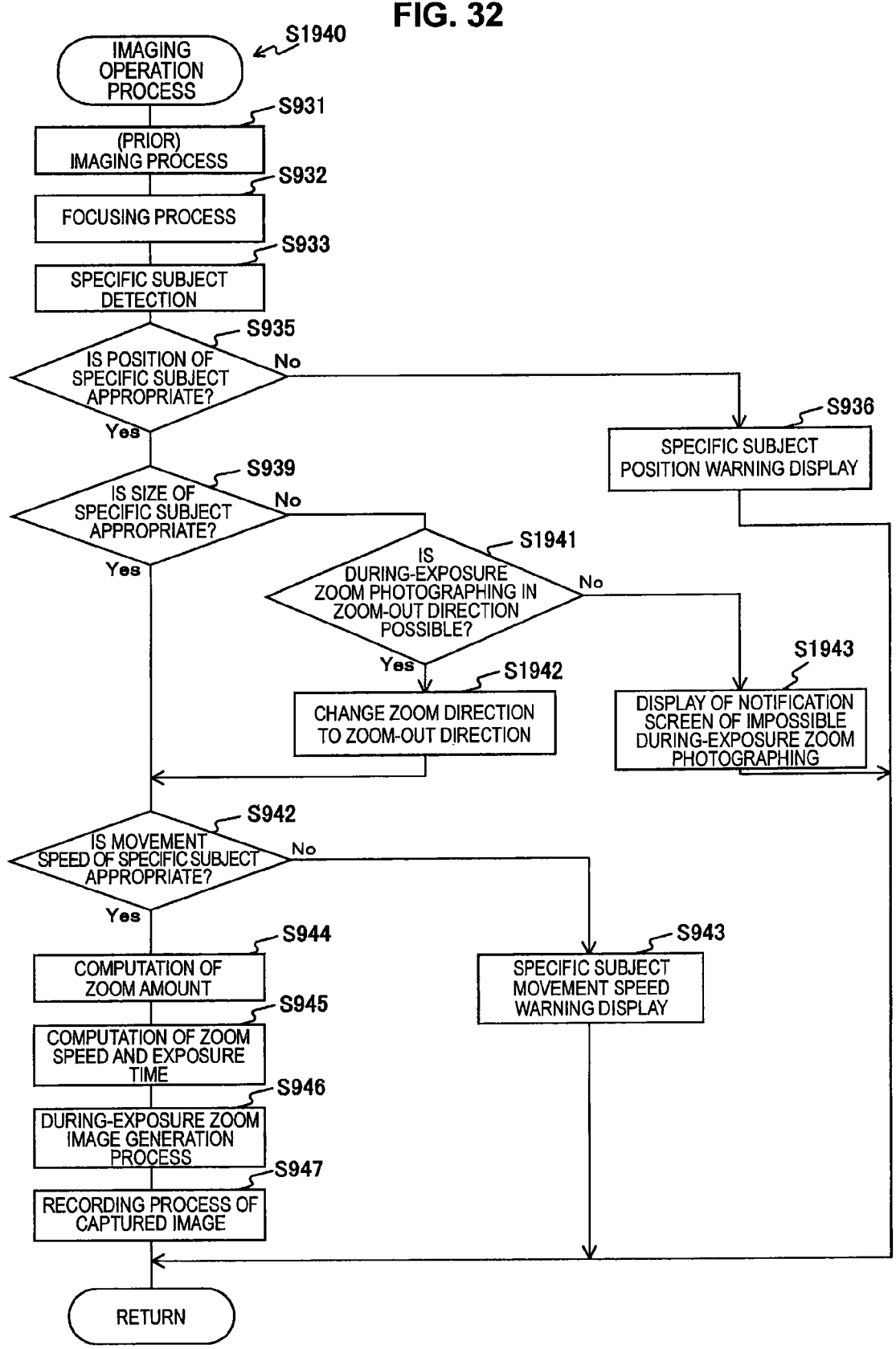
FIG. 32 is a flowchart showing an example of a procedure of an imaging operation process (Step S1940) in the imaging procedure according to the ninth embodiment of the present technology.

FIG. 32 is a flowchart showing an example of a procedure of an imaging operation process (Step S1940) in the imaging procedure according to the ninth embodiment of the present technology.

Note that FIG. 32 is a modification example of the imaging operation process (Step S930) shown in FIG. 12, and is different in that it is determined whether or not the during-exposure zoom imaging operation in the zoom-out direction is executable when the size of the subject is not appropriate for the during-exposure zoom imaging operation in the zoom-in direction. Thus, the same reference numerals are given to the procedures common in FIG. 12, and description thereof will be omitted herein.

In determining whether or not the size of the specific subject is appropriate in Step S939, when the size of the specific subject is determined not to be appropriate (Step S939), the during-exposure zoom setting unit 330 determines whether or not a during-exposure zoom imaging operation in the opposite direction (zoom-out direction) is possible (Step S1941).

Note that since Step S1941 is the same as Step S1931 shown in FIG. 31, detailed description thereof will be omitted herein.

Then, when the during-exposure zoom imaging operation in the zoom-out direction is determined not to be possible (Step S1941), a notification screen notifying that the during-exposure zoom imaging operation is not possible (for example, refer to FIG. 28(b)) is displayed on the display unit 272 (Step S1943). Then, after Step S1943, the procedure of the imaging operation process ends.

On the other hand, when the during-exposure zoom imaging operation in the zoom-out direction is determined to be possible (Step S1941), the zoom direction in the during-exposure zoom imaging operation is changed from the default direction (zoom-in direction) to the zoom-out direction (Step S1942). Then, after Step S1942, the process proceeds to Step S942. Note that, since Step S942 and the following steps are the same as those in FIG. 12, description thereof will be omitted herein.

As above, according to the ninth embodiment of the present technology, it is possible to decide a zoom direction of the during-exposure zoom imaging operation based on the size of the specific subject. In other words, according to the ninth embodiment of the present technology, by deciding the zoom direction based on subject information, the during-exposure zoom imaging operation can be easily performed.

Note that, in the ninth embodiment of the present technology, the example in which the zoom direction is switched based on the size at the start of the during-exposure zoom imaging operation has been described, but the technology is not limited thereto. Predicting the size at the end of the during-exposure zoom imaging operation based on a zoom amount of the during-exposure zoom imaging operation, and then switching the direction when the predicted size is determined not to be fit in a captured image may also be considered.

10. Tenth Embodiment

In the ninth embodiment of the present technology, the example in which, when the size of the specific subject is not appropriate for a during-exposure zoom imaging operation in the default direction (zoom-in direction), the zoom direction is inverted and then a during-exposure zoom imaging operation in the zoom-out direction is performed has been described. With the configuration, the during-exposure zoom imaging operation can be performed also when the size of the specific subject at the start of the during-exposure zoom imaging operation is excessively large. Note that, to perform the during-exposure zoom imaging operation for a specific subject having an excessively large size, a case in which a during-exposure zoom imaging operation in the zoom-in direction is performed by performing automatic zoom-out to reduce the size can also be considered, in addition to a during-exposure zoom imaging operation in the zoom-out direction.

Thus, in a tenth embodiment of the present technology, the example in which, when the size of a specific subject is excessively large, the during-exposure zoom imaging operation in the zoom-in direction is performed after performing automatic zoom-out to reduce the size will be described with reference to FIGS. 33 to 36.

[An Example of Determining a Size]

FIG. 33 is a schematic diagram illustrating a size of a specific subject analyzed by the during-exposure zoom setting unit 330 according to the tenth embodiment of the present technology.

Note that, in the tenth embodiment of the present technology, an example in which the size of the specific subject at the end of the during-exposure zoom imaging operation (at the end of exposure) is predicted and analysis is performed using the predicted size (predicted size) will be shown.

FIG. 33(a) shows an example of a determination method when the size of the specific subject in the during-exposure zoom imaging operation in the zoom-in direction is determined to be appropriate according to the tenth embodiment of the present technology. In addition, FIG. 33(b) shows an example when it is determined that a during-exposure zoom imaging operation in the zoom-in direction is to be performed after performing zoom-out due to an excessive size of the specific subject according to the tenth embodiment of the present technology.

FIG. 33(a) shows an image (image 1310) for describing a case in which the size is determined to be appropriate for the during-exposure zoom imaging operation in the zoom-in direction. This image 1310 shows a face (face 1312) indicating an example of a size of a specific subject when the during-exposure zoom imaging operation in the zoom-in direction is determined to be appropriate. In addition, this image 1310 shows the size of the face 1312 (predicted size) at the end of imaging when the during-exposure zoom imaging operation in the zoom-in direction is performed for the face 1312 using a face (face 1313) in dotted lines.

Herein, a case in which the size of the specific subject in the during-exposure zoom imaging operation in the zoom-in direction is determined to be appropriate will be described with reference to FIG. 33(a). The during-exposure zoom setting unit 330 of the tenth embodiment of the present technology predicts the current size (at the start of the during-exposure zoom imaging operation) of the specific subject and the size thereof at the end of the during-exposure zoom imaging operation based on the zoom amount of the during-exposure zoom imaging operation. In other words, as shown in the image 1310 of FIG. 33(a), the size (of the face 1313) at the end of the operation is predicted based on the current size (of the face 1312). Then, the during-exposure zoom setting unit 330 determines whether or not the specific subject imaged in the during-exposure zoom imaging operation falls within the captured image based on the predicted size (of the face 1313). When the size falls within (does not extend beyond) the image, the during-exposure zoom setting unit 330 determines that the size of the specific subject is appropriate, and sets the current size of the specific subject to be the size at the start of the during-exposure zoom imaging operation.

FIG. 33(b) shows an image (image 1320) for describing a case in which it is determined that the during-exposure zoom imaging operation in the zoom-in direction is performed after performing zoom-out since the size of the specific subject is excessively large. This image 1320 shows a face (face 1322) indicating an example of the size of the specific subject when the during-exposure zoom imaging operation in the zoom-in direction is performed after performing zoom-out. In addition, this image 1320 shows the size (predicted size) of the face 1322 at the end of imaging when the during-exposure zoom imaging operation in the zoom-in direction is performed for the face 1322 using a face in dotted lines (face 1323).

As shown in FIG. 33(b), it is determined that the size of the specific subject is not appropriate when the predicted size (of the face 1323) of the specific subject does not fall within the captured image. Then, imaging is to be performed using a during-exposure zoom imaging operation, zoom-out is performed and then the during-exposure zoom imaging operation in the zoom-in direction is performed. In other words, after the size of the specific subject at the start of the during-exposure zoom imaging operation is adjusted, the during-exposure zoom imaging operation in the zoom-in direction is performed. Note that, when the size of the specific subject at the start of the operation already does not fall within the captured image, the size of the specific subject is determined not to be appropriate for the during-exposure zoom imaging operation, and accordingly, the during-exposure zoom imaging operation is not performed.

In other words, when the current size of the captured image falls within the captured image, and the predicted size at the end of the operation does not fall within the captured image, the during-exposure zoom imaging operation in the zoom-in direction is performed after performing zoom-out. Note that, since the adjustment of the size will be described in FIG. 35, description thereof will be omitted herein.

Next, guide display displayed on the display unit 272 during a live view operation in a during-exposure zoom mode will be described.

[An Example of Guide Display]

FIG. 34 is a schematic diagram showing an example of an image displayed when a size of a specific subject is determined not to be appropriate and when a during-exposure zoom imaging operation is determined to be performed after zoom-out according to the tenth embodiment of the present technology.

FIG. 34(a) shows a live view image (image 1330) with guide display displayed when a size of a specific subject does not fall within a captured image during a live view operation of a during-exposure zoom mode. This image 1330 shows a face (face 1332) of which the size does not fall within the captured image and a text display region (text display region 1334). This text display region 1334 shows text promoting zoom-out to execute a during-exposure zoom imaging operation.

As shown in the image 1330, when the current size (the size at the start of the during-exposure zoom imaging operation) already does not fall within the captured image, a live view image with guide display as shown in the image 1330 is displayed on the display unit 272. Accordingly, a user is notified of an action necessary for starting the during-exposure zoom imaging operation.

FIG. 34(b) shows a live view image (image 1340) with guide display displayed when the during-exposure zoom setting unit 330 analyzes that the predicted size does not fall within the captured image during the live view operation of the during-exposure zoom mode. This image 1340 shows a face (face 1342) of which the size narrowly falls within the captured image and a text display region (text display region 1344). This text display region 1344 shows text notifying that the during-exposure zoom imaging operation in the zoom-in direction is performed after performing zoom-out.

As shown in the image 1340, when the size at the end of the during-exposure zoom imaging operation in the zoom-in direction (predicted direction) extends beyond the captured image while the current size falls within the captured image, a live view image with guide display as shown in the image 1340 is displayed on the display unit 272. Then, when the shutter button is pressed in the state in which the image 1340 is displayed, zoom-out is performed according to a zoom amount computed for a during-exposure zoom imaging operation and then the during-exposure zoom imaging operation in the zoom-in direction is performed.

[An Example of Transition of a Specific Subject]

Figure 35:
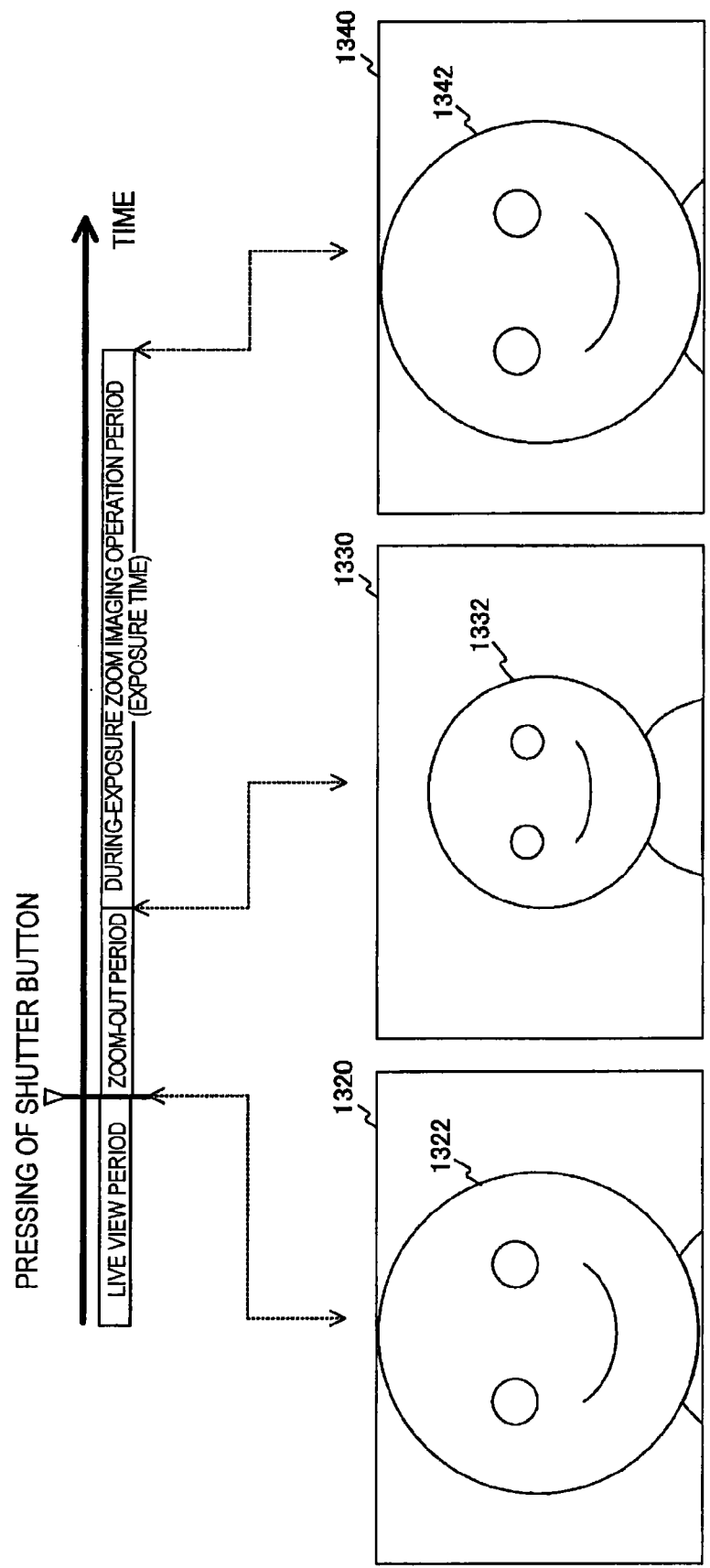
FIG. 35 is a diagram schematically showing the relationship between transition of operations of the imaging device and transition of the sizes of the specific subjects when a during-exposure zoom imaging operation in the zoom-in direction is determined to be performed after performing zoom-out according to the tenth embodiment of the present technology.

FIG. 35 is a diagram schematically showing the relationship between transition of operations of the imaging device and transition of the sizes of the specific subjects when a during-exposure zoom imaging operation in the zoom-in direction is determined to be performed after performing zoom-out according to the tenth embodiment of the present technology.

FIG. 35 shows a period of a live view operation (live view period), a period in which zoom-out is performed before a during-exposure zoom imaging operation is performed (zoom-out period), and a period in which a during-exposure zoom imaging operation is performed (during-exposure zoom imaging operation period (exposure period) on a time axis. Note that a length indicating each period (time) is schematic, and does not indicate the ratio of a time length of each period. Note that a length indicating each period (time) is also schematic on a time axis shown in FIG. 35 and the following drawings.

In addition, FIG. 35 shows an image (image 1320) for indicating a size of a specific subject when the shutter button is pressed and then the live view period ends. In addition, FIG. 35 shows an image (image 1330) for indicating a size of a specific subject at the end of zoom-out before a during-exposure zoom imaging operation and an image (image 1340) for indicating a size at the end of the during-exposure zoom imaging operation in the zoom-in direction. Note that the size of the specific subject (face 1322) in the image 1320 is the same as that of the specific subject (face 1342) in the image 1340. The size (of the face 1332) of the specific subject in the image 1330 is smaller than those of the face 1322 and the face 1342.

Herein, a during-exposure zoom imaging operation after zoom-out by the imaging device 100 will be described. As shown in the image 1320, if the shutter button is pressed when the specific subject of which the predicted size does not fall within the captured image (also refer to FIG. 33(*b*)) is imaged, it is determined that the during-exposure zoom imaging operation in the zoom-in direction is performed after performing zoom-out. When this determination is made, the during-exposure zoom setting unit 330 performs zoom-out according to a computed zoom amount of the during-exposure zoom imaging operation. In other words, as shown in the image 1330, after the zoom-out (at the end of the zoom-out period) the size (of the face 1332) of the specific subject is reduced to be smaller than the size (of the face 1322) of the specific subject before the zoom-out. Then, a during-exposure zoom imaging operation is performed in which the size (of the face 1332) of the specific subject at the end of the zoom-out is set to be the size at the start thereof and the size (of the face 1322) of the specific subject at the start of the zoom-out is set to be the size of the end thereof.

[An Example of Imaging in a During-Exposure Zoom Imaging Operation after Zoom-Out]

Figure 36:
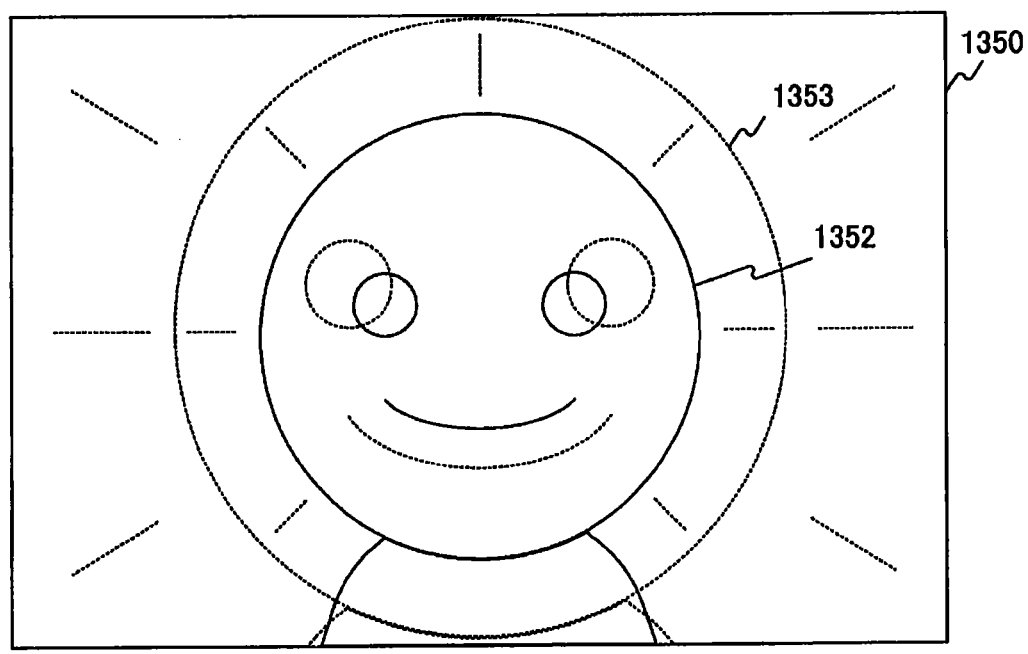
FIG. 36 is a diagram schematically showing a captured image when a during-exposure zoom imaging operation in the zoom-in direction is determined to be performed after zoom-out according to the tenth embodiment of the present technology.

FIG. 36 is a diagram schematically showing a captured image when it is determined that a during-exposure zoom imaging operation in the zoom-in direction is performed after zoom-out according to the tenth embodiment of the present technology.

Note that FIG. 36 shows a captured image (image 1350) generated using a during-exposure zoom imaging operation that starts with the size of the specific subject in the image 1330 shown in FIG. 35 and ends with the size of the specific subject in the image 1340. In addition, in the image 1350, a face indicated by solid lines (face 1352) indicates a specific subject at the start of the during-exposure zoom imaging operation and a face indicated by dotted lines (face 1353) indicates a specific subject at the end of the during-exposure zoom imaging operation.

As shown in the image 1350, even when the size of the specific subject when the shutter button is pressed is a size at which the subject extends beyond the image due to zooming in the during-exposure zoom imaging operation, imaging can be performed so that the subject does not extend beyond the image by performing imaging after zoom-out.

[An Operation Example of the Imaging Device]

Next, an operation of the imaging device 100 according to the tenth embodiment will be described with reference to drawings.

Figure 37:
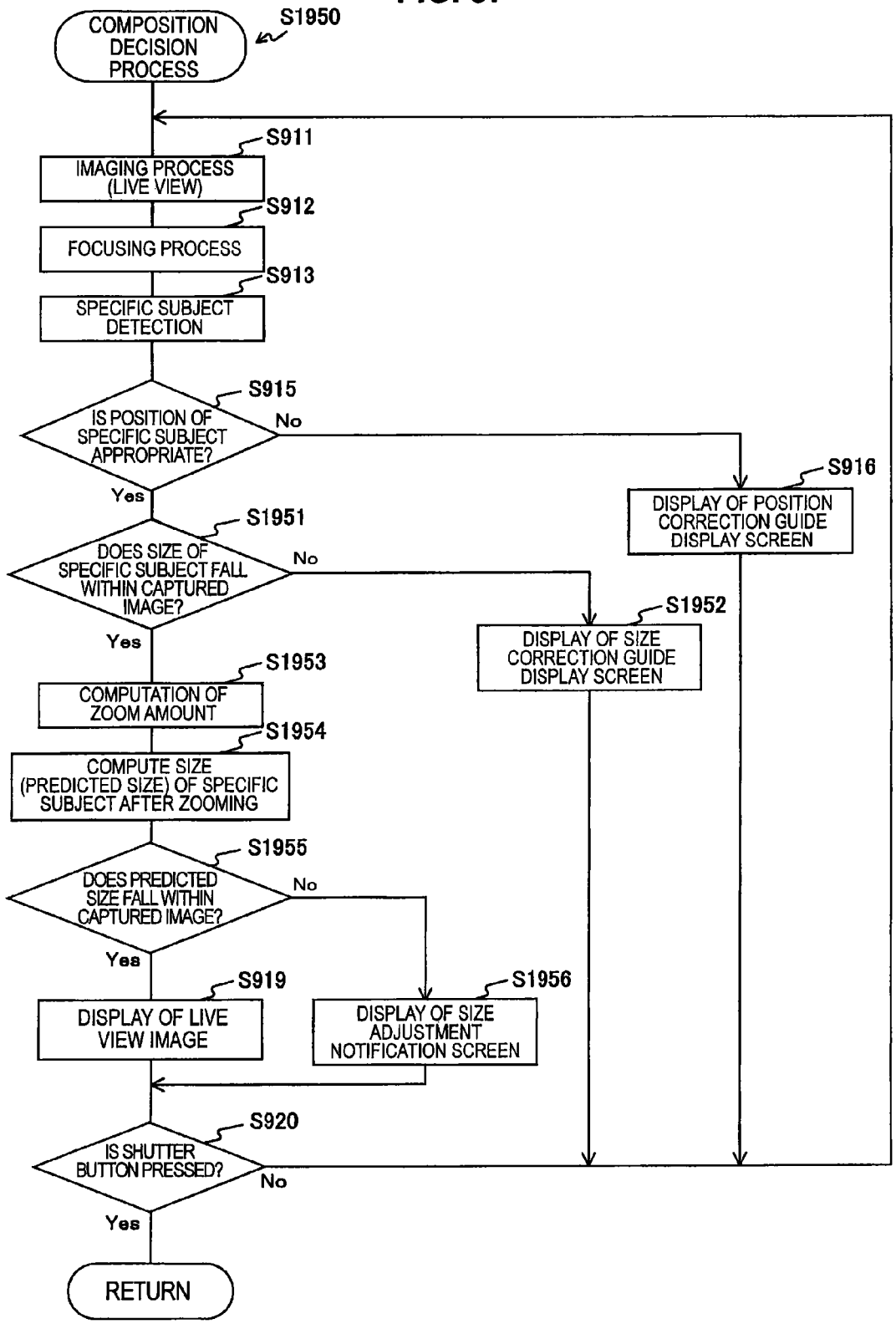
FIG. 37 is a flowchart showing an example of a procedure of a composition decision process (Step S1950) in an imaging procedure according to the tenth embodiment of the present technology.

FIG. 37 is a flowchart showing an example of a procedure of a composition decision process (Step S1950) in an imaging procedure according to the tenth embodiment of the present technology.

Note that the composition decision process (Step S1950) shown in FIG. 31 is a modification example of the composition decision process (Step S910) shown in FIG. 11, and is different in the method of determining a size of a specific subject. Thus, the same reference numerals are given to the procedures common in FIG. 11, and description thereof will be omitted.

In determining whether or not the position of the specific subject is appropriate (Step S915), when the position of the specific subject is determined to be appropriate, the during-exposure zoom setting unit 330 determines whether or not the size of the specific subject falls within the captured image (Step S1951). Then, when the size of the specific subject is determined not to fall within (determined to extend beyond) the captured image (Step S1951), the live view image with guide display as shown in FIG. 34(*a*) is displayed on the display unit 272 (Step S1952), and the process returns to Step S911.

On the other hand, when the size of the specific subject is determined to fall within the captured image (Step S1951), computation of a zoom amount is performed by the during-exposure zoom setting unit 330 (Step S1953). Then, based on the computed zoom amount and the size of the specific subject, the during-exposure zoom setting unit 330 computes the size of the specific subject (the size of the specific subject after zooming) at the end of the during-exposure zoom imaging operation (at the end of exposure) (Step S1954).

Then, the during-exposure zoom setting unit 330 determines whether or not the size (predicted size) of the specific subject after zooming falls within the captured image (Step S1955). Then, when the size thereof is determined to be fall therewithin (Step S1955), the process proceeds to Step S919, and a live view image (captured image without guide display) is displayed.

On the other hand, when the predicted size is determined not to fall within the captured image (Step S1955), the live view image with guide display as shown in FIG. 34(*b*) is displayed on the display unit 272 (Step S1956), and then the process proceeds to Step S920. In other words, if it is determined during a live view operation that the size of the specific subject after zooming does not fall within the captured image, a user is notified that imaging is performed by performing the during-exposure zoom imaging operation in the zoom-in direction after performing zoom-out.

Figure 38:
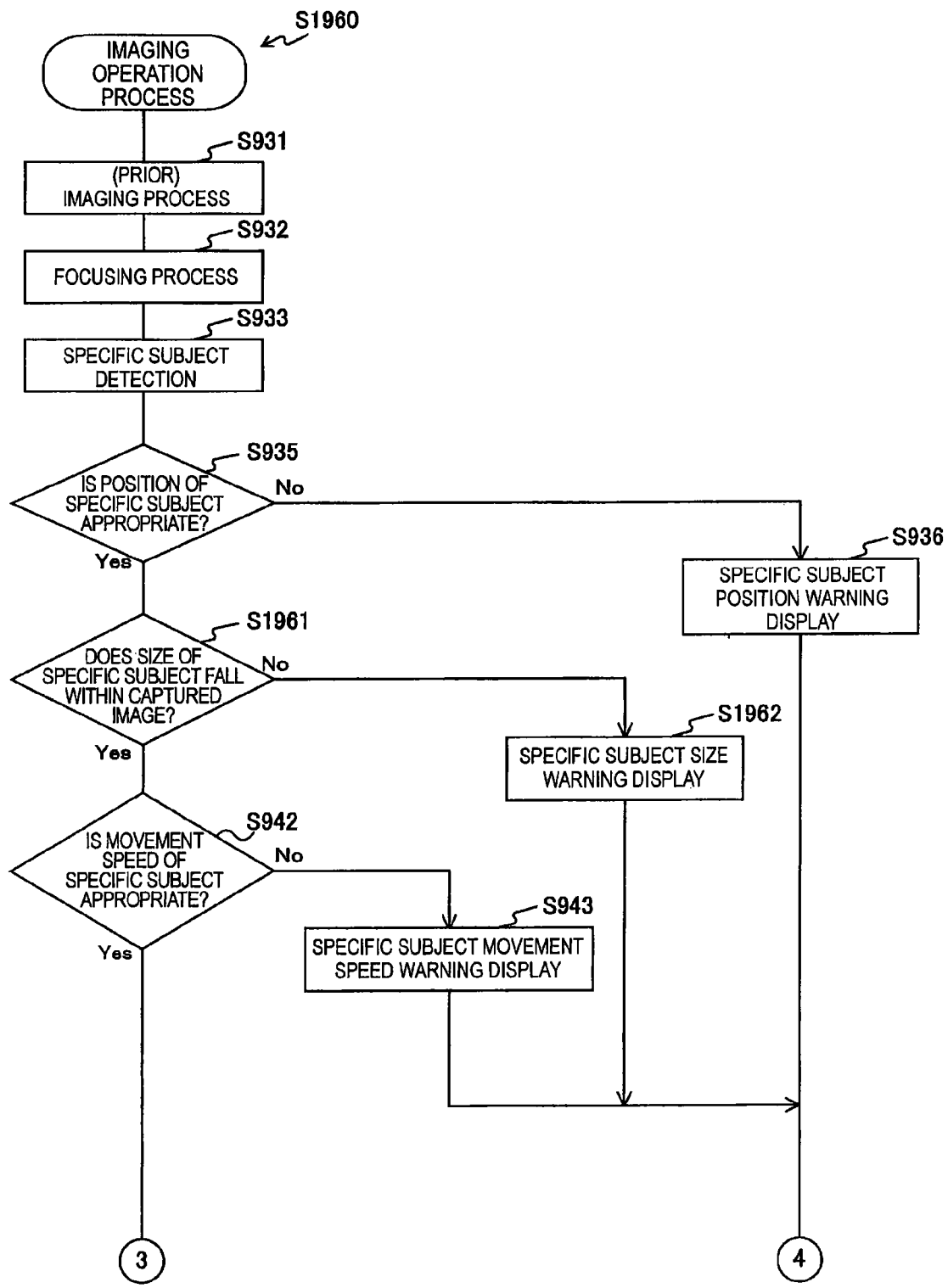
FIG. 38 is a flowchart showing an example of a procedure of an imaging operation process (Step S1960) in the imaging procedure according to the tenth embodiment of the present technology.
Figure 39:
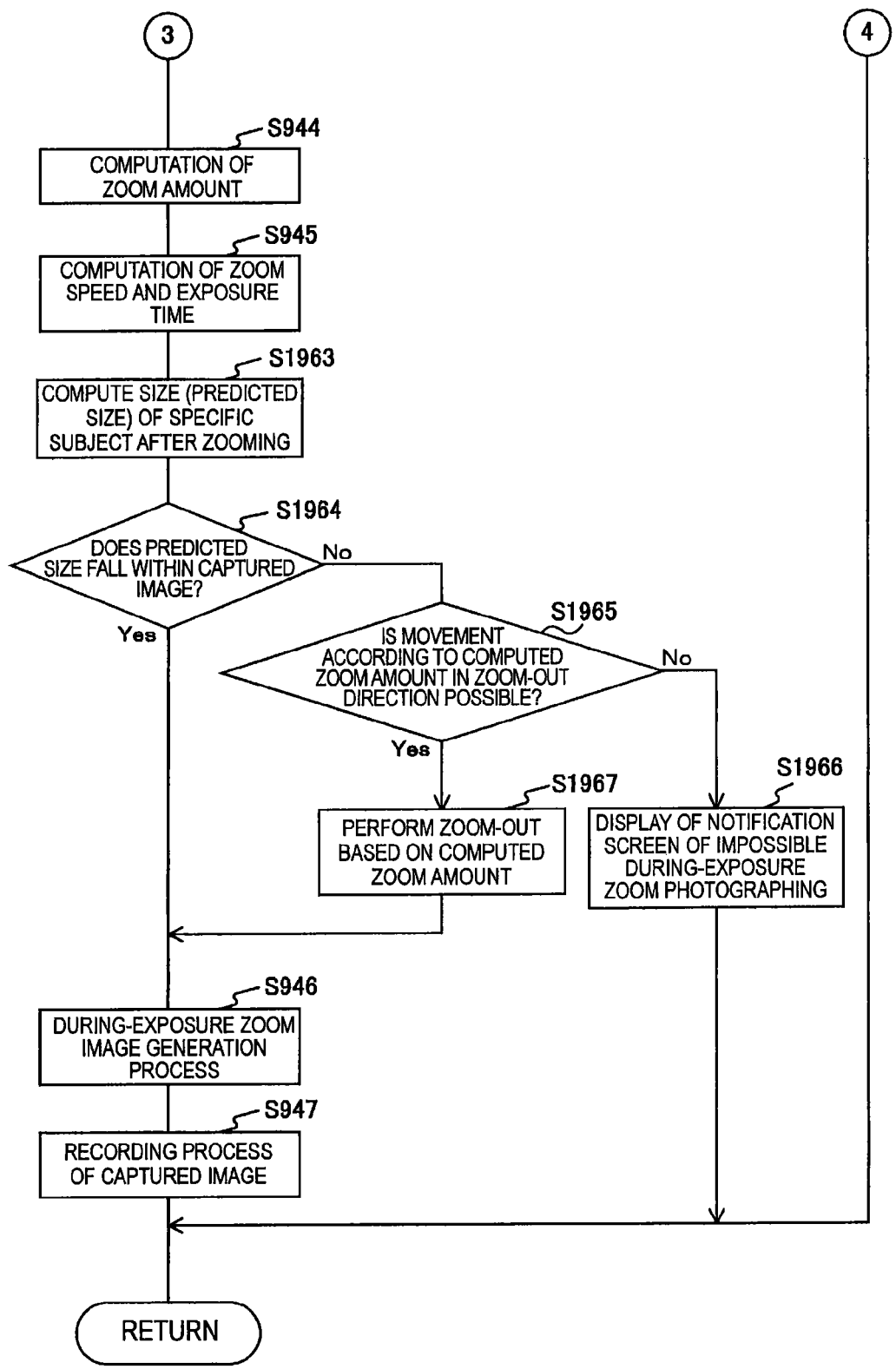
FIG. 39 is a flowchart showing an example of the procedure of the imaging operation process (Step S1960) in the imaging procedure according to the tenth embodiment of the present technology.

FIGS. 38 and 39 are flowcharts showing an example of a procedure of an imaging operation process (Step S1960) in the imaging procedure according to the tenth embodiment of the present technology.

Note that the imaging operation process (Step S1960) shown in FIGS. 38 and 39 is a modification example of the imaging operation process (Step S930) of FIG. 12, and is different in the method of determining a size of a specific subject. Thus, the same reference numerals are given to the procedures common in FIG. 12, and description thereof will be omitted herein.

In determining whether or not the position of the specific subject is appropriate in Step S935, when the position of the specific subject is determined to be appropriate, the during-exposure zoom setting unit 330 determines whether or not the size of the specific subject falls within the captured image (Step S1961). Then, when it is determined that the size of the specific subject does not fall within (extends beyond) the captured image (Step S1961), a display image notifying of the face that the size of the specific subject extends beyond the captured image is displayed (Step S1962), and the procedure of the imaging operation process ends. In this display (specific subject size warning display), for example, an image like the image 1330 as shown in FIG. 34(a) is displayed.

On the other hand, when it is determined that the size of the specific subject falls within the captured image (Step S1961), the process proceeds to Step S942, and it is determined whether or not the movement speed of the specific subject is appropriate. Note that the process to Step S945 is the same as that in FIG. 12, and thus description thereof will be omitted herein.

Then, after the exposure time and the zoom speed in the during-exposure zoom imaging operation are computed in Step S945, the size of the specific subject at the end of the during-exposure zoom imaging operation (the size of the specific subject after zooming) is computed (Step S1963). Then, the during-exposure zoom setting unit 330 determines whether or not the size (predicted size) of the specific subject after zooming falls within the captured image (Step S1964). Then, when it is determined that the predicted size falls within the captured image (Step S1964), the process proceeds to Step S946, and the during-exposure zoom image generation process is performed. In other words, when the size is determined to fall therewithin, the during-exposure zoom image generation process is performed using the current position of the zoom lens as a starting point.

On the other hand, when it is determined that the predicted size does not fall within the captured image (Step S1964), the during-exposure zoom setting unit 330 determines whether or not the zoom lens is to be driven by the computed zoom amount in the opposite direction (zoom-out direction) (Step S1965). Since this Step S1965 is the same as Step S1931 of FIG. 31, detailed description thereof will be omitted herein. Then, when it is determined that the zoom lens will not be driven (Step S1965), a notification screen notifying that the during-exposure zoom imaging operation is not possible is displayed on the display unit 272 (Step S1966), and the procedure of the imaging operation process ends.

On the other hand, when it is determined that the zoom lens will be driven by the computed zoom amount in the zoom-out direction (Step S1965), zoom-out is performed based on the computed zoom amount (Step S1967), and then, the process proceeds to Step S946. In other words, the during-exposure zoom imaging operation in the zoom-in direction is performed after performing zoom-out.

As above, according to the tenth embodiment of the present technology, when a size of a specific subject is excessively large, a during-exposure zoom imaging operation can be started after the size of the specific subject at the start of the during-exposure zoom imaging operation is adjusted so as not to extend beyond an image. In other words, according to the tenth embodiment of the present technology, by adjusting (correcting) a position of the zoom lens at the start of the during-exposure zoom imaging operation based on subject information, the during-exposure zoom imaging operation can be easily performed.

11. Eleventh Embodiment

In the first to tenth embodiments of the present technology, the example in which imaging is performed by driving the zoom lens by the computed zoom amount and then performing exposure as the during-exposure zoom imaging operation (during-exposure zoom photographing) has been described. In other words, in the first to tenth embodiments of the present technology, the example in which an exposure time coincides with a zooming time has been described. However, the during-exposure zoom imaging operation is performed using not only a method of imaging by making an exposure time coincide with a zooming time, but also a method of performing zooming by a part of the exposure time, or the like, in order to exhibit a special photographing effect. In other words, photographing effects change according to when the zoom lens is to be driven during the exposure time of the during-exposure zoom imaging operation. As above, since photographing effects differ according to the relationship between an exposure time and a zooming time, it is advantageous if an appropriate imaging method is decided based on information of a specific subject.

Thus, in an eleventh embodiment of the present technology, an example in which the relationship between an exposure time and a zooming time (operation mode) in a during-exposure zoom imaging operation is decided based on information of a specific subject will be described with reference to FIGS. 40 to 44.

First, four operation modes indicating examples of the relationship between an exposure time and a zooming time will be described in FIG. 40.

[Examples of Operation Modes in which the Relationship Between an Exposure Time and a Zooming Time is Different]

FIG. 40 is a diagram schematically showing examples of four operation modes of a during-exposure zoom imaging operation performed by the imaging device 100 according to the eleventh embodiment of the present technology.

FIG. 40(a) shows an example of an operation mode in which imaging is performed by making an exposure time coincide with a zooming time. Note that in the eleventh embodiment of the present technology, this operation mode is referred to as normal zoom photographing. FIG. 40(a) shows an exposure time (exposure time 1411) in the normal zoom photographing and a zooming time (zooming time 1412) in the normal zoom photographing together with a time axis on which a pressing timing of the shutter button is given.

As shown in FIG. 40(a), in normal zoom photographing, imaging is performed by making the exposure time coincide with the zooming time.

FIG. 40(b) shows an example of an operation mode in which imaging is performed by performing zooming for the length of the first half of an exposure time. Note that, in the eleventh embodiment of the present technology, this operation mode is referred to as first-half zoom photographing. FIG. 40(b) shows an exposure time (exposure time 1421) in the first-half zoom photographing and a zooming time (zooming time 1422) in the first-half zoom photographing together with a time axis on which a pressing timing of the shutter button is given.

As shown in the zooming time 1422 of FIG. 40(b), zooming is started at the start of the exposure time and completed in the middle of the exposure time in the first-half zoom photographing. In other words, in the period from the start to the middle of the exposure time (zooming time 1422), zooming to a zoom amount computed by the during-exposure zoom setting unit 330 is performed. Note that the during-exposure zoom setting unit 330 sets a zoom speed so that zooming to the computed zoom amount is completed in this zooming time 1422.

As shown in FIG. 40(b), by having the zoom lens stand still in the second half of the exposure time, an image can be emphasized in the second half of the exposure time. In the case of the during-exposure zoom imaging operation in the zoom-in direction, for example, a captured image obtained using the first-half zoom photographing becomes a captured image in which the specific subject having the size at the end of the operation (enlarged specific subject) is emphasized.

FIG. 40(c) shows an example of an operation mode in which imaging is performed by performing zooming for the length of the second half of an exposure time. Note that, in the eleventh embodiment of the present technology, this operation mode is referred to as second-half zoom photographing. FIG. 40(c) shows an exposure time (exposure time 1431) in the second-half zoom photographing and a zooming time (zooming time 1432) in the second-half zoom photographing together with a time axis on which a pressing timing of the shutter button is given.

As shown in the zooming time 1432 of FIG. 40(c), zooming is started in the middle of the exposure time and completed at the end of the exposure time in the second-half zoom photographing. In other words, in the period from the middle to the end of the exposure time (zooming time 1432), zooming to a zoom amount computed by the during-exposure zoom setting unit 330 is performed.

As shown in FIG. 40(c), by having the zoom lens stand still in the first half of the exposure time, an image can be emphasized in the first half of the exposure time. In the case of the during-exposure zoom imaging operation in the zoom-in direction, for example, a captured image obtained using the second-half zoom photographing becomes a captured image in which the specific subject having the size at the start of the operation (specific subject before being enlarged) is emphasized.

FIG. 40(d) shows an example of an operation mode in which imaging is performed by performing zooming in the middle of an exposure time. Note that, in the eleventh embodiment of the present technology, this operation mode is referred to as intermediate zoom photographing. FIG. 40(d) shows an exposure time (exposure time 1441) in the intermediate zoom photographing and a zooming time (zooming time 1442) in the intermediate zoom photographing together with a time axis on which a pressing timing of the shutter button is given.

As shown in the zooming time 1442 of FIG. 40(d), zooming is started in the middle of the exposure time and completed in the middle of the exposure time in the intermediate zoom photographing. In other words, in a period from the middle to the end of the exposure time (zooming time 1442), zooming to a zoom amount computed by the during-exposure zoom setting unit 330 is performed.

As shown in FIG. 40(d), by having the zoom lens stand still in at the start and the end of the exposure time, an image can be emphasized at the start and the end of the exposure time. In the case of the during-exposure zoom imaging operation in the zoom-in direction, for example, a captured image obtained using the intermediate zoom photographing becomes a captured image in which the specific subject having the size at the start and the end of the operation is emphasized.

As shown in FIGS. 40(a) to 40(d), a plurality of patterns are considered in the relationship between an exposure time and a zooming time (operation mode) in a during-exposure zoom imaging operation. The during-exposure zoom setting unit 330 can perform a during-exposure zoom imaging operation in an operation mode appropriate for a specific subject by deciding the operation mode based on information of the specific subject (subject information).

Various examples of the method for switching the operation modes appropriate for a specific subject based on subject information are considered, but as an example, an example in which the operation modes are switched according to the type of a specific subject will be described with reference to FIGS. 41 and 42. In addition, an example in which the operation modes are switched according to the size of a specific subject will be described with reference to FIGS. 43 and 44.

[An Operation Example of the Imaging Device]

Figure 41:
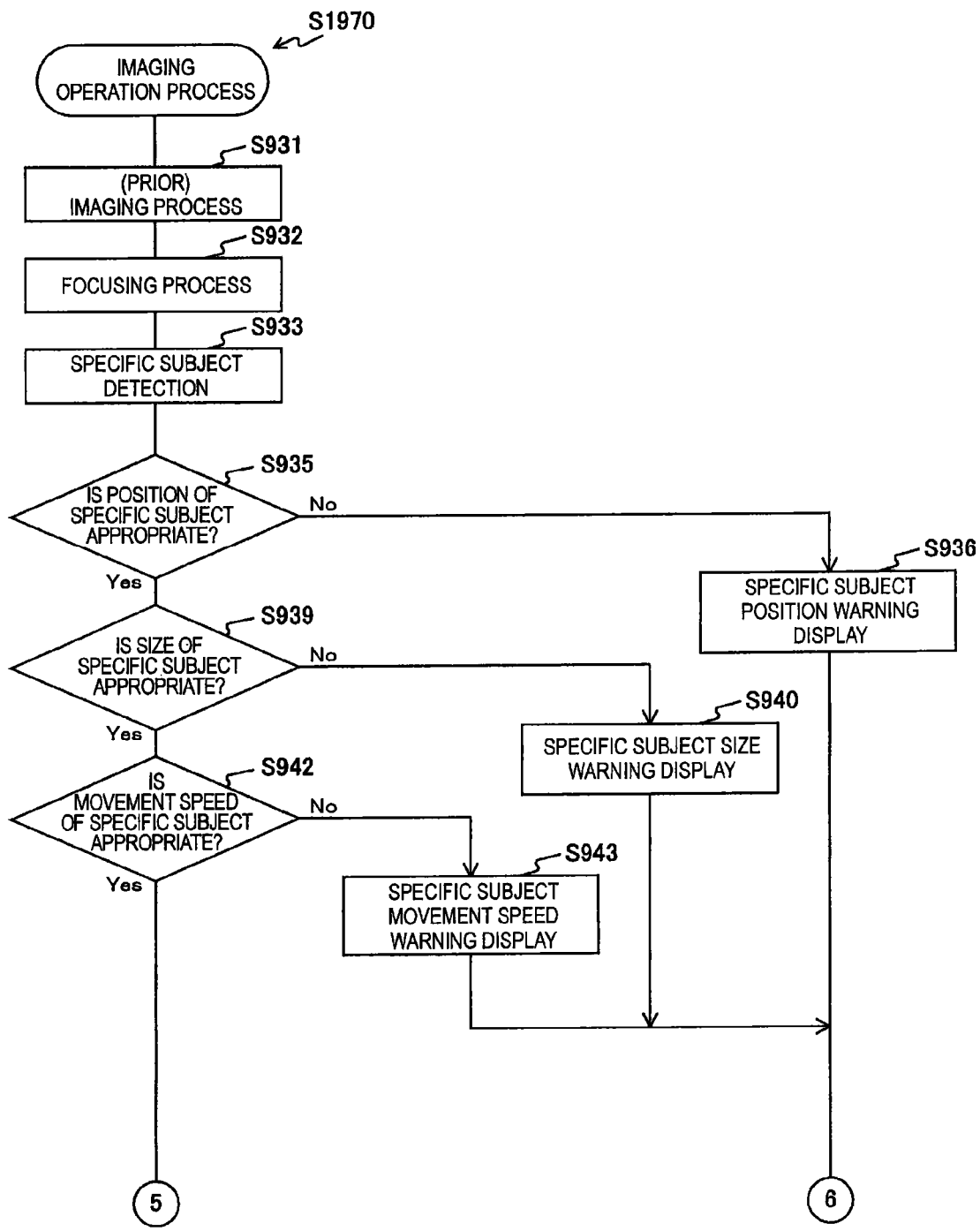
FIG. 41 is a flowchart showing an example of a procedure of a composition decision process (Step S1970) in an imaging procedure when the operation modes are switched in accordance with the type of a specific subject according to the eleventh embodiment of the present technology.
Figure 42:
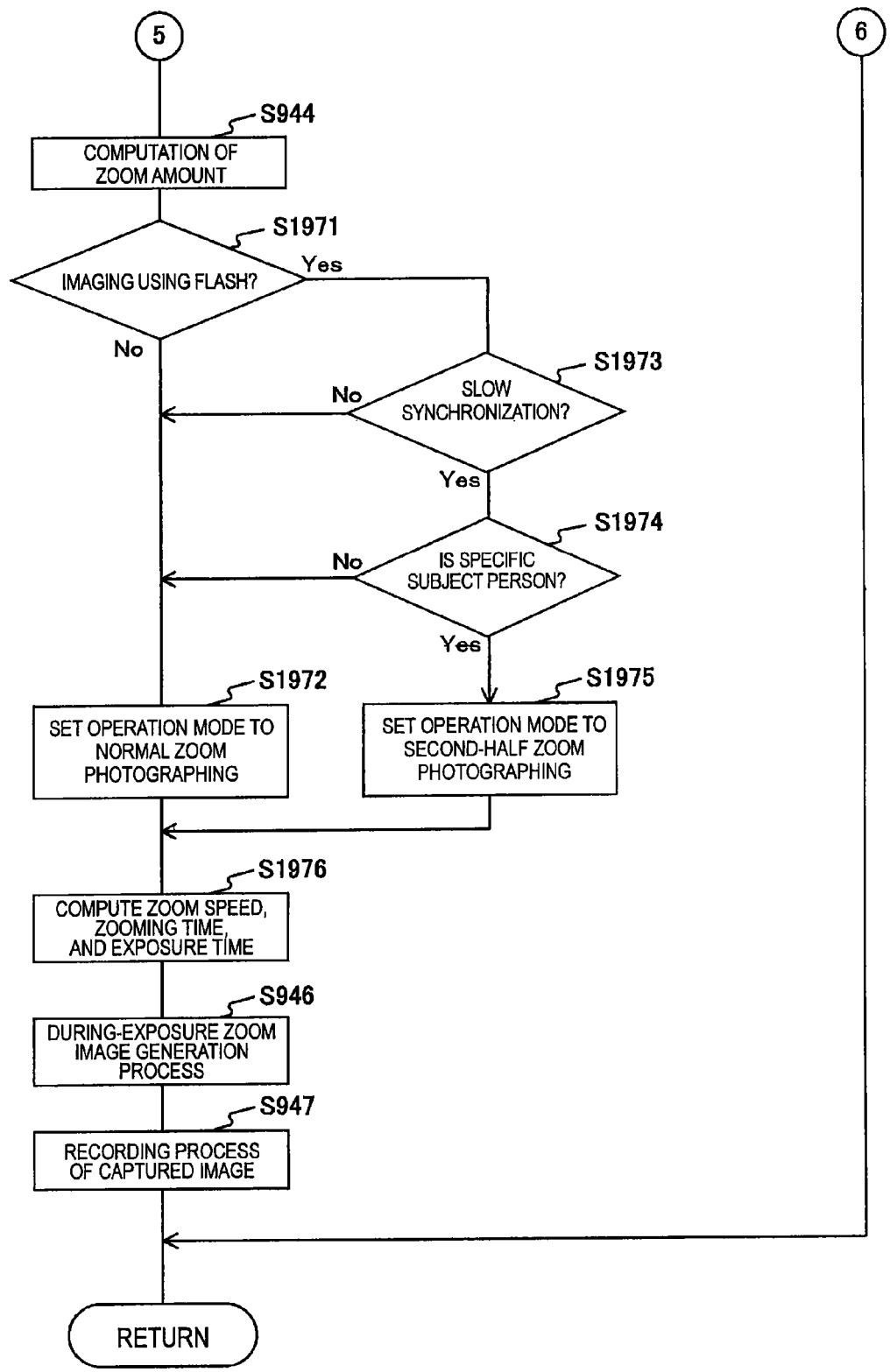
FIG. 42 is a flowchart showing an example of the procedure of the composition decision process (Step S1970) in the imaging procedure when the operation modes are switched in accordance with the type of the specific subject according to the eleventh embodiment of the present technology.

FIGS. 41 and 42 are flowcharts showing an example of a procedure of a composition decision process (Step S1970) in an imaging procedure when the operation modes are switched in accordance with the type of a specific subject according to the eleventh embodiment of the present technology.

FIGS. 41 and 42 show flowcharts of a case in which the operation modes are switched based on whether or not a specific subject is a person when a during-exposure zoom imaging operation is performed while a flash is used in slow synchronization. Herein, slow synchronization is a flash mode for imaging a background brightly by setting the shutter in an open state even after the flash is turned off.

In the imaging procedure of FIGS. 41 and 42, when a during-exposure zoom imaging operation is performed while a flash is used in low synchronization, if the specific subject is a person, the operation mode of the during-exposure zoom imaging operation is set to the second-half zoom photographing. Accordingly, the focus lens is not driven while the flash is applied to the specific subject. In addition, the focus lens is driven in the second half of the exposure period in which the effect of the flash on the specific subject becomes weak. Accordingly, the specific subject is clearly imaged, and it is possible to capture an image of which the background flows in a radial shape.

Note that the imaging operation process (Step S1970) shown in FIGS. 41 and 42 is a modification example of the imaging operation process (Step S930) of FIG. 12. Thus, the same reference numerals are given to the procedures common in FIG. 12, and description thereof will be omitted herein.

When a zoom amount in the during-exposure zoom imaging operation is computed in Step S944, the during-exposure zoom setting unit 330 determines whether or not the during-exposure zoom imaging operation is to be performed using a flash (Step S1971). Then, when it is determined that the flash is not used (for example, information for executing the flash is not supplied from the control unit 240) (Step S1971), the operation mode of the during-exposure zoom imaging operation is set to be the normal zoom photographing (Step S1972). Then, after Step S1972, the process proceeds to Step S1976.

On the other hand, when it is determined that the flash is used (for example when the information for executing the flash is supplied from the control unit 240) (Step S1971), the during-exposure zoom setting unit 330 determines whether or not imaging is performed in slow synchronization (Step S1973). Then, when it is determined that imaging is not performed in slow synchronization (Step S1973), the process proceeds to Step S1972.

Note that, when it is determined that imaging is performed in slow synchronization (Step S1973), the during-exposure zoom setting unit 330 determines whether or not the specific subject is a person (the face of a person) (Step S1974). Then, when it is determined that the specific subject is not a person (Step S1974), the process proceeds to Step S1972.

On the other hand, when it is determined that the specific subject is a person (Step S1974), the operation mode in the during-exposure zoom imaging operation is set to be the second-half zoom photographing (Step S1975). Then, the during-exposure zoom setting unit 330 computes a zoom amount, a zooming time, and an exposure time in the during-exposure zoom imaging operation (Step S1976). Then, after Step S1976, the process proceeds to Step S946 to perform the during-exposure zoom imaging operation.

As shown in FIGS. 41 and 42, an operation mode of a during-exposure zoom imaging operation is set according to the type of a specific subject and the during-exposure zoom imaging operation can be performed according to the setting.

Next, an example in which the operation modes are switched according to the size of a specific subject will be described with reference to FIGS. 43 and 44.

[An Example of Setting an Operation Mode According to a Size of a Specific Subject]

FIG. 43 is a diagram schematically illustrating two operation modes set in accordance with a size of specific subject according to the eleventh embodiment of the present technology.

FIG. 43(*a*) shows a table (table 1510) showing the relationship between the sizes of a specific subject and the operation modes of a during-exposure zoom imaging operation. This table 1510 shows the relationship between the sizes of a specific subject (column 1511) and the operation modes of a during-exposure zoom imaging operation (column 1512).

Herein, the operation modes in the during-exposure zoom imaging operation set according to the sizes of a specific subject will be described with reference to the table 1510. As shown in the table 1510, any of the first-half zoom photographing and the second-half zoom photographing is set according to a size of the specific subject. As described in FIG. 40, a specific subject having the size at the end of the during-exposure zoom imaging operation is emphasized in the first-half zoom photographing, and a specific subject having the size at the start of the operation is emphasized in the second-half zoom photographing. In other words, by deciding an operation mode so that a specific subject having an appropriate size out of the sizes at the start and the end of the operation is emphasized, an image in which the image of the specific subject having an easily seen a size at which it is easily seen is captured can be obtained.

Thus, the during-exposure zoom setting unit 330 retains information indicating an appropriate size (reference size) in advance, and analyzes which size out of the sizes at the start and the end of the operation (predicted sizes computed based on a zoom amount) is closer to the appropriate size. Then, when the size at the start of the operation is close to the appropriate size, the operation mode of the during-exposure zoom imaging operation is set to be the second-half zoom photographing. When the size at the end of the operation is close thereto, the operation mode of the during-exposure zoom imaging operation is set to be the first-half zoom photographing.

Note that, with regard to the reference size, there are various cases in which the size is retained by being set according to the type of a specific subject, retained by being set according to a captured scene, and retained by being set according to a focal length. In this manner, by retaining the reference size in the during-exposure zoom setting unit 330, an operation mode according to a size of a specific subject can be set.

FIG. 43(*b*) shows an example when imaging is performed after the first-half zoom photographing is decided, and FIG. 43(*c*) shows an example when imaging is performed after the second-half zoom photographing is decided. An image 1530 of FIG. 43(*b*) shows the size of a specific subject at the start of the first-half zoom photographing shown in FIG. 43(*b*). In addition, an image 1550 of FIG. 43(*c*) shows the size of a specific subject at the start of the second-half zoom photographing shown in FIG. 43(*c*).

Note that an image 1540 of FIG. 43(*b*) shows an image captured using the first-half zoom photographing, and an image 1560 of FIG. 43(*c*) shows an image captured using the second-half zoom photographing.

The face (face 1542) indicated by solid lines in the image 1540 indicates the specific subject at the start of the during-exposure zoom imaging operation. The face (face 1543) indicated by dotted lines in the image 1540 indicates the specific subject at the end of the during-exposure zoom imaging operation. In addition, in the same manner, in the image 1560, the face (face 1562) indicated by solid lines indicates the specific subject at the start of the during-exposure zoom imaging operation, and the face (face 1563) indicated by dotted lines indicates the specific subject at the end of the during-exposure zoom imaging operation. Note that, in the images 1540 and 1560, the specific subjects to be emphasized using the first-half zoom photographing and the second-half zoom photographing are indicated by thick lines.

Herein, a case determined to use the first-half zoom photographing will be described with reference to FIG. 43(*b*). Note that, for the sake of convenience of description, description will be provided on the assumption that the reference size is substantially the same as the size of the specific subject shown in the image 1550.

After computing a zoom amount when the shutter button is pressed, the during-exposure zoom setting unit 330 predicts the size (predicted size) of the specific subject at the end of the during-exposure zoom imaging operation using the computed zoom amount. Then, the during-exposure zoom setting unit 330 analyzes which of the predicted size (size at the end) and the current size (size at the start) is closer to the reference size. In the case of the image 1530 of FIG. 43(*b*), the size at the end is analyzed to be close to reference size, and thus the operation mode of the during-exposure zoom imaging operation is decided to be the first-half zoom photographing. Then, the during-exposure zoom imaging operation is performed using the first-half zoom photographing, and an image in which the size at the end is emphasized is generated, as shown in the image 1540.

Note that, in the analysis of which of the predicted size (size at the end) and the current size (size at the start) is closer to the reference size, if the size at the start is analyzed to be close to the reference size, the during-exposure zoom imaging operation is performed using the second-half zoom photographing shown in FIG. 43(*c*). Then, an image in which the size at the start is emphasized is generated, as shown in the image 1560.

Next, an example of a procedure of a composition decision process in an imaging procedure when the operation modes are switched according to a size of a specific subject will be described.

[An Operation Example of the Imaging Device]

Figure 44:
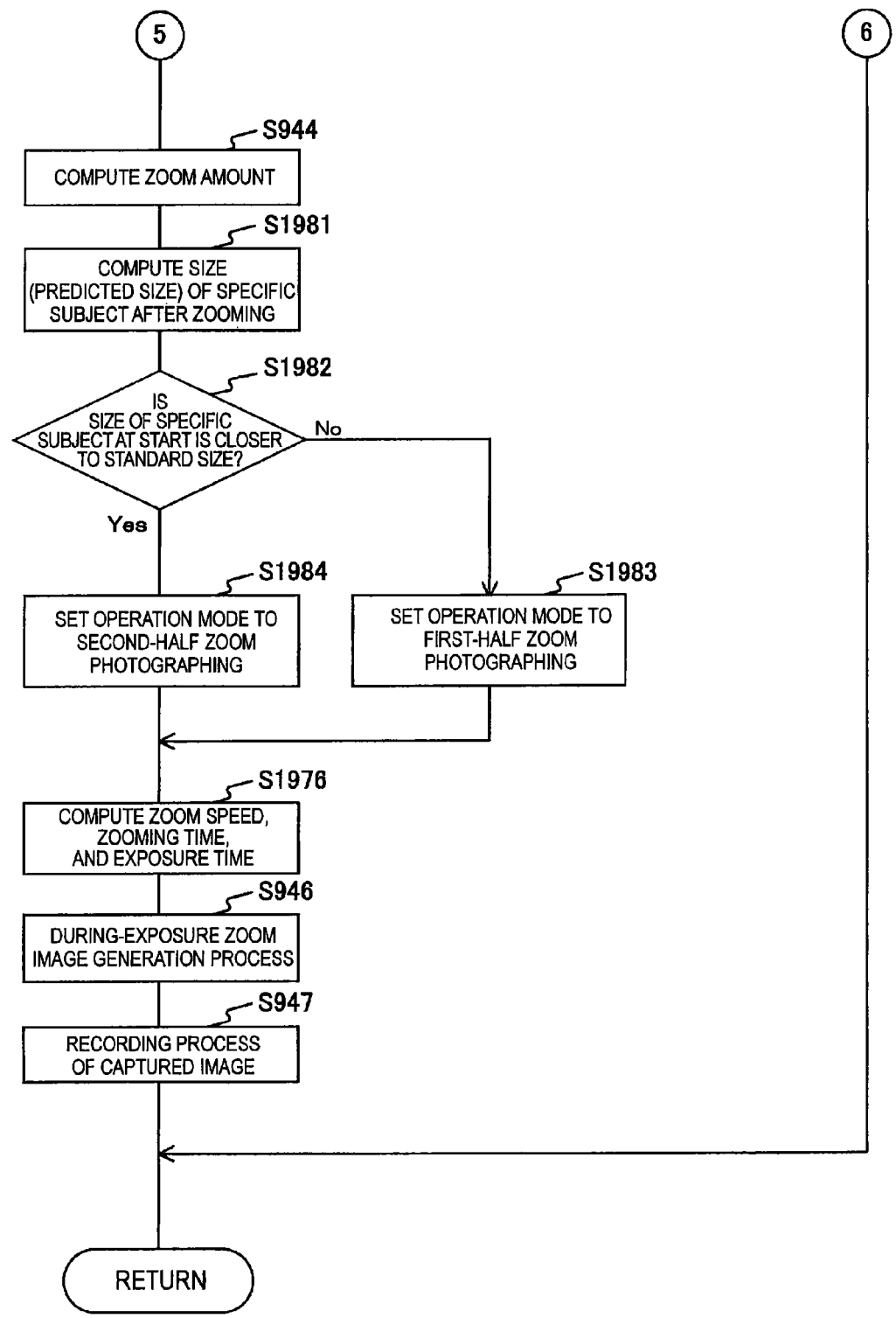
FIG. 44 is a flowchart showing an example of a procedure of a composition decision process in an imaging procedure when the operation modes are switched in accordance with a size of a specific subject according to the eleventh embodiment of the present technology.

FIG. 44 is a flowchart showing an example of a procedure of a composition decision process in an imaging procedure when the operation modes are switched in accordance with a size of a specific subject according to the eleventh embodiment of the present technology.

Herein, description will be provided on the assumption that a during-exposure zoom imaging operation is performed in any operation mode out of the first-half zoom photographing and the second-half zoom photographing. In this case, it is assumed that a user sets an imaging mode for performing a during-exposure zoom imaging operation by, for example, emphasizing the image of a specific subject.

Note that the composition decision process shown in FIG. 44 is a modification example of the composition decision process (Step 1970) shown in FIGS. 41 and 42, and is different from the flowchart shown in FIG. 42 in part. Thus, the same reference numerals are given to the procedures common in FIG. 42, and description thereof will be omitted herein.

When the zoom amount is computed in Step S944, the during-exposure zoom setting unit 330 computes the size of the specific subject at the end of the during-exposure zoom imaging operation (the size of the specific subject after zooming) (Step S1981). Then, the during-exposure zoom setting unit 330 determines whether or not the size of the specific subject at the start out of the sizes of the specific subject at the start and the size of the specific subject at the end is closer to the reference size (Step S1982). In other words, in Step S1982, it is determined which size out of the size of the specific subject at the start and the size of the specific subject at the end is closer to the reference size.

Then, when it is determined that a size close to the reference size is not the size of the specific subject at the start (is the size of the specific subject at the end) (Step S1982), the operation mode of the during-exposure zoom imaging operation is set to be the first-half zoom photographing (Step S1983). Then, after Step S1983, the process proceeds to Step S1976 so as to compute a zoom amount, a zooming time, and an exposure time in the during-exposure zoom imaging operation using the during-exposure zoom setting unit 330.

On the other hand, when it is determined that a size close to the reference size is the size of the specific subject at the start (Step S1982), the operation mode of the during-exposure zoom imaging operation is set to be the second-half zoom photographing (Step S1984). Then, after Step S1984, the process proceeds to Step S1976.

As shown in FIGS. 43 and 44, an operation mode of the during-exposure zoom imaging operation is set in accordance with a size of a specific subject, and the during-exposure zoom imaging operation can be performed according to the setting.

In this manner, according to the eleventh embodiment of the present technology, an operation mode of a during-exposure zoom imaging operation can be decided according to subject information. In other words, according to the eleventh embodiment of the present technology, the relationship between an exposure time and a zooming time in a during-exposure zoom imaging operation can be decided according to subject information. In this manner, the during-exposure zoom imaging operation can be easily performed by deciding a photographing effect according to the subject information.

12. Twelfth Embodiment

In the first to eleventh embodiments of the present technology, the example in which, while a movement of a specific subject in an optical axis direction is considered, a movement thereof in the direction orthogonal to the optical axis direction (orthogonal direction) is not particularly considered has been described. Since performing a during-exposure zoom imaging operation for a specific subject making a movement in the orthogonal direction of the optical axis requires a particularly high level of technique, it is advantageous to control the during-exposure zoom imaging operation based on information of a specific subject.

Thus, in a twelfth embodiment of the present technology, an example in which a movement of a specific subject, which moves in a direction orthogonal to the optical axis, in the orthogonal direction is analyzed, and a during-exposure zoom imaging operation according to the movement of the specific subject in the orthogonal direction is performed will be described with reference to FIGS. 45 to 52.

[An Analysis Example of a Specific Subject Moving in a Direction Orthogonal to the Optical Axis]

FIG. 45 is a schematic diagram illustrating a movement of a specific subject in a direction orthogonal to the optical axis which is analyzed by the during-exposure zoom setting unit 330 according to the twelfth embodiment of the present technology.

FIG. 45(a) shows a specific subject moving in a direction orthogonal to the optical axis which is assumed in the twelfth embodiment of the present technology. FIG. 45(a) shows a person (person 1611) running from the left side to the right side of the drawing (toward the tip of the arrow 1612). In the twelfth embodiment of the present technology, description will be provided on the assumption that one running person (person 1611) is imaged using a during-exposure zoom imaging operation as shown in FIG. 45(a).

FIG. 45(b) shows a image (image 1620) illustrating a movement of a specific subject in the direction orthogonal to the optical axis which is analyzed by the during-exposure zoom setting unit 330. This image 1620 shows, as a specific subject, a person (person 1622) running from the left side to the right side of the drawing. In addition, this image 1620 shows a frame (1621) that defines a center region (center range) in the captured image and a person (person 1623) indicating a predicted position of the person 1622 at the end of the during-exposure zoom imaging operation. Note that the person 1623 indicating the predicted position computed by the during-exposure zoom setting unit 330 is indicated using dotted lines, and the person 1622 indicating the current position is indicated using solid lines.

The range (center range) surrounded by the frame 1621 is a range (region) defined to be the center area (central periphery) with regard to the specific subject making a movement to the direction orthogonal to the optical axis. Note that the range defined by the frame 1621 can also be assumed to be the same range as defined by the frame 411 shown in FIG. 3(a), but for the sake of convenience in description, description will be provided on the assumption that the range is narrower than that of the frame 411 of FIG. 3(a).

Herein, analysis of the specific subject making a movement in the direction orthogonal to the optical axis by the during-exposure zoom setting unit 330 will be described. When the specific subject moves in the direction orthogonal to the optical axis, the subject detection unit 310 analyzes the movement speed and the movement direction of the specific subject moving in the direction orthogonal to the optical axis. The analysis of the movement speed and the movement direction of the specific subject is performed by detecting transition (deviation) of positions of the specific subject in two images captured at different times, and for example, the subject detection unit 310 is detected from the transition of position information (refer to FIG. 6) of the specific subject. Note that this analysis can also be performed using movement vectors detected using a block matching method, or the like. In addition, subject information of the twelfth embodiment of the present technology is information obtained by adding information of the movement speed and the movement direction (for example, movement vectors that set a time between frames to a unit time) of the specific subject to the subject information shown in FIG. 6.

Then, based on the exposure time, the movement speed of the specific subject, and the movement direction of the specific subject, the position of the specific subject at the end of exposure when the exposure of a during-exposure zoom imaging operation is immediately started is predicted by the during-exposure zoom setting unit 330. The person (person 1623) indicated using dotted lines in the image 1620 corresponds to this predicted position (predicted position) of the specific subject. Note that, when imaging is actually performed using the during-exposure zoom imaging operation, the start time and the end time of the exposure time are computed by the during-exposure zoom setting unit 330. In other words, this predicted position is a predicted position for analyzing a movement of the specific subject in the direction orthogonal to the optical axis. Note that the computation of the start time and the end time of the exposure time will be described using FIG. 47.

Next, the during-exposure zoom setting unit 330 analyzes whether or not the specific subject is appropriate for the during-exposure zoom imaging operation based on the predicted position (predicted position) and the current position of the specific subject. In this analysis, it is analyzed whether or not the movement speed of the specific subject in the direction orthogonal to the optical axis is excessively high, or whether or not the movement direction of the specific subject in the orthogonal direction is appropriate. In this analysis, when the central periphery of the image is not in the movement direction of the specific subject, the movement direction is determined not to be appropriate. In addition, even if the movement direction is appropriate, when the movement speed is excessively high (when the predicted position is located at a position farther than the central periphery), the movement speed is determined not to be appropriate.

In other words, when the advancing direction of the specific subject is toward the central periphery of the image, and the predicted position is located between the current position and the central periphery of the image, it is determined that the specific subject moving in the direction orthogonal to the optical axis is appropriate for the during-exposure zoom imaging operation.

In the image 1620 of FIG. 45(*b*), the position of the person 1623 passes over the frame 1621 as viewed from the position of the person 1622. For this reason, in the case shown in this image 1620, the during-exposure zoom setting unit 330 determines that the specific subject is not appropriate for the during-exposure zoom imaging operation.

Note that a case in which the specific subject is determined to be appropriate for the during-exposure zoom imaging operation will be described using the image 1620 of FIG. 45(*b*). The during-exposure zoom setting unit 330 determines that the specific subject is appropriate for the during-exposure zoom imaging operation when the position of the person 1623 does not pass over the frame 1621 as viewed from the position of the person 1622. Note that various methods are considered for determining whether or not a position passes over the frame 1621, but in the twelfth embodiment of the present invention, it is assumed that a position (point 1624) that is recognized as the center of the predicted position (person 1623) passes over the frame 1621.

In other words, when the point 1624 is in the frame 1621, the during-exposure zoom setting unit 330 determines that the specific subject is appropriate since the predicted position is in the central periphery. In addition, even when the point is not in the frame 1621, and when the point 1624 is at a position predicted to be in the frame 1621 if a time longer than the exposure time elapses, the during-exposure zoom setting unit 330 determines that the specific subject is appropriate.

Next, an image displayed on the display unit 272 when a specific subject moving in the direction orthogonal to the optical axis is determined not to be appropriate for a during-exposure zoom imaging operation will be described with reference to FIG. 46.

[An Example of Guide Display]

Figure 46:
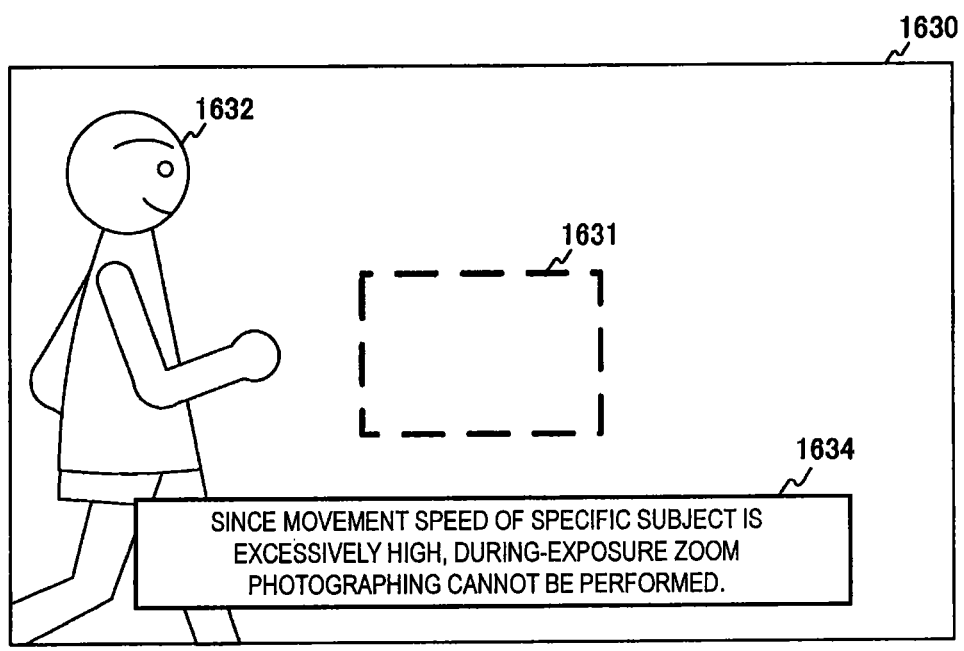
FIG. 46 is a schematic diagram showing an example of an image displayed on the display unit 272 when a specific subject that moves in the direction orthogonal to the optical axis is not appropriate for a during-exposure zoom imaging operation according to the twelfth embodiment of the present technology.

FIG. 46 is a schematic diagram showing an example of an image displayed on the display unit 272 when a specific subject that moves in the direction orthogonal to the optical axis is not appropriate for a during-exposure zoom imaging operation according to the twelfth embodiment of the present technology.

FIG. 46 shows a live view image (image 1630) with guide display displayed when the during-exposure zoom setting unit 330 analyzes that a movement of a specific subject in the direction orthogonal to the optical axis is not appropriate during a live view operation in the during-exposure zoom mode. This image 1630 shows a specific subject (person 1632), a text display region (text display region 1634), and a frame (frame 1631) indicating the range defined as a center area. Note that this text display region 1634 shows text for notifying that a during-exposure zoom imaging operation cannot be executed since the movement speed of the specific subject is excessively high.

As shown in the image 1630, when the during-exposure zoom setting unit 330 analyzes that the movement of the specific subject in the direction orthogonal to the optical axis is not appropriate, the live view image with guide display notifying that the during-exposure zoom imaging operation is not executable is displayed on the display unit 272.

Next, the start time and the end time of an exposure time computed by the during-exposure zoom setting unit 330 when a movement of a specific subject in the direction orthogonal to the optical axis is determined to be appropriate after the shutter button is pressed will be described with reference to FIG. 47.

[An Example of Computation of the Start Time and the End Time of an Exposure Time]

FIG. 47 is a schematic diagram showing an example of computation of the start time and the end time of an exposure time of a during-exposure zoom imaging operation by the during-exposure zoom setting unit 330 according to the twelfth embodiment of the present technology.

FIG. 47(*a*) shows an image (image 1640) schematically illustrating the time axis and computation of the end time of an exposure time (exposure end time) of a during-exposure zoom imaging operation. The image 1640 shows a frame (frame 1641) indicating the range defined as a center area, and a person (person 1642) indicating a position (current position) of a specific subject when the shutter button is pressed. In addition, in the image 1640, a person indicating the position predicted when the movement speed and the movement direction of the specific subject are analyzed is shown using a person (person 1643) indicated using dotted lines. In addition, in the image 1640, a person indicating the position of the specific subject at the exposure end time is shown using a person (person 1644) surrounded by dotted lines and filled with small dots.

Herein, the computation of the exposure end time by the during-exposure zoom setting unit 330 will be described. The during-exposure zoom setting unit 330 computes the exposure end time when the shutter button is pressed, and a movement of the specific subject in the direction orthogonal to the optical axis is analyzed to be appropriate. In this computation of the exposure end time. The during-exposure zoom setting unit 330 sets the time at which the specific subject moves to the center of the image to be the exposure end time. In other words, the during-exposure zoom setting unit 330 predicts the time at which the specific subject moves to the central periphery of the image as shown by the person 1644 and sets this predicted time to be the exposure end time, based on the current position of the specific subject (person 1642) and the movement speed and the movement direction of the specific subject.

FIG. 47(*b*) shows an image (image 1650) schematically illustrating a time axis and the computation of the start time of an exposure time of a during-exposure zoom imaging operation. The image 1650 shows a frame (frame 1651) indicating the range defined as a center area, and a person (person 1652) indicating a current position of a specific subject. In addition, in the image 1650, a person indicating the position of the specific subject at the computed exposure end time is shown using a person (person 1654) surrounded by dotted lines and filled with small dots. Further, in the image 1650, a person indicating the position of the specific subject at the computed exposure start time is shown using a person (person 1655) surrounded by dotted lines and filled with diagonal lines.

Herein, the computation of the exposure start time by the during-exposure zoom setting unit 330 will be described. The during-exposure zoom setting unit 330 computes the exposure start time after computing the exposure end time. In the computation of the exposure start time, the during-exposure zoom setting unit 330 computes a time as early as the exposure time from the exposure end time, and sets the computed time as the exposure start time. In other words, the during-exposure zoom setting unit 330 starts exposure at the time at which the specific subject moves to the position indicated by the person 1655 and finishes exposure at the time at which the specific subject moves to the position indicated by the person 1654.

[An Example of Transition of a Specific Subject]

Figure 48:
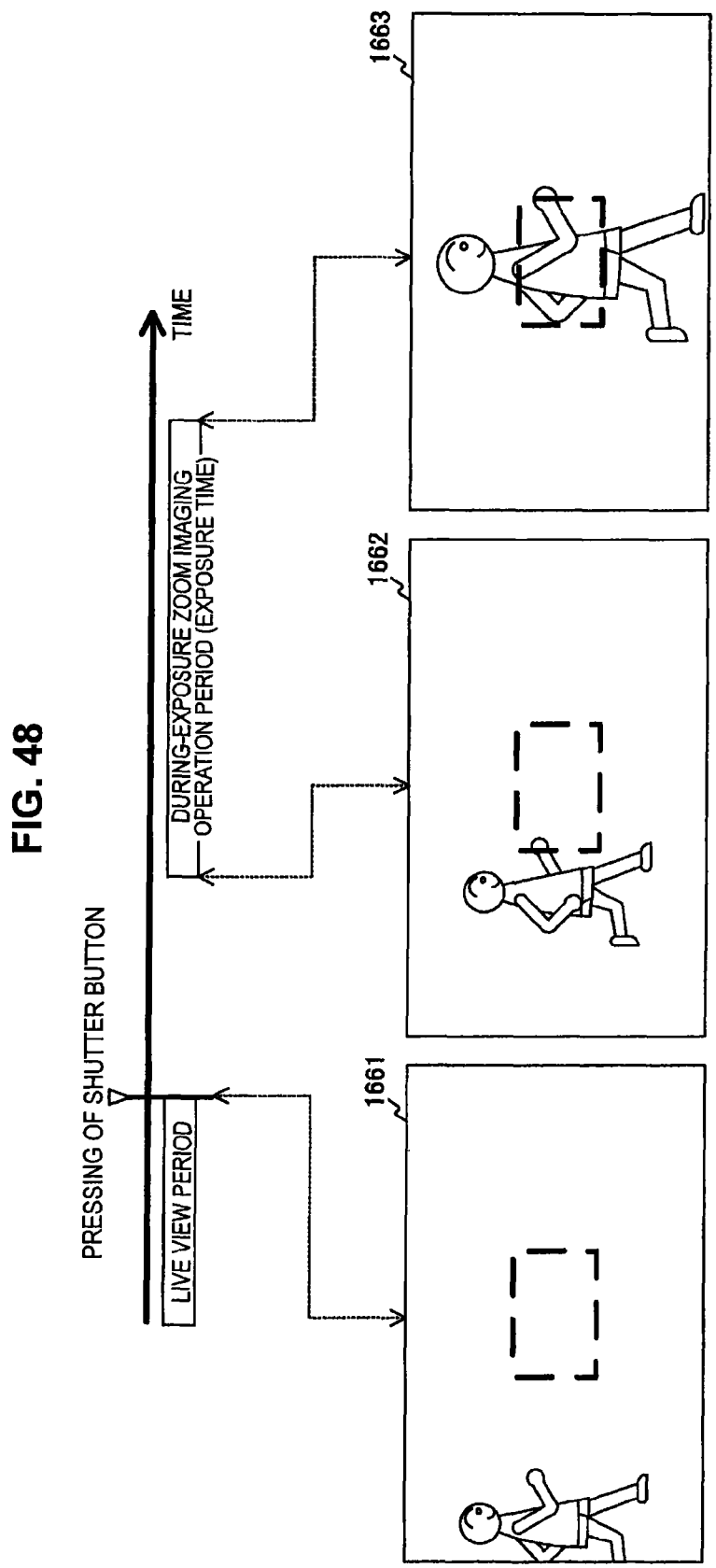
FIG. 48 is a diagram schematically showing the relationship between the transition of the operations of the imaging device and the transition of the sizes of a specific subject when a during-exposure zoom imaging operation is performed for the specific subject moving in the direction orthogonal to the optical axis according to the twelfth embodiment of the present technology.

FIG. 48 is a diagram schematically showing the relationship between the transition of the operations of the imaging device and the transition of the sizes of a specific subject when a during-exposure zoom imaging operation is performed for the specific subject moving in the direction orthogonal to the optical axis according to the twelfth embodiment of the present technology.

In FIG. 48, a period of a live view operation (live view period) and an exposure time of a during-exposure zoom imaging operation (during-exposure zoom imaging operation period (exposure time)) are shown on the time axis.

In addition, in FIG. 48, an image (image 1661) for sowing the size of the specific subject when the live view period ends after the shutter button is pressed is shown. In addition, in FIG. 48, an image (image 1662) for showing the size of the specific subject at the start of the during-exposure zoom imaging operation (exposure start time) and an image (image 1663) for showing the size of the specific subject at the end of the during-exposure zoom imaging operation (exposure end time) are shown.

As shown in FIG. 48, when a movement of the specific subject in the direction orthogonal to the optical axis after the shutter button is pressed passes through the central periphery (within the frame) of the image and does not pass over the central periphery yet in the during-exposure zoom imaging operation, imaging is started. First, before exposure is started, an exposure end time is set so that exposure ends at the timing (time) at which the specific subject moves to the central periphery of the image. Then, an exposure start time is set in accordance with a zooming time computed by the during-exposure zoom setting unit 330, and when this exposure start time comes, the during-exposure zoom imaging operation is started. In other words, the during-exposure zoom imaging operation is performed in which exposure is started with an image of the specific subject as shown in the image 1662, and exposure ends with an image of the specific subject as shown in the image 1663.

[An Example of Imaging a Specific Subject Moving in the Direction Orthogonal to the Optical Axis Using a During-Exposure Zoom Imaging Operation]

Figure 49:
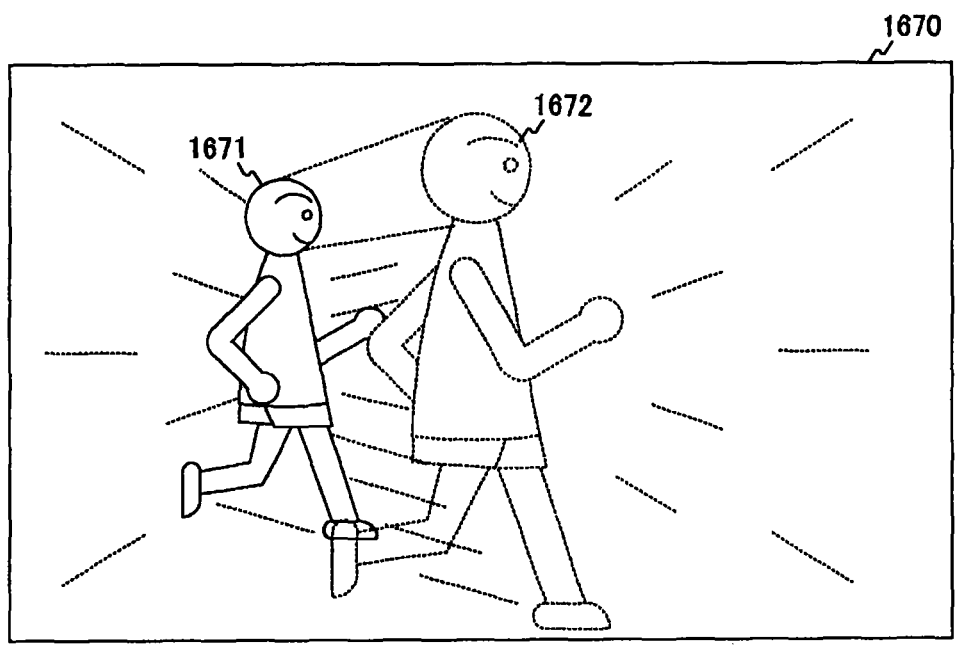
FIG. 49 is a diagram schematically showing a captured image of a specific subject moving in the direction orthogonal to the optical axis according to the twelfth embodiment of the present technology.

FIG. 49 is a diagram schematically showing a captured image of a specific subject moving in the direction orthogonal to the optical axis according to the twelfth embodiment of the present technology.

Note that FIG. 49 shows a captured image (image 1670) generated in a during-exposure zoom imaging operation that starts with the image 1662 and ends with the image 1663 shown in FIG. 48. In addition, in the image 1670, the person indicated using solid lines (person 1671) indicates a specific subject at the start of the during-exposure zoom imaging operation, and the person indicated using dotted lines (person 1672) indicates the specific subject at the end of the during-exposure zoom imaging operation.

As shown in the image 1670, using the during-exposure zoom imaging operation according to the twelfth embodiment of the present technology, a clear image in which a specific subject is imaged in the central periphery of the image can be imaged even when the specific subject moves in the direction orthogonal to the optical axis.

[An Operation Example of the Imaging Device]

Next, an operation of the imaging device 100 according to the twelfth embodiment of the present technology will be described with reference to drawings.

Figure 50:
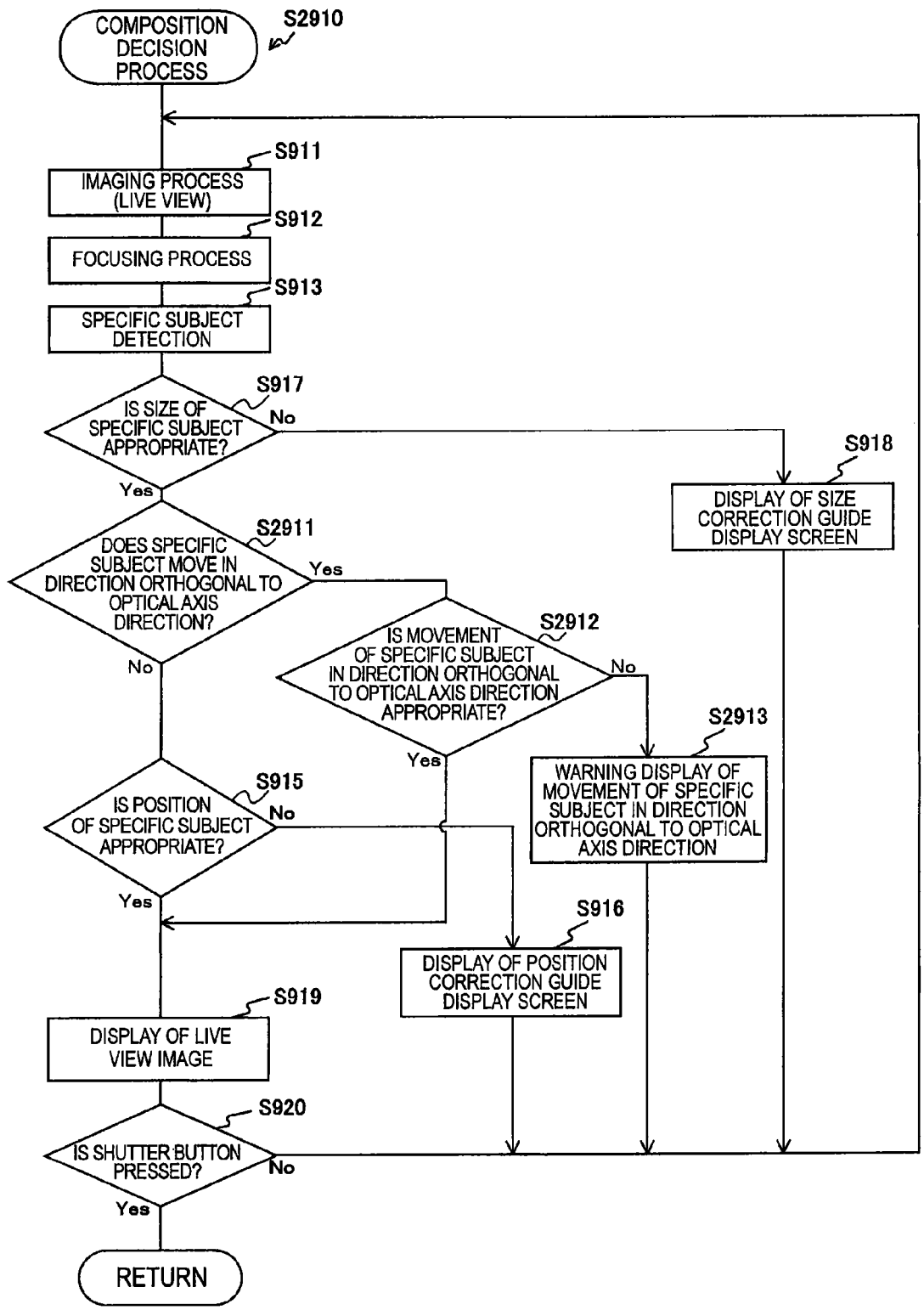
FIG. 50 is a flowchart showing an example of a procedure of a composition decision process (Step S2910) in an imaging procedure according to the twelfth embodiment of the present technology.

FIG. 50 is a flowchart showing an example of a procedure of a composition decision process (Step S2910) in an imaging procedure according to the twelfth embodiment of the present technology.

Note that FIG. 50 is a modification example of the imaging operation process (Step S910) shown in FIG. 11, and is different in that a process of analyzing a movement of a specific subject in the direction orthogonal to the optical axis is added. Thus, the same reference numerals are given to the procedures common in FIG. 11, and description thereof will be omitted herein.

Note that, since the process of analyzing a movement of the specific subject in the direction orthogonal to the optical axis is added in FIG. 50, description will be provided on the condition that the procedure of analyzing a position of the specific subject (Step S915 of FIG. 11) is performed after a process of analyzing the presence or absence of a movement of the specific subject in the direction orthogonal to the optical axis.

After the detection of the specific subject is performed in Step S913, it is analyzed whether or not the size of the specific subject is appropriate (Step S917). Then, when it is determined that the size of the specific subject is appropriate (Step S917), the presence or absence of a movement of the specific subject in the direction orthogonal to the optical axis is determined by the during-exposure zoom setting unit 330 (Step S2911). Note that, in Step S2911, the specific subject having a movement so small that it is not likely to change the determination of Step S915 within a predetermined time is determined as a specific subject without a movement. Note that, the predetermined time is set to be, for example, an exposure time, or a time considered as the upper limit of a time in which a user awaits the start of imaging.

Then, when it is determined that there is no movement of the specific subject in the direction orthogonal to the optical axis (Step S2911), the process proceeds to Step S915 to determine the position of the specific subject. Then, when the position is determined to be appropriate (Step S915), the process proceeds to Step S919 to display a live view image.

On the other hand, when it is determined that there is a movement of the specific subject in the direction orthogonal to the optical axis (Step S2911), the during-exposure zoom setting unit 330 determines whether or not the movement of the specific subject in the direction orthogonal to the optical axis (movement speed and movement direction) is appropriate for the during-exposure zoom imaging operation (Step S2912). In other words, in Step S2912, it is analyzed whether the direction is a movement direction in which the specific subject passes through the central periphery of the image during the during-exposure zoom imaging operation or whether the speed is a movement speed at which the specific subject does not pass over the central periphery of the image.

Then, when it is determined that the movement of the specific subject in the direction orthogonal to the optical axis is not appropriate (Step S2912), display of notifying that the movement of the specific subject in the direction orthogonal to the optical axis is not appropriate is displayed (Step S2913), and then the process returns to Step S911. Note that for the display in Step S2913 (warning display of the movement of the specific subject in the direction orthogonal to the optical axis), for example, an image as shown in the image 1630 of FIG. 46 is displayed.

On the other hand, when it is determined that the movement of the specific subject in the direction orthogonal to the optical axis is appropriate (Step S2912), the process proceeds to Step S919 to display a live view image.

Figure 51:
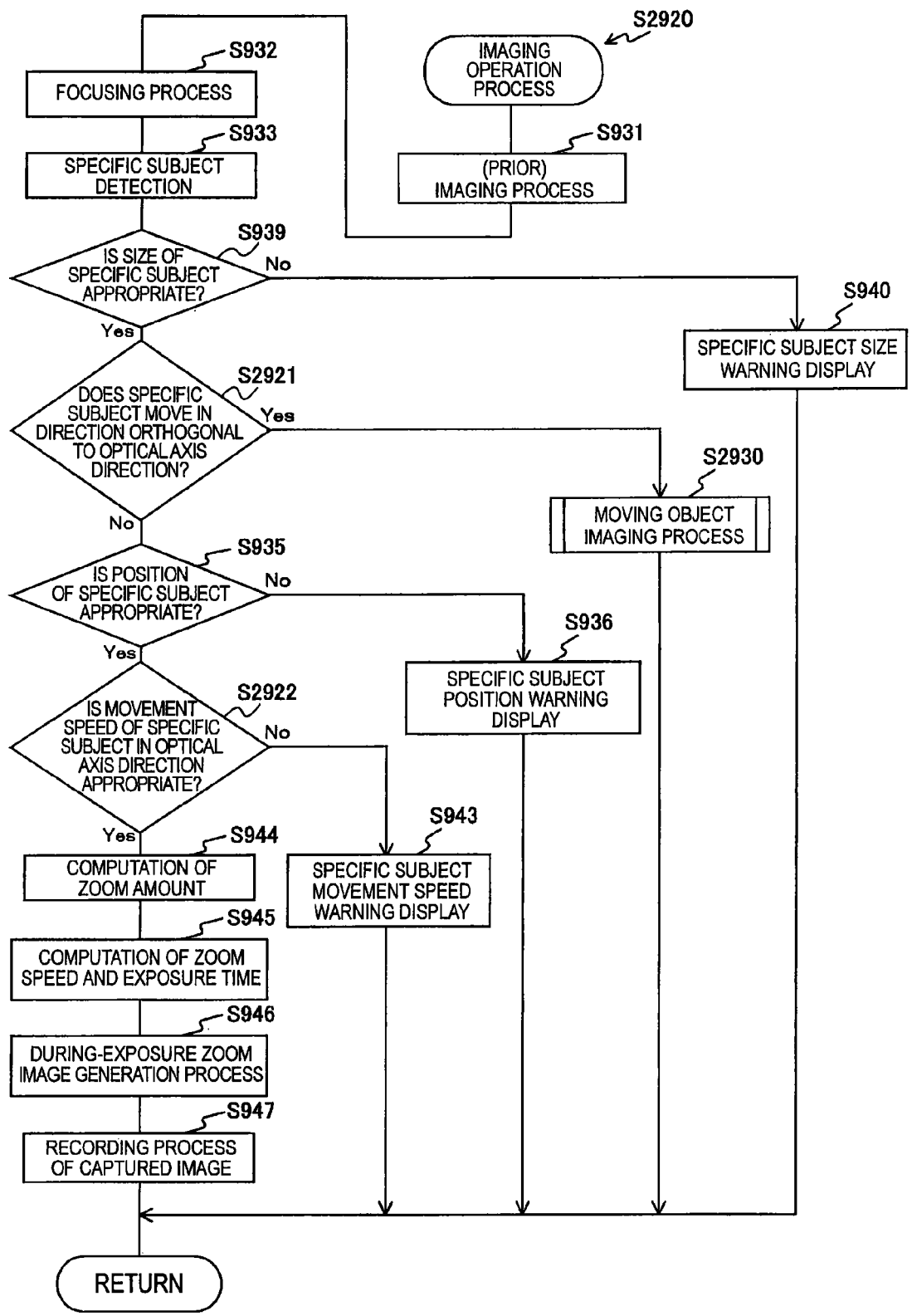
FIG. 51 is a flowchart showing an example of a procedure of an imaging operation process (Step S2920) in the imaging procedure according to the twelfth embodiment of the present technology.

FIG. 51 is a flowchart showing an example of a procedure of an imaging operation process (Step S2920) in the imaging procedure according to the twelfth embodiment of the present technology.

Note that FIG. 51 is a modification example of the imaging operation process (Step S930) shown in FIG. 12, and is different in that a process of analyzing a movement of a specific subject in the direction orthogonal to the optical axis is added. Thus, the same reference numerals are given to the procedures common in FIG. 12, and description thereof will be omitted herein.

Note that, in FIG. 51, since the process of analyzing a movement of a specific subject in the direction orthogonal to the optical axis is added, description will be provided on the condition that the procedure of analyzing a position of the specific subject (Step S935 of FIG. 11) is performed after a process of analyzing the presence or absence of a movement of the specific subject in the direction orthogonal to the optical axis. In addition, in FIG. 51, the procedure corresponding to Step S942 of FIG. 11 is shown as the procedure for determining whether or not the movement speed of the specific subject in the optical axis direction is appropriate (Step S2922).

After the detection of the specific subject is performed in Step S933, analysis whether or not the size of the specific subject is appropriate is performed (Step S939). Then, when the size of the specific subject is determined to be appropriate (Step S939), the presence or absence of a movement of the specific subject in the direction orthogonal to the optical axis is determined by the during-exposure zoom setting unit 330 (Step S2921). Note that, since Step S2921 is the same as Step S2911 of FIG. 50, description thereof will be omitted herein.

Then, when it is determined that there is no movement of the specific subject in the direction orthogonal to the optical axis (Step S2921), the process proceeds to Step S935 to determine the position of the specific subject. Then, when the position is determined to be appropriate (Step S935), the process proceeds to Step S2922 to determine whether or not the movement speed of the specific subject in the optical axis direction is appropriate. Then, when the movement speed of the specific subject in the optical axis direction is determined to be appropriate (Step S2922), the process proceeds to Step S944. In addition, when the movement speed of the specific subject in the optical axis direction is determined not to be appropriate (Step S2922), the process proceeds to Step S943.

On the other hand, when it is determined that there is a movement of the specific subject in the direction orthogonal to the optical axis (Step S2921), a moving object imaging process for imaging the specific subject moving in the direction orthogonal to the optical axis (Step S2930) is performed, and then, the procedure of the imaging operation process ends. Note that this moving object imaging process (Step S2930) will be described with reference to FIG. 52.

Figure 52:
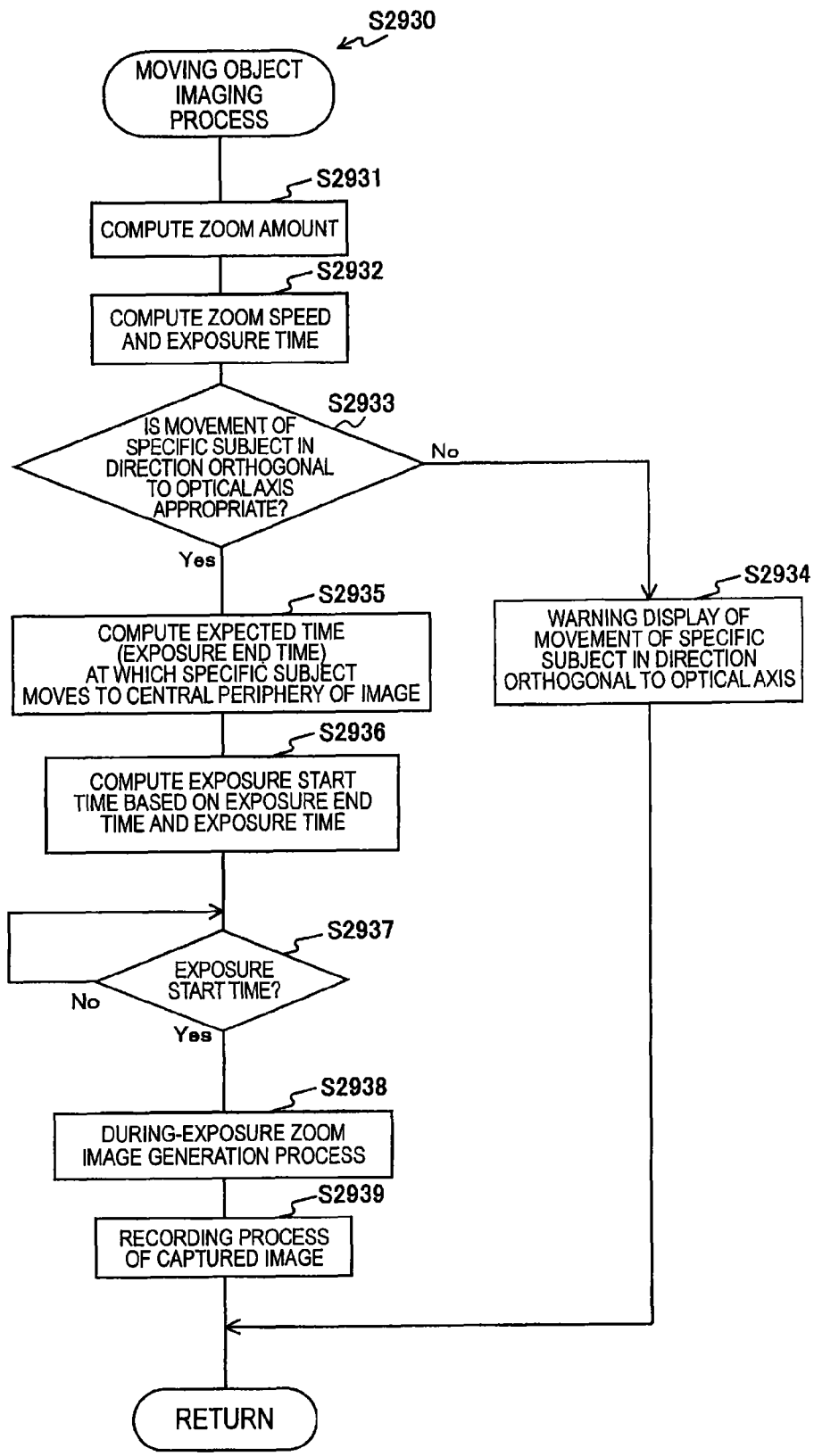
FIG. 52 is a flowchart showing an example of a procedure of a moving object imaging process (Step S2930) in the imaging procedure according to the twelfth embodiment of the present technology.

FIG. 52 is a flowchart showing an example of a procedure of a moving object imaging process (Step S2930) in the imaging procedure according to the twelfth embodiment of the present technology.

First, based on information of the specific subject (subject information), a zoom amount is computed by the during-exposure zoom setting unit 330 (Step S2931). Then, an exposure time and a zoom speed in a during-exposure zoom imaging operation are computed by the during-exposure zoom setting unit 330 (Step S2932). Then, the during-exposure zoom setting unit 330 determines whether or not a movement of the specific subject in the direction orthogonal to the optical axis (movement speed and movement direction) is appropriate for the during-exposure zoom imaging operation (Step S2933). In Step S2933, it is analyzed whether the direction is a movement direction in which the specific subject passes through the central periphery of the image during the during-exposure zoom imaging operation or whether the speed is a movement speed at which the specific subject does not pass over the central periphery of the image.

Then, when it is determined that the movement of the specific subject in the direction orthogonal to the optical axis is not appropriate (Step S2933), display for notifying that the movement of the specific subject in the direction orthogonal to the optical axis is not appropriate is displayed (Step S2934), and then the procedure of the moving object imaging operation ends.

On the other hand, when it is determined that the movement of the specific subject in the direction orthogonal to the optical axis is appropriate (Step S2933), an expected time at which the specific subject moves to the central periphery of the image (exposure end time) is computed by the during-exposure zoom setting unit 330 (Step S2935). Successively, based on the computed exposure end time and exposure time, the during-exposure zoom setting unit 330 computes an exposure start time (Step S2936). Then, it is determined whether or not the exposure start time has arrived (Step S2937), and when it is determined that the exposure start time has not arrived, the process stands by until the exposure start time arrives.

Note that, when it is determined that the exposure start time has arrived (Step S2937), a during-exposure zoom image generation process for generating a captured image during the during-exposure zoom imaging operation is performed (Step S2938). Then, the generated captured image is recorded on the recording unit 262 (Step S2939), and the procedure of the moving object imaging operation ends.

In this manner, according to the twelfth embodiment of the present technology, a during-exposure zoom imaging operation can be easily performed for a specific subject moving in the direction orthogonal to the optical axis.

In this manner, according to the embodiments of the present technology, by setting detailed control for the during-exposure zoom imaging operation based on a specific subject included in a captured image, the during-exposure zoom imaging operation can be easily performed. In other words, since detailed control for the during-exposure zoom imaging operation is set based on the specific subject, failure of the during-exposure zoom imaging operation can be reduced. In addition, because a zoom amount and a zoom speed are decided according to a specific subject, an effect (flowing of a background image) of the during-exposure zoom imaging operation can be enhanced.

Note that, in the first embodiment of the present technology, the example in which analysis of a movement speed of a specific subject is performed in prior checking of a during-exposure zoom imaging operation has been described, but the technology is not limited thereto. For example, it can also be configured such that a movement speed of a specific subject is analyzed in the stage of a live view operation, and whether or not the movement speed is appropriate for a during-exposure zoom imaging operation is displayed to a user with a live view image.

In addition, in the embodiments of the present technology, the example in which a position, a size, and a movement speed of a specific subject detected by the subject detection unit 310 are analyzed has been described, but the technology is not limited thereto. For example, it can also be configured such that a subject designated as a focusing target by a user is set as a specific subject and a position, a size, and a movement speed of this specific subject are analyzed.

In addition, in the embodiments of the present technology, the example in which a specific subject is recognized as a rectangular shape, and then a size and a position thereof are detected has been described, but the technology is not limited thereto, and it can also be configured such that the contour thereof is used when the elements are computed using the contour.

In addition, in the embodiments of the present technology, display in the middle of performing a during-exposure zoom imaging operation based on computed setting has not particularly been described. However, since a zoom operation and an exposure time are automatically set according to the embodiments of the present technology, it may be better to display, for example, the remaining time to the end of imaging (time for which the occurrence of shaking is desired to be suppressed), or the like.

Note that the embodiments described above show examples for realizing the present technology, and matters in the embodiments have a corresponding relationship with specific matters of the invention in the claims. In the same manner, the specific matters of the invention in the claims have a corresponding relationship with matters in the embodiments of the present technology to which the same names as those of the specific matters of the invention are given. However, the present technology is not limited to the embodiments, and can be realized by implementing various modifications to the embodiments within a scope not departing from the gist thereof.

In addition, the procedures described in the embodiments described above can be understood as a method including a series of procedures, and may be understood as a program for causing a computer to execute the series of the procedures and a recording medium storing the program. As this recording medium, for example, a hard disk, a CD (Compact Disc), an MD (MiniDisc), a DVD (Digital Versatile Disc), a memory card, a Blu-ray Disc (registered trademark), or the like can be used.

Additionally, the present technology may also be configured as below.

(1) An information processing device including:
a control unit that, based on a specific subject that is an imaging target of a during-exposure zoom imaging operation, performs control decide control details for a zoom lens in the during-exposure zoom imaging operation.

(2) The information processing device according to (1), wherein the control unit decides the control details based on a position of the specific subject in an image captured by an imaging unit and a size of the specific subject in the image.

(3) The information processing device according to (1), wherein the control unit decides the control details based on a relationship between a specific position in an image captured by an imaging unit and a position of the specific subject in the image.

(4) The information processing device according to (3), wherein the specific position is a center position of the image.

(5) The information processing device according to any one of (1) to (4), wherein the control unit determines whether or not the during-exposure zoom imaging operation is to be executed based on at least one of a position of the specific subject in an image captured by an imaging unit or a size of the specific subject in the image.

(6) The information processing device according to (5), wherein, when it is determined that the during-exposure zoom imaging operation is not to be executed, the control unit causes a guide image for correcting at least one of the position of the specific image in the image or the size of the specific subject in the image to be displayed on a display unit.

(7) The information processing device according to (1), wherein the control unit decides the control details based on a movement speed of the specific subject in an optical axis direction.

(8) The information processing device according to (1), further including:
an acquisition unit that acquires information of the type of the specific subject,
wherein the control unit decides the control details based on the acquired type of the specific subject.

(9) The information processing device according to any one of (1) to (8), wherein the control unit determines whether or not the zoom lens reaches an end portion of an operable range of the zoom lens during the during-exposure zoom imaging operation based on the decided control details, and when it is determined that the zoom lens reaches the end portion of the operable range of the zoom lens, causes a guide screen for correcting a position of the zoom lens to be displayed on a display unit.

(10) The information processing device according to any one of (1) to (9), wherein the control unit determines whether or not the zoom lens reaches an end portion of an operable range of the zoom lens during the during-exposure zoom imaging operation based on the decided control details, and when it is determined that the zoom lens reaches the end portion of the operable range of the zoom lens, corrects a position of the zoom lens and then causes the during-exposure zoom imaging operation to start after the correction.

(11) The information processing device according to any one of (1) to (10), wherein the control unit decides the control details based on the focal length when the control details are decided and the specific subject.

(12) The information processing device according to any one of (1) to (9), wherein the control unit decides the control details based on information of the distance between the specific subject when the control details are decided and the information processing device.

(13) The information processing device according to any one of (1) to (12), wherein the control unit decides, as the control details, one operation mode among a plurality of operation modes respectively having different relationships between an exposure time and a zooming time in the during-exposure zoom imaging operation.

(14) The information processing device according to any one of (1) to (13), wherein the control unit decides the control details based on a movement of the specific subject in a direction orthogonal to the optical axis.

(15) The information processing device according to (14), wherein the control unit performs movement prediction for the specific subject, and when the result of the movement prediction passes through the center position of the image or a position located within a predetermined distance from the center position and does not pass over the center position of the image or a position located within a predetermined distance from the center position until an exposure time of the during-exposure zoom imaging operation ends, determines that the during-exposure zoom imaging operation is to be executed.

(16) The information processing device according to (14) or (15), wherein the control unit decides the control details in which a time at which the specific subject moves to the center position or a position located within a predetermined distance from the center position is set to be an end time of an exposure time of the during-exposure zoom imaging operation and a time as early as the exposure time of the during-exposure zoom imaging operation from the end time is set to be a start time of the exposure time.

(17) The information processing device according to any one of (1) to (16), wherein the control unit decides a driving direction of the zoom lens in the during-exposure zoom imaging operation to be one of a zoom-in direction or a zoom-out direction based on a size of the specific subject.

(18) The information processing device according to any one of (1) to (16), wherein the control unit determines whether or not a size of the specific subject in the during-exposure zoom imaging operation reaches a predetermined size based on the decided control details, and when it is determined that the size of the specific subject reaches the predetermined size, corrects a position of the zoom lens, and causes the during-exposure zoom imaging operation to start after the correction.

(19) An information processing method, including:
performing control to decide control details of a zoom lens in a during-exposure zoom imaging operation based on a specific subject that is an imaging target of the during-exposure zoom imaging operation.

(20) A program that causes a computer to execute performing control to decide control details of a zoom lens in a during-exposure zoom imaging operation based on a specific subject that is an imaging target of the during-exposure zoom imaging operation.

Further, the present technology may also be configured as below.

(21) The information processing device according to (5), wherein the control unit, when a predetermined proportion or more of the specific subject falls within a predetermined range, the predetermined range having as a center the center position of the image or a position located within a predetermined distance from the center position, determines that the during-exposure zoom imaging operation is to be executed.

(22) The information processing device according to (5), wherein the control unit, when a distance from the center position of the image or a position located within a predetermined distance from the center position to the position of the specific subject is less than a threshold as a reference, determines that the during-exposure zoom imaging operation is to be executed.

(23) The information processing device according to (5), wherein the control unit, when it is determined that the during-exposure zoom imaging operation is not to be executed, even if an instruction operation indicating a start of the during-exposure zoom imaging operation is received, stops the during-exposure zoom imaging operation indicated by the instruction operation.

(24) The image processing device according to (1), wherein the control unit decides a zoom amount and a zoom speed as the control details.

REFERENCE SIGNS LIST

100 Imaging device
111 Zoom lens
112 Focus lens
113 Diaphragm
114 Shutter
120 Image sensor
130 Image processing unit
142 Memory card
143 Image display unit
144 Image memory
151 Shutter control unit
152 Diaphragm control unit
153 Focus control unit
154 Zoom control unit
160 Subject information extraction unit
165 During-exposure zoom setting unit
170 Main control unit
172 Setting holding unit
173 Light emitting unit
175 Battery
176 Power source control unit
177 Camera shake control unit
178 Operation unit
210 Lens unit
211 Zoom lens
213 Focus lens
220 Image sensor
225 Shutter
230 Operation reception unit
240 Control unit
250 Signal processing unit
261 Recording control unit
262 Recording unit
271 Display control unit
272 Display unit
280 Driving unit
285 Lens position detection unit
290 Exposure control unit
310 Subject detection unit
330 During-exposure zoom setting unit

The invention claimed is:
1. An information processing device comprising:
one or more processors configured to:
perform control to decide control details for a zoom lens in a during-exposure zoom imaging operation based on a specific subject that is an imaging target of the during-exposure zoom imaging operation; and
acquire information of a type of the specific subject,
wherein the control details are decided based on the acquired information of the type of the specific subject,
and wherein the one or more processors are further configured to determine whether or not the zoom lens reaches an end portion of an operable range of the zoom lens during the during-exposure zoom imaging operation based on the decided control details, and in an event it is determined that the zoom lens reaches the end portion of the operable range of the zoom lens, the one or more processors are configured to cause a guide screen for correcting a position of the zoom lens to be displayed on a display unit.

2. The information processing device according to claim 1, wherein the one or more processors are further configured to decide the control details based on a position of the specific subject in an image captured by an imaging unit and a size of the specific subject in the image.

3. The information processing device according to claim 1, wherein the one or more processors are further configured to decide the control details based on a relationship between a specific position in an image captured by an imaging unit and a position of the specific subject in the image.

4. The information processing device according to claim 3, wherein the specific position is a center position of the image.

5. The information processing device according to claim 1, wherein the one or more processors are further configured to determine whether or not the during-exposure zoom imaging operation is to be executed based on at least one of a position of the specific subject in an image captured by an imaging unit or a size of the specific subject in the image.

6. The information processing device according to claim 5, wherein, in an event it is determined that the during-exposure zoom imaging operation is not to be executed, the one or more processors are further configured to cause a guide image for correcting at least one of the position of a specific subject in the image or the size of the specific subject in the image to be displayed on the display unit.

7. The information processing device according to claim 1, wherein the one or more processors are further configured to determine whether or not the zoom lens reaches the end portion of the operable range of the zoom lens during the during-exposure zoom imaging operation based on the decided control details, and in an event it is determined that the zoom lens reaches the end portion of the operable range of the zoom lens, the one or more processors are configured to correct a position of the zoom lens and then cause the during-exposure zoom imaging operation to start after the correction.

8. The information processing device according to claim 1, wherein the one or more processors are further configured to decide the control details based on a focal length in an event the control details are decided and the specific subject.

9. The information processing device according to claim 1, wherein the one or more processors are further configured to decide the control details based on information of a distance between the specific subject in an event the control details are decided and the information processing device.

10. The information processing device according to claim 1, wherein the one or more processors are further configured to decide, as the control details, one operation mode among a plurality of operation modes respectively having different relationships between an exposure time and a zooming time in the during-exposure zoom imaging operation.

11. The information processing device according to claim 1, wherein the one or more processors are further configured to decide the control details based on a movement of the specific subject in a direction orthogonal to an optical axis.

12. The information processing device according to claim 11, wherein the one or more processors are further configured to perform movement prediction for the specific subject, and in an event a result of the movement prediction passes through a center position of an image or a position located within a predetermined distance from the center position and does not pass over the center position of the image or a position located within a predetermined distance from the center position until an exposure time of the during-exposure zoom imaging operation ends, determines that the during-exposure zoom imaging operation is to be executed.

13. The information processing device according to claim 11, wherein the one or more processors are further configured to decide the control details in which a time at which the specific subject moves to a center position or a position located within a predetermined distance from the center position is set to be an end time of an exposure time of the during-exposure zoom imaging operation and a time as early as the exposure time of the during-exposure zoom imaging operation from the end time is set to be a start time of the exposure time.

14. The information processing device according to claim 1, wherein the one or more processors are further configured to decide a driving direction of the zoom lens in the during-exposure zoom imaging operation to be one of a zoom-in direction or a zoom-out direction based on a size of the specific subject.

15. The information processing device according to claim 1, wherein the one or more processors are further configured to determine whether or not a size of the specific subject in the during-exposure zoom imaging operation reaches a predetermined size based on the decided control details, and in an event it is determined that the size of the specific subject reaches the predetermined size, the one or more processors are configured to correct a position of the zoom lens, and cause the during-exposure zoom imaging operation to start after the correction.

16. An information processing method, comprising:
performing control to decide control details of a zoom lens in a during-exposure zoom imaging operation based on a specific subject that is an imaging target of the during-exposure zoom imaging operation;
acquiring information of a type of the specific subject,
wherein the control details are decided based on the acquired information of the type of the specific subject; and
causing a guide screen for correcting a position of the zoom lens to be displayed on a display unit, in an event it is determined that the zoom lens reaches an end portion of an operable range of the zoom lens during the during-exposure zoom imaging operation based on the decided control details.

17. A non-transitory computer-readable storage medium having stored thereon, a set of computer-executable instructions for causing a computer to perform steps comprising:
performing control to decide control details of a zoom lens in a during-exposure zoom imaging operation based on a specific subject that is an imaging target of the during-exposure zoom imaging operation;
acquiring information of a type of the specific subject,
wherein the control details are decided based on the acquired information of the type of the specific subject; and
causing a guide screen for correcting a position of the zoom lens to be displayed on a display unit, in an event it is determined that the zoom lens reaches an end portion of an operable range of the zoom lens during the during-exposure zoom imaging operation based on the decided control details.

18. An information processing device comprising:
one or more processors configured to:
perform control to decide control details for a zoom lens in a during-exposure zoom imaging operation based on a specific subject that is an imaging target of the during-exposure zoom imaging operation;

acquire information of a type of the specific subject; and decide, as the control details, one operation mode among a plurality of operation modes respectively having different relationships between an exposure time and a zooming time in the during-exposure zoom imaging operation, wherein the control details are decided based on the acquired information of the type of the specific subject, and wherein the one or more processors are further configured to determine whether or not the zoom lens reaches an end portion of an operable range of the zoom lens during the during-exposure zoom imaging operation based on the decided control details, and in an event it is determined that the zoom lens reaches the end portion of the operable range of the zoom lens, the one or more processors are configured to cause a guide screen for correcting a position of the zoom lens to be displayed on a display unit.

19. The information processing device according to claim 18, wherein the plurality of operation modes comprise at least one of a first-half zoom photographing mode, a normal zoom photographing mode, a second-half zoom photographing mode, and an intermediate zoom photographing mode.

* * * * *